US011225845B2

(12) United States Patent
Cutler et al.

(10) Patent No.: US 11,225,845 B2
(45) Date of Patent: Jan. 18, 2022

(54) HYBRID CARRIAGE DRIVE FOR AN UNDERGROUND DRILLING MACHINE

(71) Applicant: VERMEER MANUFACTURING COMPANY, Pella, IA (US)

(72) Inventors: Edward Lee Cutler, Bloomfield, IA (US); Tyler Clayton Walsh, Oskaloosa, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 16/893,598

(22) Filed: Jun. 5, 2020

(65) Prior Publication Data

US 2020/0392798 A1 Dec. 17, 2020

Related U.S. Application Data

(60) Provisional application No. 62/860,992, filed on Jun. 13, 2019.

(51) Int. Cl.
| | |
|---|---|
| *E21B 7/04* | (2006.01) |
| *E21B 19/083* | (2006.01) |
| *E21B 44/02* | (2006.01) |
| *E21B 3/02* | (2006.01) |
| *F16H 19/04* | (2006.01) |
| *E21B 7/28* | (2006.01) |
| *E21B 7/02* | (2006.01) |

(52) U.S. Cl.
CPC .............. *E21B 19/083* (2013.01); *E21B 3/02* (2013.01); *E21B 7/046* (2013.01); *E21B 7/28* (2013.01); *E21B 44/02* (2013.01); *F16H 19/04* (2013.01); *E21B 7/021* (2013.01)

(58) Field of Classification Search
CPC .......... E21B 19/083; E21B 3/02; E21B 7/046; E21B 7/28; E21B 44/02; E21B 7/021; F16H 19/04

See application file for complete search history.

(56) References Cited

U.S. PATENT DOCUMENTS

| | | | |
|---|---|---|---|
| 2,588,068 A | 3/1952 | Williams et al. | |
| 2,835,472 A | 5/1958 | Osborn | |
| 2,898,742 A | 8/1959 | Robbins | |
| 3,107,738 A | 10/1963 | Horner | |
| 3,160,074 A | 12/1964 | Leander et al. | |
| 3,263,573 A | 8/1966 | Fogelstrom et al. | |
| 3,612,194 A | 10/1971 | Richmond | |
| 5,070,948 A * | 12/1991 | Malzahn .................. | E21B 7/26 175/19 |
| 5,421,965 A | 6/1995 | Berg | |

(Continued)

OTHER PUBLICATIONS

Barbco Inc., "Tribor", Product Information, <https://www.barbco.com/guided-boring-equipment/tribor/>, website publicly available at least as early as 2017 (5 pages).

(Continued)

*Primary Examiner* — Taras P Bemko

(74) *Attorney, Agent, or Firm* — Michael Best and Friedrich LLP

(57) ABSTRACT

A drilling machine has a hybrid thrust/pull back system. The hybrid thrust/pull-back system includes at least two different types of drive mechanisms that can be operated concurrently or independently depending upon an operating state of the drilling machine.

19 Claims, 30 Drawing Sheets

(56) References Cited

U.S. PATENT DOCUMENTS

| | | | |
|---|---|---|---|
| 5,426,965 A | 6/1995 | Hopf | |
| 5,570,975 A | 11/1996 | Reinert, Sr. | |
| 5,941,320 A | 8/1999 | Austin et al. | |
| 6,408,952 B1 * | 6/2002 | Brand | E21B 7/04 175/24 |
| 6,959,770 B2 | 11/2005 | Clelland | |
| 7,010,951 B2 | 3/2006 | Wang | |
| 8,628,273 B2 | 1/2014 | Cherrington | |
| 8,998,537 B2 | 4/2015 | Cherrington | |
| 2002/0157870 A1 * | 10/2002 | Bischel | E21B 19/20 175/52 |
| 2007/0068293 A1 | 3/2007 | Buhrmann | |
| 2008/0217070 A1 | 9/2008 | Barbera | |

OTHER PUBLICATIONS

YouTube, "ICUEE 2017: Barbco explains the trenchless versatility of the Tribor", <https://www.youtube.com/watch?v=Z_0fl9jY9O4>, published Oct. 4, 2017 (2 pages).

\* cited by examiner

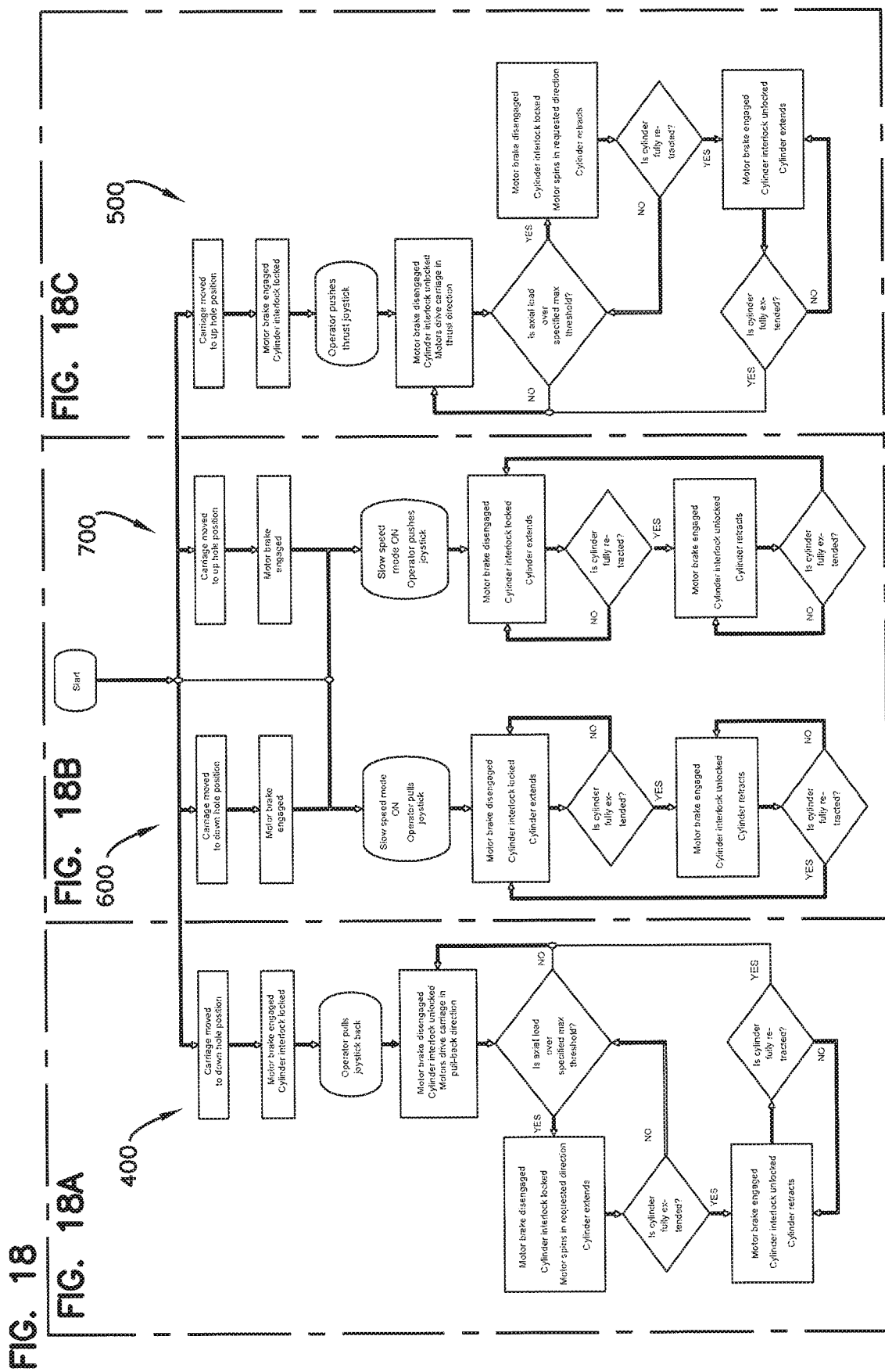

HYBRID CARRIAGE DRIVE FOR AN UNDERGROUND DRILLING MACHINE

RELATED APPLICATIONS

This application claims the benefit of U.S. Provisional Patent Application No. 62/860,992 filed Jun. 13, 2019, the entire content of which is hereby incorporated by reference herein.

TECHNICAL FIELD

The present disclosure relates generally to underground drilling machines. More particularly, the present disclosure relates to thrust/pull-back systems for thrusting drill strings into the ground and for pulling back drill strings from the ground.

BACKGROUND

Utility lines for water, electricity, gas, telephone, cable television, fiber optics and the like are often run underground for reasons of safety and aesthetics. Sometimes, the underground utilities are buried in a trench that is then backfilled. However, trenching can be time consuming and can cause substantial damage to existing structures or roadways. As an alternative, underground drilling processes and systems have been developed for installing utilities underground. A common underground drilling process involves initially drilling a pilot bore from a launch point to a termination point. Once the pilot bore has been drilled, the pilot bore can be enlarged using a back reaming process. During back reaming, a product (e.g., a pipe) can be pulled behind the back reamer into the back reamed hole. For some drilling techniques, the launch point and the termination point can be below-ground (e.g., in pits). Other drilling techniques can have the launch and termination points at ground level. For this type of drilling process, the drilled bore often defines a curved path which angles into the ground from the launch point and gradually curves upwardly to reach the termination point. Known techniques can be used for steering the drilling machine during drilling so that the drilled bore follows a desired path. Relatively long bores can be drilled by coupling a relatively large number of drill rods together to form a drill string.

One type of directional drilling machine includes an elongate track, which may include a rack, which can be aligned at an inclined orientation relative to the ground. A drive head (e.g., a gear box) is mounted on the track (e.g., by a carriage) so as to be movable along a drive axis that extends parallel to the length of the track. In certain examples, a propulsion system such as a rack and pinion drive or a hydraulic cylinder is used to propel the drive head along the track. The drive head can include a drive member that is rotated by the drive head about the drive axis. The drive member is adapted for connection to a drill rod (e.g., a drill pipe). The drill rod can have a threaded end including either female or male threads.

To drill a bore using a directional drilling machine of the type described above, the track is oriented at an inclined angled relative to the ground, and the drive head is moved to an upper end of the track. Next, a drill rod is unloaded from a drill rod storage structure (e.g., a magazine) of the directional drilling machine and an upper end of the drill rod is coupled to the drive member of the drive head typically by a threaded connection. After the upper end of the drill rod has been coupled to the drill head, the lower end of the drill rod is coupled to a drill head if the drill rod is the first drill rod to be introduced into the ground, or to the upper-most drill rod of an existing drill string if the drill string has already been started. Thereafter, the drive head is driven in a downward direction along the inclined track while the drive member is concurrently rotated about the drive axis. As the drive head is driven down the track, the drive head transfers axial thrust and torque to the drill string. The axial thrust and torque is transferred through the drill string to the drill head thereby causing a cutting element (e.g., a bit) of the drill head to rotationally bore through the ground. The length of the bore is progressively increased as drill rods are progressively added to the drill string. The drill rods are most commonly secured together by threaded connections at joints between the drill rods.

After a bore has been drilled, it is necessary to pull-back the drill string to remove the drill string from the bore. During the pull-back process, drill rods of the drill string are individually withdrawn from the ground, uncoupled from the drill string, and returned to the drill rod storage structure. Often, back reaming is done as part of the pull-back process.

SUMMARY

One aspect of the present disclosure relates to a drilling machine including an elongate track that extends between a first end and an opposite second end with a drive axis extending parallel to a length of the track. In use of the drilling machine, the first end is located adjacent to an entry point into the ground and the second end is positioned away from the entry point. A main carriage is coupled to and moveable along the track in a thrust direction that extends from the second end toward the first end of the track, and in a pull-back direction that extends from the first end toward the second end of the track. A rotational driver is coupled to the main carriage, the rotational driver including a rod coupler having a coupler axis and a coupler end adapted for connection to an end of a drill rod. The drive axis is coaxial with the coupler axis. A first drive mechanism is coupled to the main carriage and the track. A sub-carriage is coupled to and moveable along the track. An interlock is coupled to the sub-carriage and the track, the interlock having a locked position and an unlocked position. A second drive mechanism is coupled to the main carriage and the sub-carriage. The drilling machine is operable in a first state wherein the first drive mechanism drives the main carriage along the track and the second drive mechanism simultaneously drives the main carriage relative to the sub-carriage.

Another aspect of the present disclosure relates to a hybrid thrust/pull-back system for thrusting drill strings into the ground and for pulling back drill strings from the ground. The hybrid thrust/pull-back system includes at least first and second different types/styles of drive mechanisms. The hybrid thrust/pull-back system can be operable such that the first and second drive mechanisms can be operated independently and also can be operated concurrently. In certain examples, each of the first and second drive mechanisms has different preferred functional attributes or characteristics. For example, the first mechanical drive mechanism may be best suited for moving a carriage at higher linear speeds or over longer continuous/uninterrupted distances of travel as compared to the second drive mechanism. In contrast, the second drive mechanism may be more effective than the first drive mechanism at providing precise pressure/load control, slower, more controlled linear speeds, better control of weight-on-bit, more precise position control and may provide an enhanced ability to sense load. In certain examples, the ability to use the two different drive mechanisms simultaneously allows the maximum load capacity of the hybrid thrust/pull-back system to meet peak loads encountered during drilling or pull-back operations without requiring the first and second drive mechanisms to be individually sized to meet peak loads. Smaller sizing of the drive mechanisms can assist in reducing cost. In certain examples, the first drive mechanism can be used independently over a majority of the operating time of the thrust/pull-back system, and the second drive mechanism can used less frequently to provide supplemental force for meeting peak load conditions during drilling or pull-back operations. In one example, the first drive mechanism can include at least one hydraulic motor, and the second drive mechanism can include at least one hydraulic cylinder device. In certain examples, the first and second drive mechanisms can be powered by separate hydraulic pumps and can be incorporated within separate hydraulic circuits.

It will be appreciated that during drilling and pull-back operations, the thrust or pull-back force required to be applied to the drill string will vary over time depending upon the ground conditions encountered. For example, harder more rocky soil conditions typically require more force as compared to softer ground conditions. Aspects of the present disclosure relate to a thrust/pull-back system having a hybrid configuration with at least first and second different types/styles of drive mechanisms. The thrust/pull-back system can sense the total load on the system to determine whether only one of the first and second different types of drive mechanisms is capable of meeting the load. For example, if the sensed load is below a predetermined level, only one of the first and second drive mechanisms may be operated. In contrast, if the sensed load is above the predetermined level, both of the first and second drive mechanisms may be operated simultaneously to meet the higher load demand. In certain examples, the system can continue to monitor the load pressure as both of the drive mechanisms are operated concurrently, and can discontinue operation of one of the first or second drive mechanisms in the event the sensed load decreases to a level lower than the predetermined load threshold. In one example, one of the first and second drive mechanisms includes at least one hydraulic motor, the other of the first and second drive mechanisms includes at least one hydraulic cylinder device.

It will be appreciated that due to static friction, the load required during start-up of a pull-back or drilling sequence can be larger than the load required once the drill string is moving. Aspects of the present disclosure relate to hybrid thrust/pull-back systems that are configured to provide supplemental force during the start-up phase of a pull-back sequence or a drilling sequence. For example, the thrust/pull-back system can include first and second drive mechanisms, and can include control protocol that automatically activates both drive systems during the start-up phase of a pull-back or drilling sequence, and that automatically deactivates one of the first and second drive mechanisms once the drill string is in motion and static friction has been overcome. In certain examples, load sensing can be used to determine when one of the first and second drive mechanisms should be deactivated.

Another aspect of the present disclosure relates to a hybrid thrust/pull-back system including at least first and second different types/styles of drive mechanisms. The thrust/pull-back system is operable in a first state where both of the first and second drive mechanisms are operated concurrently, and is also operable in a second state where one of the first and second drive mechanisms is operated independently of either of the first and second drive mechanisms. In certain examples, load sensing can determine whether the hybrid thrust/pull-back system is operating in either the first state or the second state. In other examples, control protocol may be used to automatically operate the hybrid thrust/pull-back system in the first state when it is required to move a drill string from a static condition to a dynamic condition, and automatically transitions the hybrid thrust/pull-back to the second state once static friction has been overcome and the drill string is in full motion. In other examples, the hybrid thrust/pull-back system may automatically operate in the second state as long as a sensed axial load on the drill string is below a predetermined threshold, and automatically transitions to the first state when the load on the drill string exceeds the predetermined threshold. Similarly, the hybrid thrust/pull-back system can automatically transition from the first operating state back to the second operating state once the load on the drill string returns to a level below the threshold value. In one example, one of the first and second drive mechanisms includes at least one hydraulic motor, and the other of the first and second drive mechanisms includes at least one hydraulic cylinder device. In certain examples, the hydraulic cylinder device can be configured to be activated on the fly (i.e., when a carriage moved by the thrust/pull-back system is in motion).

A further aspect of the present disclosure relates to a hybrid thrust/pull-back system including first and second drive mechanisms for moving a rotational driver of a drilling machine. In one example, the first drive mechanism can include at least one hydraulic motor and the second drive mechanism can include at least one hydraulic cylinder device. In certain examples, the thrust/pull-back system can be operated in a first state where the first and second drive mechanisms are operated simultaneously with each other and the thrust/pull-back system can also be operated in a second state where one of the first and second drive mechanisms is operated independently of the other of the first and second drive mechanisms. In one example, the second drive mechanism has a maximum force capacity in the range of 0.25 to 4 times the maximum force capacity of the first drive mechanism. In other examples, the second drive mechanism can have a maximum force capacity in the range of 0.5 to 3 times maximum force capacity of the first drive mechanism. Still another example, the second drive mechanism can have a maximum force capacity in the range of 0.5 to 2 times the maximum force capacity of the first drive mechanism. In still another example, the maximum force capacities of each of the first and second drive mechanisms are generally the same.

Another aspect of the present disclosure relates to a hybrid thrust/pull-back system for an underground drilling machine that includes a first drive mechanism including at least one hydraulic motor and a second drive mechanism that includes at least one hydraulic cylinder device. The hybrid thrust/pull-back system is configured to be operated in a first state in which the first and second drive mechanisms are concurrently operable, and is also operable in a second state in which at least one of the drive mechanisms is independently operable. In certain examples, the system is configured such that both the first drive mechanism and the second drive mechanism are capable of being independently operated. In a preferred example, the hydraulic cylinder device is oriented such that the hydraulic cylinder device is capable of applying to a drill string when the hydraulic cylinder device is extended, and is capable of applying a thrust load to a drill string when the hydraulic cylinder device is retracted.

Another aspect of the present disclosure relates to a drilling machine for drilling a drill string into the ground and for removing the drill string from the ground. The drilling machine includes a frame including a linear guide having a length that extends between a first end and an opposite second end. In use of the drilling machine, the first end is located adjacent to an entry point into the ground and the second end is positioned away from the entry point. The drilling machine also includes a rack that extends along the length of the linear guide and a carriage that moves back and forth along the linear guide between the first end and the second end of the linear guide. The carriage is movable along the linear guide in a thrust direction that extends from the second end toward the first end of the linear guide. The carriage is also movable along the linear guide in a pull-back direction that extends from the first end toward the second end of the linear guide. The carriage includes a main carriage and a sub-carriage that are movable relative to one another and that are also movable together along the length of the linear guide. The drilling machine also includes a rotational driver mounted to the main carriage. The rotational driver includes a rod coupler adapted for connection to the end of a drill rod. The rotational driver also includes a rotational drive motor for rotating the rod coupler about a drive axis that extends along the length of the linear guide. The drilling machine further includes a carriage drive motor mounted to the main carriage for propelling the main carriage along the linear guide. The carriage drive motor is coupled to a gear that engages the rack. The sub-carriage of the drilling machine includes an interlock configurable in a locked position and an unlocked position. When the interlock is in the locked position, the sub-carriage is locked relative to the frame such that the sub-carriage is inhibited from moving relative to the frame along the length of the linear guide. When the interlock is in the unlocked position, the sub-carriage is free to move relative to the frame along the length of the linear guide. The drilling machine also includes a hydraulic cylinder device including a cylinder and a rod that axially reciprocates within the cylinder. One of the cylinder and the rod is coupled to the main carriage and the other of the cylinder and the rod is coupled to the sub-carriage. The drilling machine is operable in a first state where both the hydraulic cylinder device and the carriage drive motor are simultaneously used to drive the main carriage along the length of the linear guide. The interlock is configured in the locked position when the drilling machine is operated in the first state. In certain examples, the drilling machine includes a controller that coordinates simultaneous operation of the hydraulic cylinder device and the carriage drive motor when the drilling machine is operated in the first state such that the carriage drive motor and the hydraulic cylinder device drive the main carriage at the same linear speed. In certain examples, the drilling machine is also operable in second and third states. When the drilling machine is operated in the second state, only the carriage drive motor and not the hydraulic cylinder device is used to drive the main carriage along the length of the linear guide. When the drilling machine is operated in the third state, only the hydraulic cylinder device and not the carriage drive motor is used to drive the carriage along the length of the linear guide.

Another aspect of the present disclosure relates to an underground drilling machine including a hybrid thrust/pull-back system including a first drive mechanism and a second drive mechanism. The first drive mechanism includes at least one hydraulic motor for driving a gear that intermeshes with a rack of the drilling machine. The second drive mechanism includes at least one hydraulic cylinder and an interlock for selectively coupling and de-coupling the hydraulic cylinder from the rack.

Another aspect of the present disclosure relates to an underground drilling machine including a hybrid thrust/pull-back system including a first drive mechanism and a second drive mechanism. The first drive mechanism includes at least one propulsion hydraulic motor for propelling a rotational drive carriage back and forth along the length of a drill frame of the drilling machine. The rotational drive carriage can include a rotational drive head configured for rotating a drill string about a drive axis of the drilling machine. The second drive mechanism includes at least one hydraulic cylinder that can be coupled between the rotational drive carriage and a vise carriage. The hydraulic cylinder can also be decoupled from the rotational drive carriage or the vise carriage to allow the rotational drive carriage and the vise carriage to be independently moved along the drill frame relative to one another without dependence on the hydraulic cylinder. The vise carriage includes a vise system for use in making and breaking threaded joints between drill rods. In certain examples, the vise carriage is moveable along the length of the drill frame, but can be selectively locked/fixed relative to the drill frame. When the vise carriage is fixed relative to the drill frame while the hydraulic cylinder is coupled between the rotational drive carriage and the vise carriage, the hydraulic cylinder can assist the hydraulic motor of the rotational drive carriage in providing thrust or pull-back force to a drill string. In certain examples, the vise carriage can include its own vise carriage hydraulic motor for propelling the vise carriage back and forth along the drill frame independent of the rotational drive carriage. In certain examples, by hydraulically locking the vise carriage hydraulic motor, the vise carriage can be locked relative to a rack of the drilling machine to lock the vise carriage in position relative to the drill frame. In certain examples, a separate interlock device is provided for selectively locking and unlocking the vise carriage relative to the drill frame. In certain examples, when the vise carriage and the rotational drive carriage are coupled together by the hydraulic cylinder, the vise carriage hydraulic motor can be used to assist in propelling the rotational drive carriage along the drill frame in either the thrust or pull-back direction. Thus, the hydraulic motor or motors of the rotational drive carriage and the vise carriage motor or motors can cooperate to maximize the maximum pull-back and/or thrust capacity of the drilling machine. In one example, the hydraulic motors for propelling the carriages include gears that intermesh with a rack of the drill frame of the drilling machine.

Another aspect of the present disclosure relates to an underground drilling machine including a hybrid thrust/pull-back system including a first drive mechanism and a second drive mechanism. The first drive mechanism includes a first propulsion hydraulic motor (the first drive mechanism may include a plurality of first propulsion hydraulic motors) for propelling a rotational drive carriage back and forth along the length of a drill frame. The rotational drive carriage can include a rotational drive head for rotating a drill string as the drill string is thrust into the ground or withdrawn from the ground. The second drive mechanism is integrated as part of a vise carriage including a vise assembly for making and breaking threaded joints between drill rods of the drill string. The second drive mechanism includes a second propulsion hydraulic motor (the second drive mechanism may include a plurality of second propulsion hydraulic motors) for propelling the vise carriage back and forth along the length of a drill frame. In certain examples, the rotational drive carriage and the vise carriage can be mechanically coupled together so that the two carriages can be operated as a unit for thrusting the drill string into the ground or pulling the drill string from the ground. Example coupling configurations can include fasteners, latches, threaded connections or other types of mechanical attachment techniques. When the rotational drive carriage and the vise carriage are operated as a unit, the first and second drive mechanisms can be operated independently or together to meet the propulsion drive capacities required for pull-back and/or initial drilling operations. In certain examples, the rotational drive carriage and the vise carriage can be disconnected from each other such that the first and second drive mechanisms can respectively independently move the rotational drive carriage and the vise carriage along the length of the drill frame. In certain examples, the vise carriage and the rotational drive carriage can be selectively coupled together by a hydraulic cylinder device that also provides a third drive mechanism for assisting in propelling the rotational drive carriage along the drill frame. In certain examples, when the rotational drive and vise carriages are not coupled together or are not configured to be coupled together, the second drive mechanism of the vise carriage can still be used to assist in pull-back operations by abutting the vise carriage against the rotational drive carriage to provide supplemental pull-back drive capacity.

A variety of advantages of the disclosure will be set forth in part in the description that follows, and in part will be apparent from the description, or may be learned by practicing the various aspects of the present disclosure. It is to be understood that both the foregoing general description and the following detailed description are exemplary and explanatory only and are not restrictive of the broad inventive concepts upon which the examples are based.

Other aspects of the invention will become apparent by consideration of the detailed description and accompanying drawings.

BRIEF DESCRIPTION OF THE DRAWINGS

FIG. 18 is flow chart outlining control logic for controlling the operation of the drilling machine of FIG. 2 in different operating modes and operating states;

DETAILED DESCRIPTION

Figure 1:
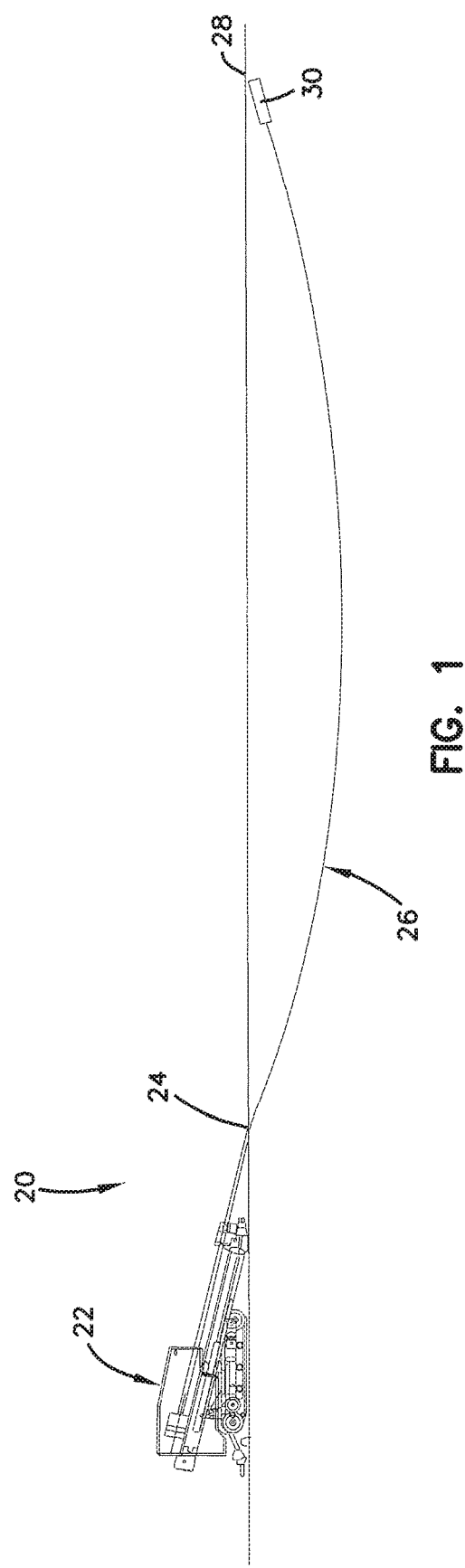
FIG. 1 is a schematic view depicting an example horizontal directional underground drilling machine.

FIG. 1 shows a drilling system 20 that is one example of a type of drilling system for which aspects of the present disclosure are applicable. The drilling system 20 includes a drilling machine 22 positioned at a launch point 24. The drilling machine 22 has drilled out a drill string 26 along a bore path that extends from the launch point 24 to a termination point 28. It will be appreciated that horizontal directional drilling techniques can be used to steer the drill string 26 during the drilling process such that the drill string 26 generally follows the desired bore path. As shown at FIG. 1, the depicted bore path initially extends at a downward trajectory as the bore path extends from the launch point 24 and gradually transitions along a curved path from the downward trajectory to an upward trajectory. In this way, the bore path extends generally horizontally beneath the ground and is able to pass beneath above-ground obstructions. It will be appreciated that the end of the drill string 26 can include a drill head 30 that may include a transmitter (e.g., a sonde) for use in locating the drill string 26 from the surface of the ground, and also preferably includes a cutting device (e.g., a bit) adapted for drilling the bore when the drill string 26 is rotated by the drilling machine 22. This type of directional drilling, where the bore path is primarily horizontal, is often referred to as horizontal directional drilling (HDD).

It will be appreciated that the drill string 26 is formed by a plurality of drill rods that are strung together in an end-to-end configuration. It will be appreciated that the drill rods can each have a single-pipe configuration or a multi-pipe configuration (e.g., a dual-pipe arrangement). An example dual-pipe configuration is disclosed in U.S. Provisional Patent Application Ser. No. 62/530,757, which was formalized as U.S. patent application Ser. No. 16/028,625 and published as US 2019/0010770, all of which are hereby incorporated by reference in their entirety.

Aspects of the present disclosure are applicable to drilling machines for drilling drill strings into the ground and for pulling drill strings from the ground. Example drilling machines include directional drilling machines (e.g., above-ground launched or pit launched), vertical drilling machines, laser guided drilling machines, as well as other drilling machines. The drilling machines can vary in size. For example, the various aspects are applicable to drilling machines having maximum thrust and/or pull-pack capacities that in certain examples may range from 3 tons to over 500 tons.

Figure 2:
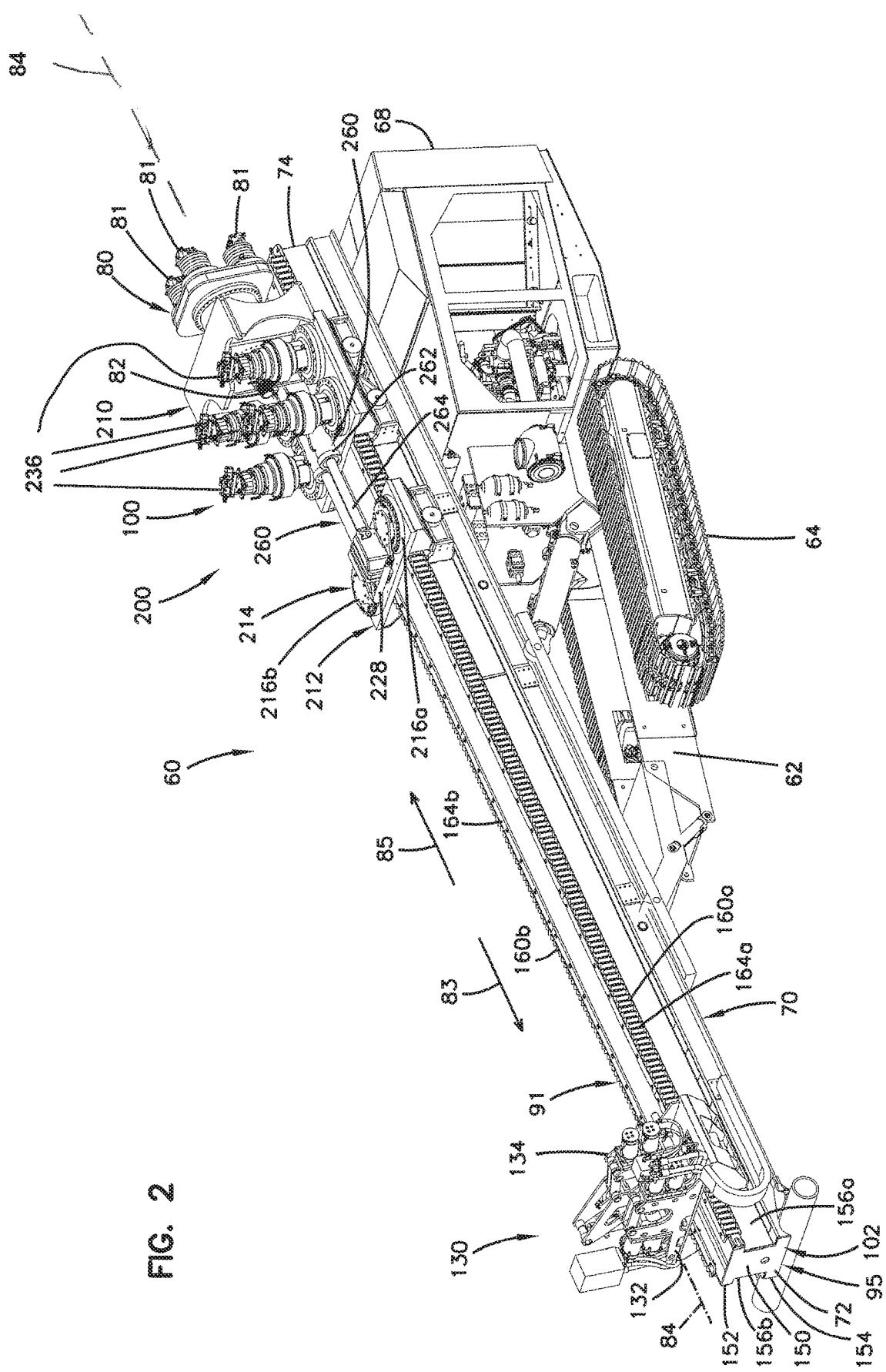
FIG. 2 is a perspective view of a drilling machine in accordance with the principles of the present disclosure.

FIG. 2 shows an example drilling machine 60 in accordance with the principles of the present disclosure. The drilling machine 60 can include a chassis 62 supported on a propulsion structure 64. As depicted, the propulsion structure 64 is shown as including continuous metal tracks, but other propulsion structures such as wheels or continuous rubber tracks could also be used. An operator station (not shown) can be supported on the chassis 62. The operator station can optionally include an enclosed cabin. A shroud or a body 68 is also supported on the chassis 62. In certain examples, the shroud 68 can enclose a prime mover 320 (see FIG. 15) such as a diesel engine, a spark ignition engine, a fuel cell or the like for providing power for the drilling machine 60 for propulsion and for drilling operations. The body 68 can also house hydraulic pumps, a transmission, electric generators, gearing arrangements, motors, belts, chains or other means for transferring energy from the prime mover 320 to different driven components of the drilling machine. The drilling machine 60 further includes a drilling frame 70 that is pivotally connected to the chassis. During transport the drilling frame 70 can be generally horizontally arranged. During drilling operations, the drilling frame 70 can be pivoted relative to the chassis of the drilling machine 60 to an inclined or angled configuration. When in the angled configuration, a first end 72 (e.g., a base end) of the drilling frame 70 is supported on the ground adjacent an entry point into the ground and an opposite second end 74 (e.g., an upper end) of the drilling frame 70 is positioned above the ground way from the entry point. The first end 72 can include anchors such as augers for securely anchoring the first end 72 of the drilling frame 70 to the ground during drilling operations. The drilling machine 60 can also include a drill rod storage structure that mounts on the drilling frame 70 and a rod handling device for moving rods to and from the drill rod storage structure. In a preferred example, the drill rod storage structure can include a magazine that is removable from the drilling frame 70, although non-removable storage structures could also be used. Example rod storage structures are disclosed by U.S. Pat. Nos. 6,332,502; 5,556,263; 5,607,280 and 6,543,551, which are hereby incorporated by reference in their entireties. The drilling machine 60 further includes a vise arrangement 130 for use in assisting making and/or breaking joints between drill rods. The vise arrangement 130 is mounted to the drilling frame 70 adjacent to the first end 72 of the drilling frame 70. The vise arrangement 130 is depicted including a first rod vise 132 and a second rod vise 134. In one example, the first rod vise 132 is non-pivotal vise, while the second rod vise 134 is pivotal and can be pivoted about a drive axis of the drilling machine by one or more actuators such as hydraulic cylinder devices.

Figure 7:
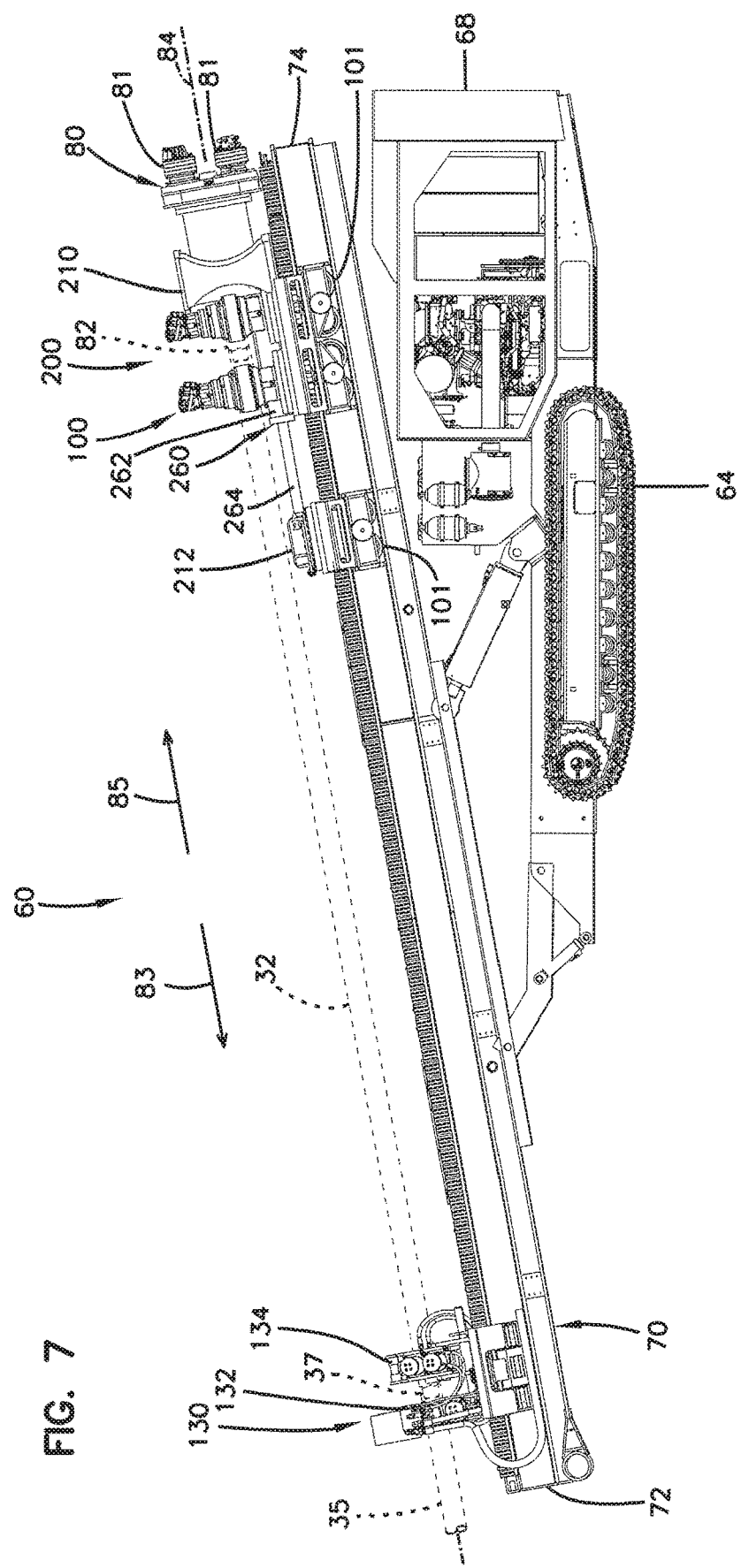
FIG. 7 is a side view of the drilling machine of FIG. 2 with a carriage of the drilling machine positioned adjacent an upper end of a linear guide of the drilling machine and with hydraulic cylinders of the hybrid thrust/pull-back system extended.

Referring still to FIG. 2, the drilling machine 60 also includes a rotational driver 80 including a rotationally driven rod coupler 82 adapted for connection to an end of a drill rod 32 (see FIG. 7). The rod coupler 82 can be referred to as a stem, a chuck, a sub, a spindle or like terms. The rod coupler 82 can also include an add-on piece such as a sub-saver. The rod coupler 82 preferably has a coupler end with a threaded interface (e.g., a male or female threaded interface) adapted for coupling to a mating end (e.g., an up-hole end) of the drill rod 32. It will be appreciated that the rotational driver 80 can include a drive mechanism for rotating the rod coupler 82 about a drive axis 84, which is the axis along which drill rods 32 are drilled into or pulled from the ground. In that regard, the rod coupler 82 has a coupler axis that is coaxial with the drive axis 84. The drive mechanism can include one or more motors such as one or more hydraulic motors, pneumatic motors, or electric motors. Torque can be transferred from the drive motors to the rod coupler 82 by mechanical means for transferring torque such as sprockets, chains, gears, screw drives, or other means. As depicted at FIG. 2, the rotational driver 80 includes a gearbox containing a plurality of gears for transferring torque from at least one hydraulic motor 81 (four hydraulic motors 81 are depicted) to the rod coupler 82 for selectively rotating the rod coupler 82 either clockwise or counterclockwise about the drive axis 84. The drive axis 84 extends along the length of the drilling frame 70. The hydraulic motors 81 form part of a hydraulic circuit 190 (see FIG. 15) including a hydraulic pump 192 powered by the prime mover 320 of the drilling machine 60. The hydraulic pump 192 can be a bi-directional, variable flow pump that directs pressurized hydraulic fluid through the hydraulic circuit 190 to drive rotation of the hydraulic motors 81.

Figure 6:
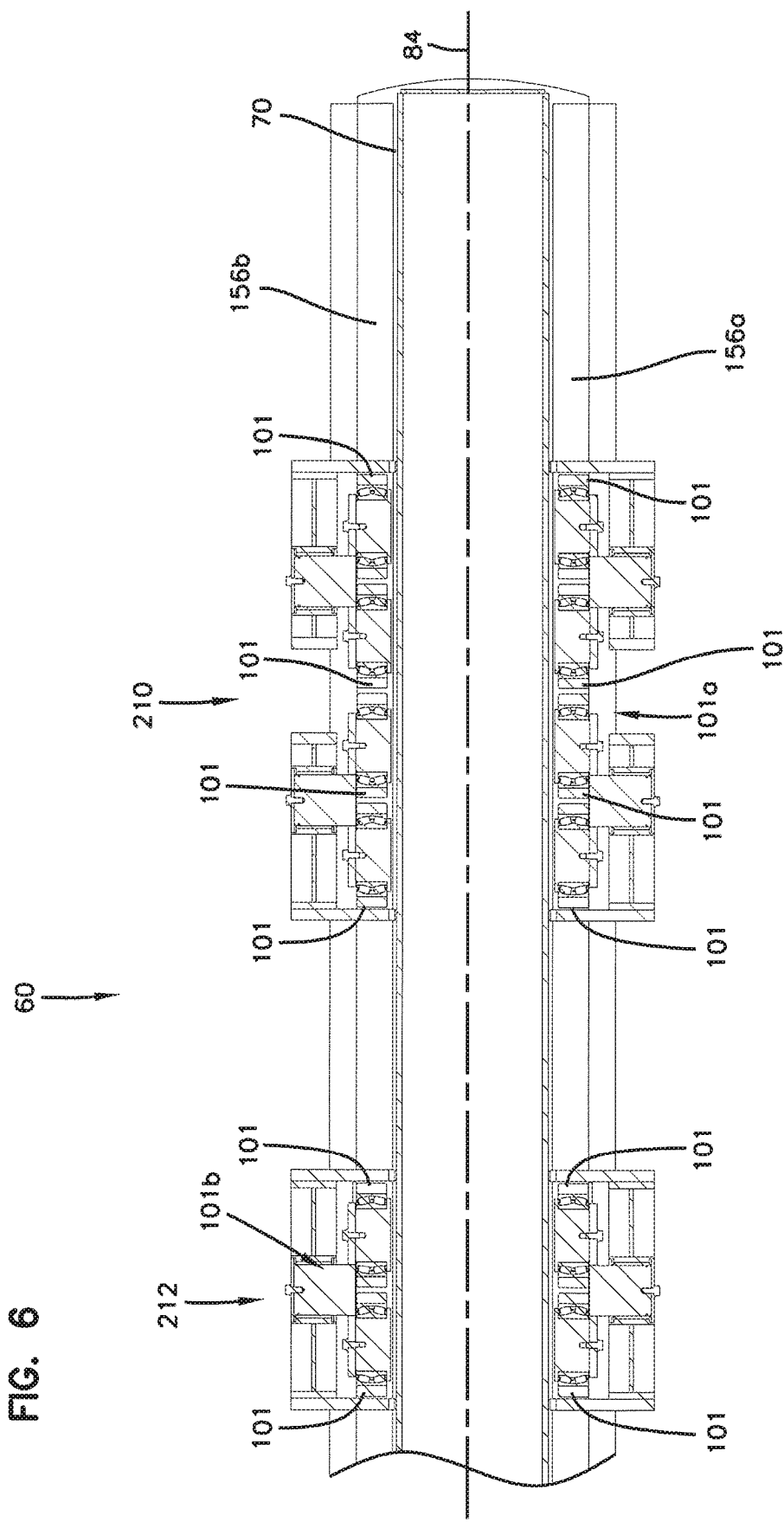
FIG. 6 is a cross-sectional view showing a roller configuration of a carriage of the hybrid thrust/pull-back system of FIG. 2.

Referring to FIG. 2, the rotational driver 80 mounts on a carriage 100 that rides along an elongate track 102 of the drill frame 70. The elongate track 102 extends along the length of the drill frame 70 and has opposite ends that coincide with or define the first and second ends 72, 74 of the drilling frame 70. The track mounted configuration of the carriage 100 is configured to allow the rotational driver 80 to be moved or reciprocated back and forth along the length of the drilling frame 70 (e.g., along the drive axis 84) as drilling rods are drilled into the ground or pulled back from the ground. The track 102 can include one or more linear guide structures such as a rail 95 for guiding linear movement of the carriage 100 along the length of the track. As depicted, the rail 95 is an I-beam having a cross-sectional shape including a web 150 that extends between upper and lower flanges 152, 154. The rail 95 defines channels 156*a*, 156*b* that face in opposite directions, and the carriage 100 includes rollers 101 (see FIG. 6) that ride in the channels 156*a*, 156*b* (e.g., on the lower flange 154) on opposite sides of the web 150. It will be appreciated that the rotational driver 80 moves along the drive axis 84 as the carriage 100 moves along the track 102. Preferably, the rotational driver 80 moves linearly along the drive axis 84. The track 102 also includes a rack structure 91 including first and second linear gears 160*a*, 160*b* (i.e., racks, linear gear bars, etc.) that extend longitudinally between the first and second ends 72, 74 of the frame 70. The first and second linear gears 160*a*, 160*b* are mounted on the upper flange 152 on opposite side of the web 150 and each include outwardly facing linear rows of teeth 164*a*, 164*b* that extend between the first and second ends 72, 74 of the frame 70.

The carriage 100 is moveable along the length of the elongate track 102 in a thrust direction 83 that extends from the second end 74 to the first end 72 of the drill frame 70. When the carriage 100 is moved in the thrust direction 83, the carriage 100 is adapted to drive a drill rod/drill string coupled to the rod coupler 82 into the ground. The carriage 100 is also moveable along the length of the elongate track 102 in a pull-back direction 85 that extends from the first end 72 to the second end 74 of the drill frame. When the carriage 100 is moved in the pull-back direction 85, the carriage 100 is adapted to pull a drill rod/drill string coupled to the rod coupler 82 from the ground.

It is preferred for a hybrid thrust and pull-back drive arrangement/system 200 to be used to move the carriage 100 and the rotational driver 80 mounted thereon back and forth along the length of the track 102 between the ends 72, 74. The hybrid thrust and pull-back drive arrangement 200 provides thrust force for driving drill strings into the ground, and also provides pull-back force for removing drill strings from the ground. In one example, the thrust and pull-back drive arrangement 200 has a hybrid configuration with at least first and second different types/styles of drive mechanisms. In one example, the hybrid configuration is operable such that the first and second drive mechanisms can be operated independently and can also be operated concurrently so as to provide maximum operating flexibility with regard to functionality and thrust/pull-back force capacities. In certain examples, each of the drive mechanisms provides different functional benefits when operated independently. Examples of functional benefits include higher linear speeds, longer distances of travel without interruption, more precise pressure/load control, slower more controlled linear speeds, better control of weight-on-bit, more precise position control, enhanced ability to sense load, and other benefits. The use of the two different drive mechanisms simultaneously allows the maximum load capacity of the hybrid configuration to meet peak loads encountered during drilling or pull-back operations without requiring the first and second drive mechanisms to be individually sized to meet the peak loads. Smaller sizing of the drive mechanisms can assist in reducing cost.

The carriage 100 preferably has a construction adapted to accommodate the hybrid thrust and pull-back drive mechanism. For example, it is preferred for the carriage 100 to have a multi-part/multi-component configuration. For example, the carriage 100 depicted in the drilling machine 60 of FIG. 2 includes a two-part construction which includes a main carriage 210 and a sub-carriage 212. The main carriage 210 and the sub-carriage 212 are moveable relative to one another along the length of the track 102. Additionally, the main carriage 210 and the sub-carriage 212 can also be moved together as a unit along the length of the track 102. The main carriage 210 includes a set 101*a* (see FIG. 6) of rollers 101 for guiding the main carriage 210 along the rail 95. The set of rollers 101*a* includes four rollers 101 that ride within each of the channels 156*a*, 156*b* of the rail 95. The sub-carriage 212 includes a separate set 101*b* (see FIG. 6) of rollers 101 for guiding movement of the sub-carriage 212 along the track 102. The set 101*b* of rollers 101 includes two rollers 101 that ride within each of the channels 156*a*, 156*b*. Preferably, rotational driver 80 is mounted on the main carriage 210 and the sub-carriage 212 includes an interlock 214 adapted to selectively lock and unlock the sub-carriage 212 relative to the track 102. When the sub-carriage 212 is locked relative to the track 102 by the interlock 214, the interlock 214 prevents the movement of the sub-carriage 212 relative to the track 102 in an orientation along the length of the track 102 (i.e., along the drive axis 84). When the interlock 214 is unlocked, the sub-carriage 212 is free to move relative to the track 102 in the orientation along the length of the track (i.e., along the drive axis 84).

It will be appreciated that the interlock 214 can include a variety of different types of configurations. Example configurations can include actuators such as clamps or magnetic interlocks that interface with the track 102 or another portion of the drilling frame 70 to selectively lock and unlock the sub-carriage 212 relative to the track 102. In other examples, the interlock can include an actuator that selectively engages and disengages a locking member (e.g., a pin or other type of member) within locking openings defined by the drilling frame 70 along the length of the track 102. In a preferred example, the interlock 214 includes structure for selectively engaging and disengaging the rack structure 91.

Figure 3:
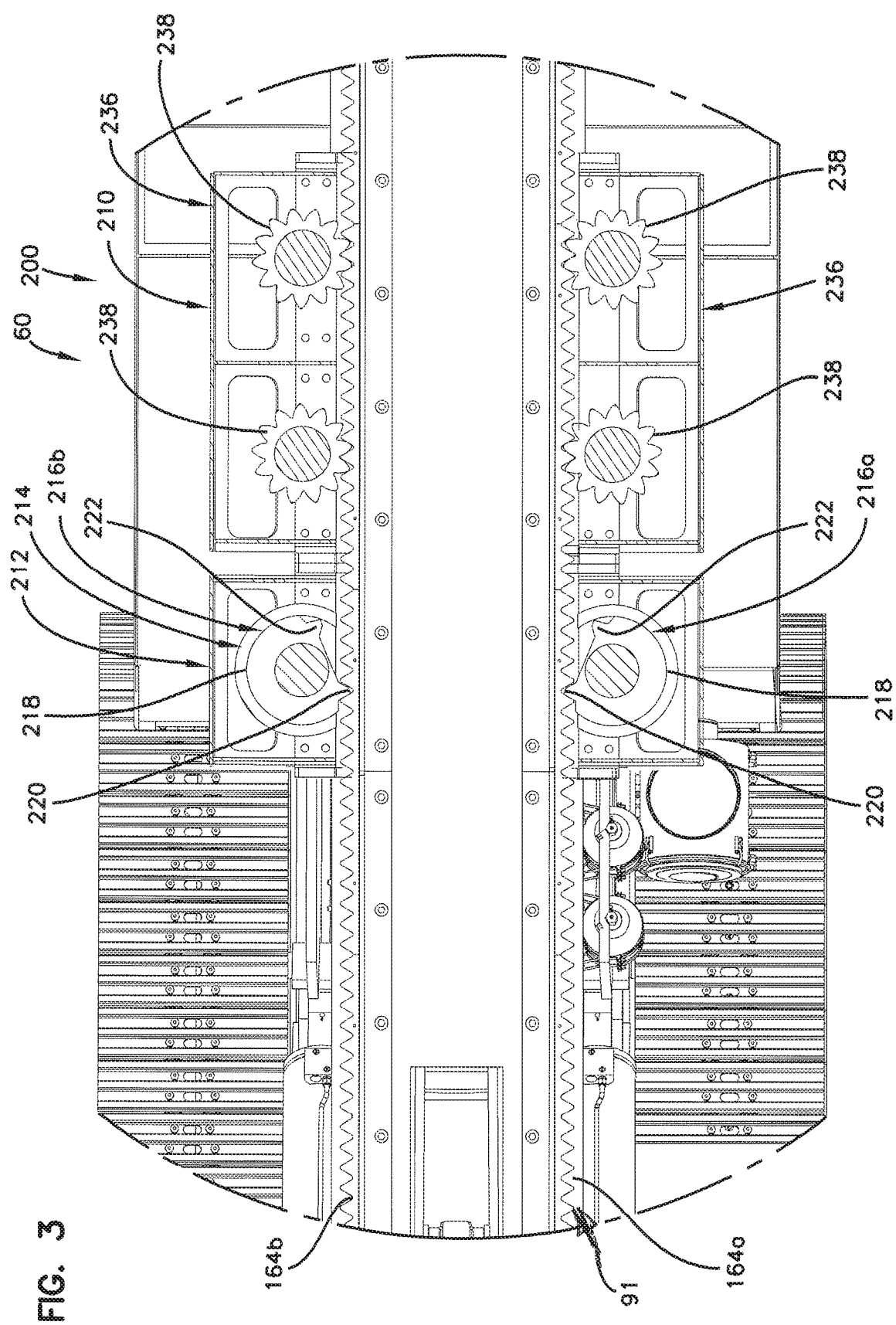
FIG. 3 is a cross-sectional view of a hybrid thrust/pull-back system of the drilling machine of FIG. 2, the hybrid thrust/pull-back system includes a rack interlock which is shown in a first locked position.
Figure 4:
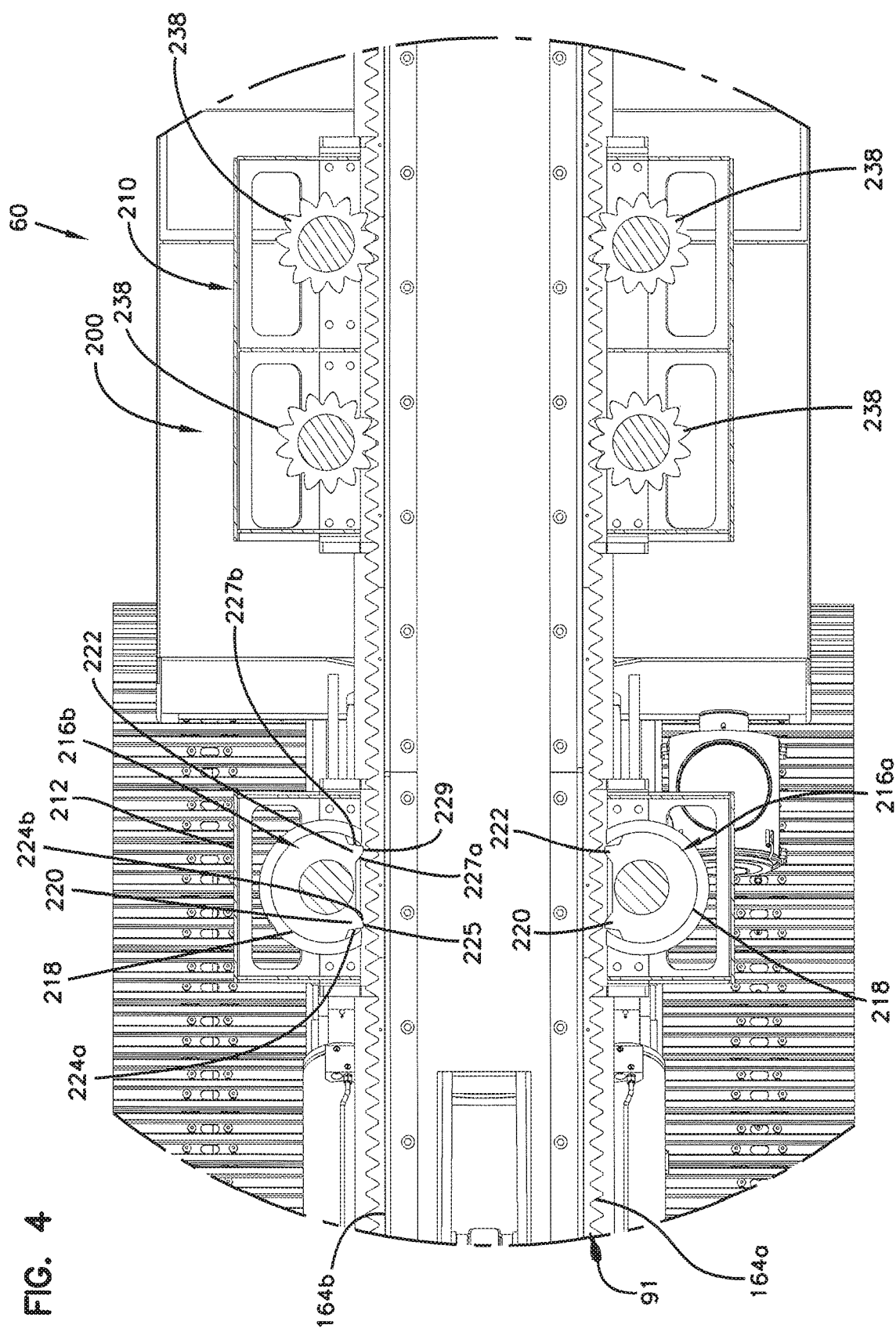
FIG. 4 is a cross-sectional view showing the thrust/pull-back system of FIG. 3 with the rack interlock in an unlocked position.
Figure 5:
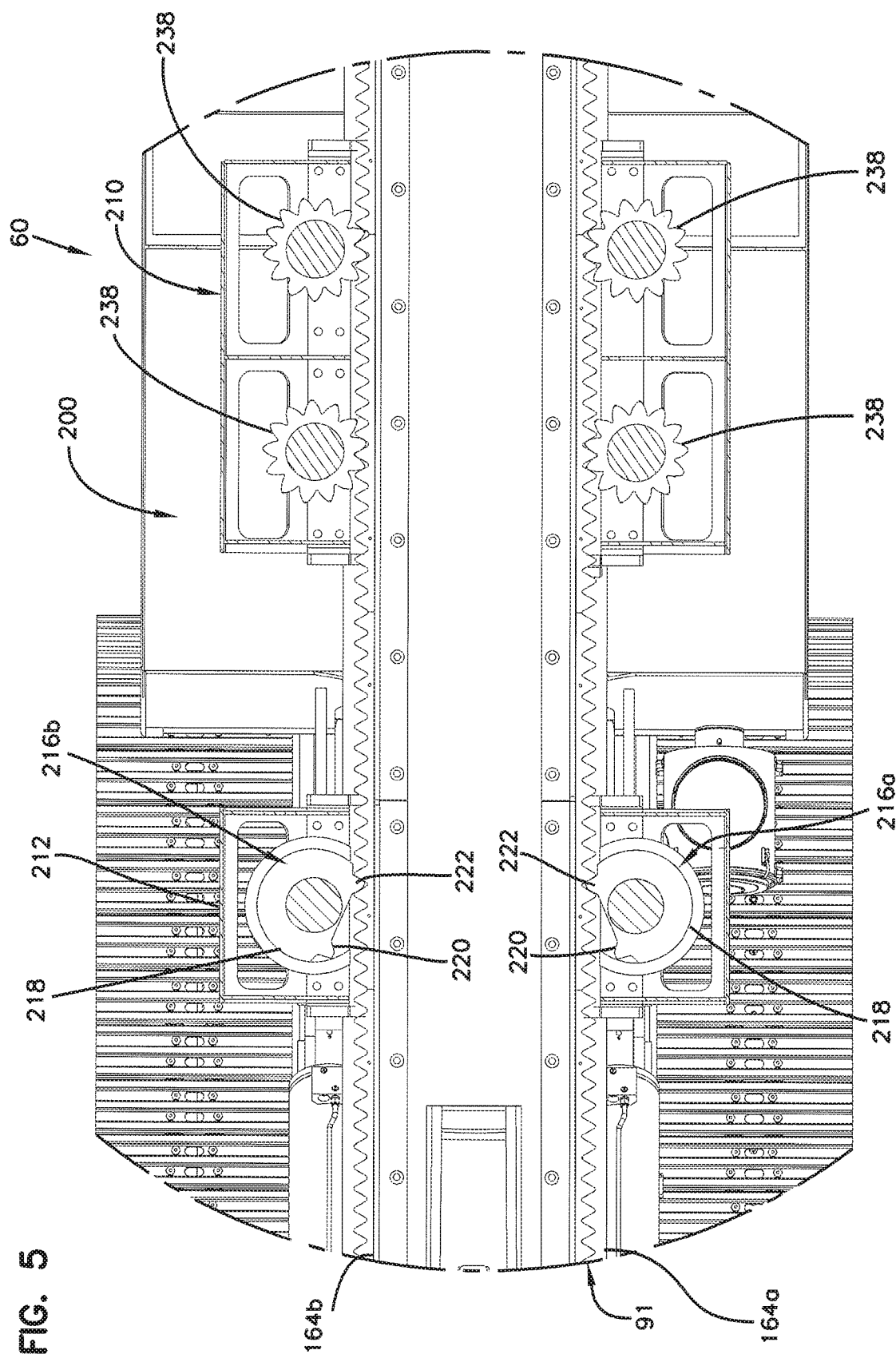
FIG. 5 is a cross-sectional view showing the thrust/pull-back system of FIG. 3 with the rack interlock in a second locked position.

FIGS. 3-5 illustrate a preferred configuration for the interlock 214. The depicted interlock 214 includes locking structures 216*a*, 216*b* that respectively engage and disengage the teeth 164*a*, 164*b* of the first and second linear gears 160*a*, 160*b* which defined the rack structure 91. Each of the locking structures 216*a*, 216*b* includes a rotary toggle 218 for selectively engaging the rack structure 91. Each of the toggles 218 includes a first locking tooth 220 and a second locking tooth 222. The first locking tooth 220 includes a tooth surfaces 224*a*, 224*b* that meet at an apex 225 (see FIG. 4) and the second locking tooth 222 includes tooth surfaces 227*a*, 227*b* that meet at an apex 229 (see FIG. 4). An actuator such as a hydraulic cylinder device 228 (see FIGS. 2 and 17) is used to concurrently move the toggles 218 of the locking structures 216*a*, 216*b* between a first locking position (see FIG. 3) where the first locking teeth 220 engage the teeth 164*a*, 164*b* of the rack structure 91, an unlocked position (see FIG. 4) where the locking teeth 220, 222 of the toggles 218 are disengaged from the rack structure 91, and a second locking position (see FIG. 5) where the second locking teeth 222 engage the teeth 164*a*, 164*b* of the rack structure 91. It will be appreciated that the rack structure 91 is positioned between the locking structures 216*a*, 216*b*. When the locking structures 216*a*, 216*b* are in either of the first or second locked positions, the toggles 218 engage the linear gears 160*a*, 160*b* positioned therein between so as to lock the sub-carriage 212 against movement relative to the track 102 along the drive axis 84. In contrast, when the locking structures 216*a*, 216*b* are in the unlocked position, the interlock 214 does not prevent the sub-carriage 212 from being moved relative to the track 102 along the drive axis 84.

The tooth surfaces 224*a* of the first locking teeth 220 face in a down-hole direction (i.e., toward the first end 72 of the track 102) and are adapted to oppose and engage up-hole sides of the teeth 164a, 164b when the locking structures 216a, 216b are in the first locking position of FIG. 3. When engaged with the teeth 164a, 164b, the tooth surfaces 224a oppose and are parallel to the up-hole sides of corresponding ones of the teeth 164a, 164b. The tooth surfaces 224b of the first locking teeth 220 face in an up-hole direction (i.e., toward the second end 74 of the track 102) and are adapted to oppose down-hole sides of the teeth 164a, 164b when the locking structures 216a, 216b are in the first locking position of FIG. 3. As shown at FIG. 3, the tooth surfaces 224a of the first locking teeth 220 have more contact area with the teeth 164a, 164b engaged as compared to the locking surfaces 224b. The locking surfaces 224b can be shaped or contoured to facilitate engaging the locking teeth 220 with the linear gears 160a, 160b while the sub-carriage 212 is on the fly (i.e., moving relative to the linear gears 160a, 160b) without undesirable wear-causing interference. In this way, interlocking of the first locking teeth 220 relative to the first and second linear gears 160a, 160b can halt or stop relative movement between the sub-carriage 212 and the track 102. In use, it is preferred for the interlock 214 to be placed in the first locked position of FIG. 3 during pull-back operations to make use of the higher contact area provided by the tooth surfaces 224a.

The tooth surfaces 227b of the second locking teeth 222 face in an up-hole direction (i.e., toward the second end 74 of the track 102) and are adapted to oppose and engage down-hole sides of the teeth 164a, 164b when the locking structures 216a, 216b are in the second locking position of FIG. 5. When engaged with the teeth 164a, 164b, the tooth surfaces 227b oppose and are parallel to the down-hole sides of corresponding ones of the teeth 164a, 164b. The tooth surfaces 227a of the second locking teeth 222 face in a down-hole direction (i.e., toward the first end 72 of the track 102) and are adapted to oppose up-hole sides of the teeth 164a, 164b when the locking structures 216a, 216b are in the second locking position of FIG. 5. As shown at FIG. 5, the tooth surfaces 227b of the second locking teeth 222 have more contact area with the teeth 164a, 164b engaged as compared to the locking surfaces 227a. The locking surfaces 227a can be shaped or contoured to facilitate engaging the locking teeth 222 with the linear gears 160a, 160b while the sub-carriage 212 is on the fly (i.e., moving relative to the linear gears 160a, 160b) without undesirable wear-causing interference. In this way, interlocking of the second locking teeth 222 relative to the first and second linear gears 160a, 160b can halt or stop relative movement between the sub-carriage 212 and the track 102. In use, it is preferred for the interlock 214 to be placed in the second locked position of FIG. 5 during thrust operations to make use of the higher contact area provided by the tooth surfaces 227b.

FIG. 4 shows the toggles 218 of the locking structures 216a, 216b in an unlocked position in which the locking teeth 220, 222 are disengaged from the first and second linear gears 160a, 160b. In this unlocked position, the interlock 214 does not interfere with or prevent relative movement between the sub-carriage 212 and the track 102 along the drive axis 80.

In the depicted embodiment of FIG. 2, the first drive mechanism of the hybrid thrust and pull-back drive arrangement 200 preferably includes at least one carriage drive motor such as a hydraulic motor. As depicted at FIG. 2, the first drive mechanism includes a plurality of hydraulic motors 236 (e.g., four hydraulic drive motors are depicted). The hydraulic motors 236 are mounted to the main carriage 210 and are configured for propelling the main carriage 210 back and forth along the length of the track 102 (e.g., along the lengths of the rack structure 91 as well as the rail 95). The hydraulic motors 236 are shown with two motors positioned on each side of the rack structure 91. The hydraulic motors 236 drive rotational gears 238 (see FIG. 3) that intermesh with the first and second linear gears 160a, 160b of the rack structure 91. As depicted, the hydraulic motors 236 directly drive the rotational gears 238. In alternative examples, the hydraulic motors 236 may be coupled to the rotational gears 238 by intermediate structures such as one or more intermediate gears that transfer torque from the hydraulic motors 236 to the rotational gears 238. As depicted at FIG. 3, the rotational gears 238 of two of the hydraulic motors 236 engage the first linear gear 160a, while the rotational gears 238 of the other two hydraulic motors 236 engage the second linear gear 160b. It will be appreciated that rotation of the rotational gears 238 by the hydraulic motors 236 causes the main carriage 210 to be propelled along the track 102. Depending upon the direction of rotation of the rotational gears 238, the main carriage 210 can be propelled along the track 102 in either the thrust direction 83 or the pull-back direction 85.

Figure 15:
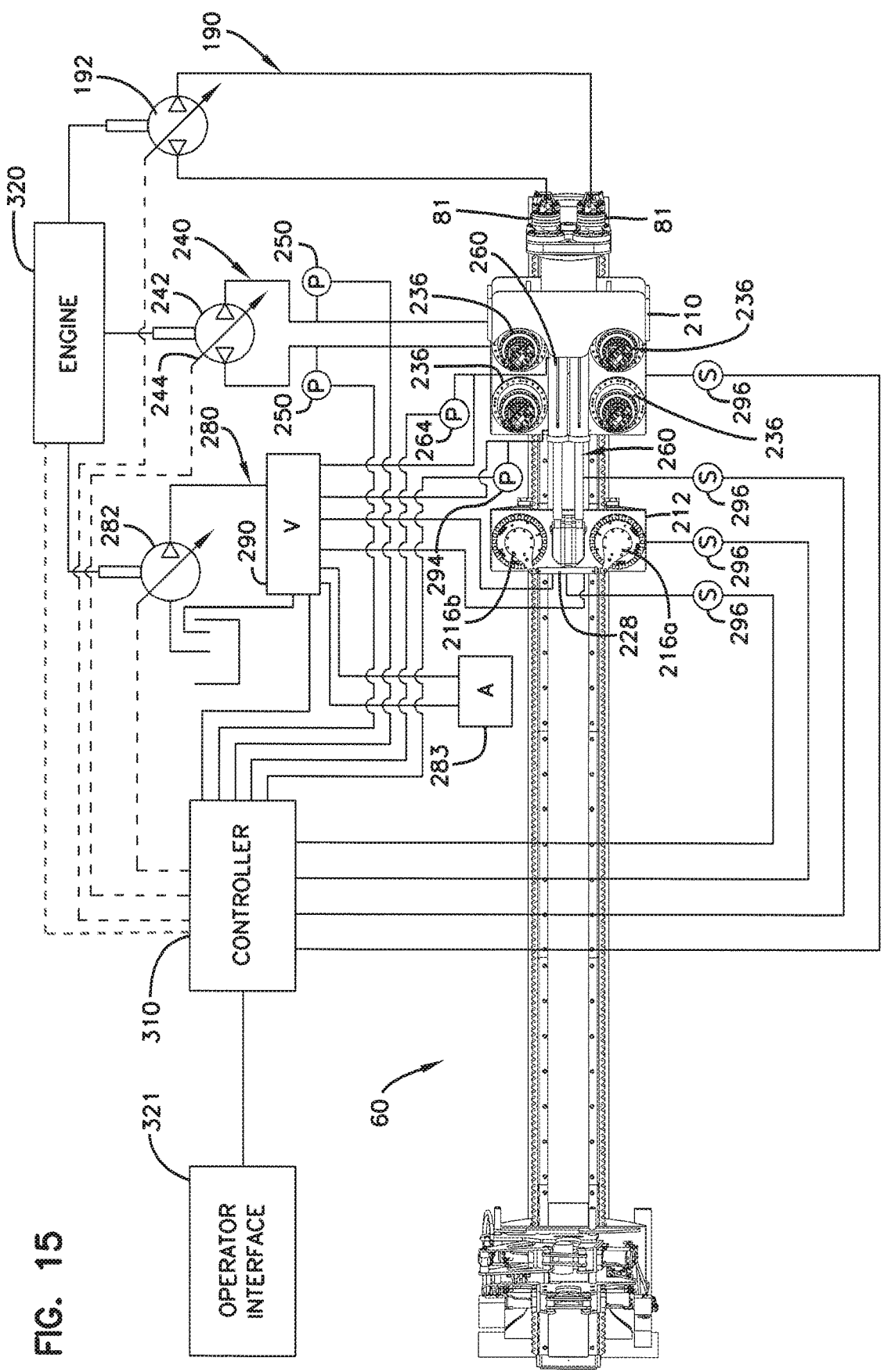
FIG. 15 schematically depicts an example control system for the drilling machine of FIG. 2.
Figure 16:
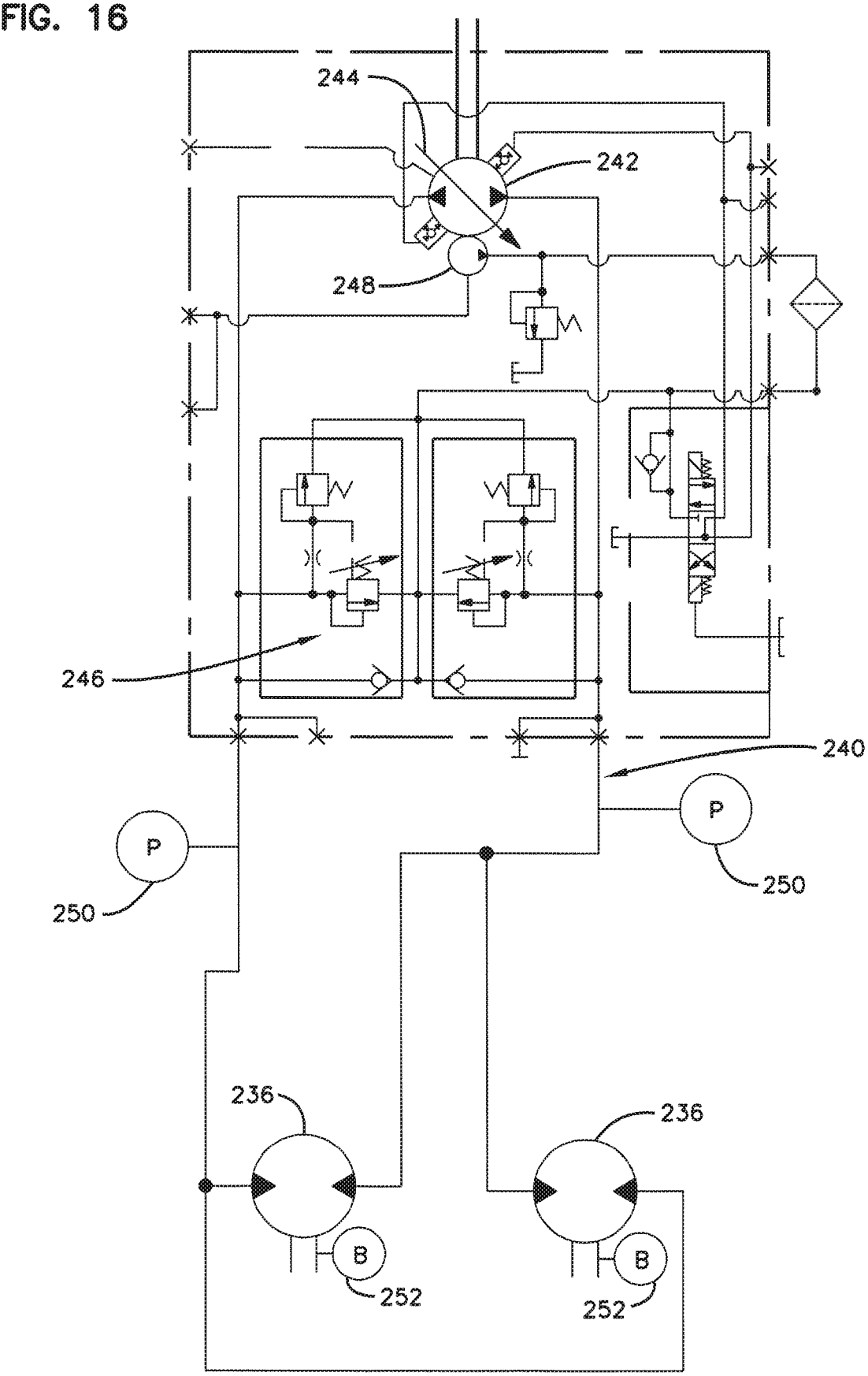
FIG. 16 is a schematic depiction of a hydraulic circuit for powering hydraulic motors of the hybrid thrust/pull-back system of the drilling machine of FIG. 2.

FIGS. 15 and 16 show a hydraulic circuit configuration 240 for driving and controlling operation of the hydraulic motors 236 (only two of the motors 236 are shown at FIG. 16). In the depicted example, the hydraulic circuit configuration 240 functions as a closed-loop system. In this system, power for driving the hydraulic motors 236 is provided by a hydraulic pump 242 powered by the prime mover 320 of the drilling machine 60. It is preferred for the hydraulic pump 242 to be bi-directional and to be a variable flow pump. A swash plate 244 can be adjusted to control an amount of displacement of the hydraulic pump 242, and to control the direction of flow through the hydraulic pump 242. Since the system is a closed loop system, the hydraulic circuit configuration 240 includes a flow path that extends from the hydraulic pump 242 through the hydraulic motors 236 and then back to the hydraulic pump 242. A cross-porting arrangement 246 arranged in parallel with respect to the motors 236 can include one or more pressure relief valves for relieving high pressure in the system. The hydraulic circuit configuration 240 also includes a charge pump 248 for recharging the closed loop circuit with hydraulic fluid to replace hydraulic fluid lost from the hydraulic circuit through leakage, or high temperature/high pressure relief. The system can also include hydraulic pressure sensors 250 for sensing hydraulic pressure at the supply and return lines of the motors 236. It will be appreciated that the hydraulic pressure sensed by the pressure sensors 250 is representative of the load on the hydraulic motors 236. The hydraulic circuit configuration 240 can also include brakes 252 for locking the drive shafts of the hydraulic motors 236. In one example, the brakes 252 can be spring biased to a locked position, and can open by hydraulic actuators to release the drive shafts of the motors 236. When the drive shafts of the motors 236 are stopped by the brakes 252, the rotational gears 238 are prevented from rotating and the position of the main carriage 210 is locked relative to the track 102. When the brakes 252 are unlocked, the rotational gears 238 can be driven by the hydraulic motors 236 to cause propulsion of the main carriage 210. In the depicted example, the hydraulic motors 236 are bi-directional motors with fixed displacements. In alternative examples, the motors 236 can be variable displacement motors.

Referring back to FIG. 2, the second drive mechanism of the hybrid thrust and pull-back drive arrangement 200 can include at least one hydraulic cylinder device. As depicted at FIG. 2, the pull-back drive arrangement 200 includes two hydraulic cylinder devices 260. Each of the hydraulic cylinder devices 260 includes a hydraulic cylinder 262 and a piston rod 264 that axially reciprocates within the hydraulic cylinder 262. Preferably, one of the hydraulic cylinder 262 and the piston rod 264 is coupled to the main carriage 210 while the other of the hydraulic cylinder 262 and the piston rod 264 is coupled to the sub-carriage 212. As depicted, the hydraulic cylinder devices 260 are positioned on opposite sides of the drive axis 84 and are parallel to one another and are also parallel to the drive axis 84. Additionally, as depicted, the hydraulic cylinders 262 of the hydraulic cylinder devices 260 are coupled to the main carriage 210 and the piston rods 264 of the hydraulic cylinder devices 260 are coupled to the sub-carriage 212. The sub-carriage 212 is positioned at a down-hole end of the main carriage 210. With this mounting configuration, the hydraulic cylinder devices 260 can be used to propel the main carriage 210 in the thrust direction 83 by retracting the rods 264 into the hydraulic cylinders 262 while the interlock 214 is locked (e.g., in the second locked position of FIG. 5). Also, with this mounting configuration, the hydraulic cylinder devices 260 can be used to move the main carriage 210 in the pull-back direction 81 by extending the rods 264 outwardly from the hydraulic cylinders 262 while the interlock 214 is locked (e.g., in the first locked position of FIG. 3). It will be appreciated that the extension stroke of a hydraulic cylinder device provides more force capacity as compared to the retraction stroke. Thus, hydraulic cylinder devices 260 are configured to provide more force capacity in the pull-back direction 85 as compared to the thrust direction 83. This is advantageous because more force is often required when a drill string is pulled in the pull-back direction 85 during back-reaming as compared to when the drill string is pushed in the thrust direction 83 during initial drilling.

The hydraulic cylinder devices 260 are each movable along a stroke length between a fully extended position and a fully retracted position. In certain examples, the stroke length is less than or equal to 20% as long as the length of the track 102. In certain examples, the stroke length of the hydraulic cylinder devices 260 is less than or equal to 20% as long as a total distance of movement of the carriage 100 along the track 102 between the first and second ends 72, 74 of the frame 70. In certain examples, the orientation of movement of the stroke length is parallel to the length of the track 102. In other examples, hydraulic cylinder devices having stroke lengths more than 20% as long as the length of the track 120 can be used.

In the example of FIG. 2, the hydraulic cylinder devices 260 are each coupled to a common interlock 214 that simultaneously locks and unlocks both of the piston rods 264 relative to the track 102. Thus, the hydraulic cylinder devices 260 are configured to be operated together (e.g., are capable of concurrently providing force for propelling the main carriage 210 along the track 102 when the internal lock 214 is locked). Thus, the maximum drive capacity of the second drive mechanism is equal to the accumulative maximum drive capacities of all of the hydraulic cylinder devices 260 of the second drive mechanism. Similarly, it will be appreciated that the maximum drive capacity of the first drive mechanism is the cumulative value of the maximum drive capacity of all the hydraulic motors 236 of the first drive mechanism.

In certain examples, the second drive mechanism can have a maximum force capacity in the range of 0.25 to four times the maximum force capacity of the first drive mechanism. In another example, the second drive mechanism can have a maximum force capacity in the range of 0.5 to three times the maximum force capacity of the first drive mechanism. In still another example, the second drive mechanism can have a maximum force capacity in the range of 0.5 to two times the maximum force capacity of the first drive mechanism. In still another example, the maximum force capacities of each of the first and second drive mechanisms are generally the same.

In other examples, the second drive mechanism can include hydraulic cylinder devices that can be separately or independently locked and unlocked relative to the track 102. In this type of configuration, one of the hydraulic cylinder devices 260 can extend while the other hydraulic cylinder device retracts. In this way, while one of the hydraulic cylinder devices is propelling the main carriage 210 along the track 102, the other hydraulic cylinder device can be resetting so as to be ready to propel the main carriage 210 along the track 102 as soon as the other of the hydraulic cylinder devices has moved the full stroke length. In this way, the hydraulic cylinder devices can be used to move the main carriage 210 along the track in a continuous or near continuous motion with minimal to no interruptions or time delays for resetting the hydraulic cylinders.

It will be appreciated that the drilling machine 60 is operable in a thrust mode where the drilling machine is adapted to move a drill rod and a drill string coupled thereto in the thrust direction 83, and is also operable in a pull-back mode where the drilling machine is adapted to pull a drill rod and a drill string coupled thereto in the pull-back direction 85. FIG. 7 shows the rod coupler 82 of the drilling machine 60 coupled to the drill rod 34. Specifically, an up-hole end of the drill rod 34 is shown coupled to the rod coupler 82 and a down-hole end of the drill rod 34 is shown coupled to a down-hole drill rod 35 at a joint 37. It will be appreciated that when the carriage 100 is shown in the position of FIG. 7, the drilling machine 60 has either just completed a pull-back sequence for the drill rod 32, or is ready to start a thrust sequence for the drill rod 32, depending on whether the drill string is being installed in the ground or is being removed from the ground.

Figure 8:
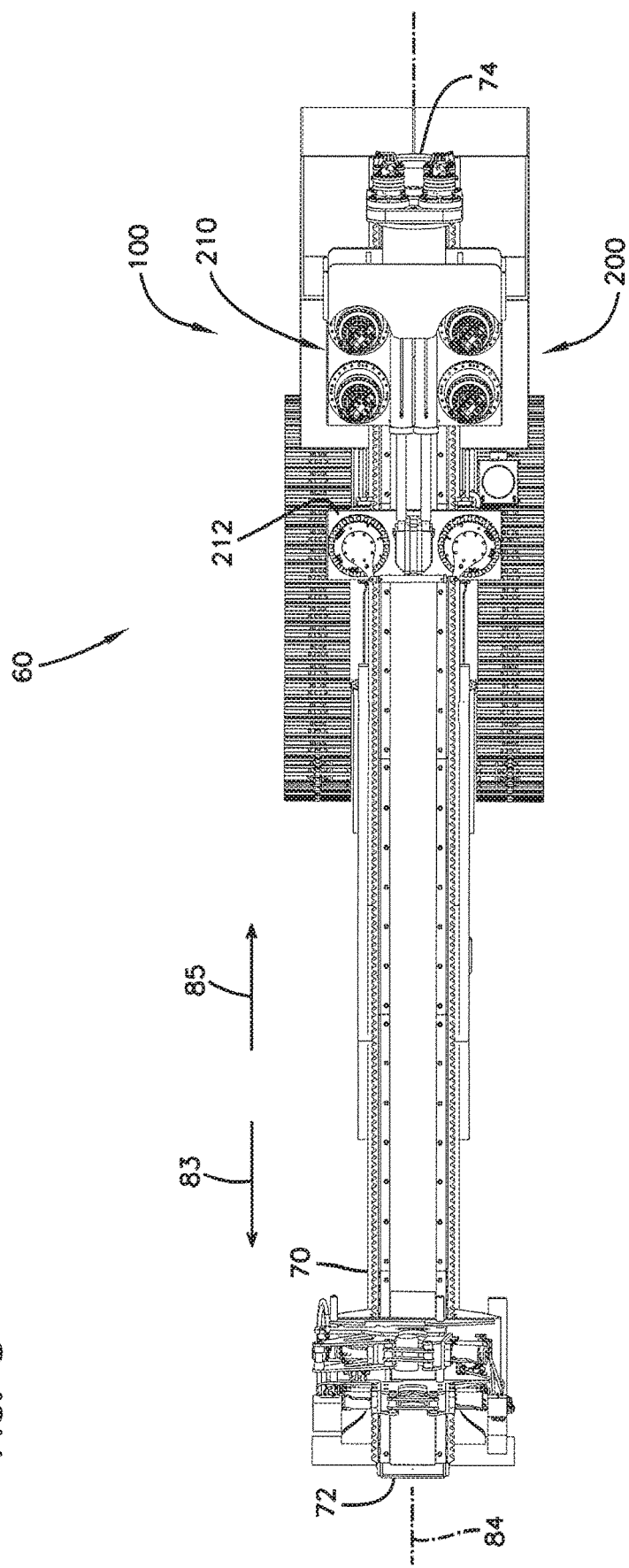
FIG. 8 is a top view of the drilling machine of FIG. 7.
Figure 9:
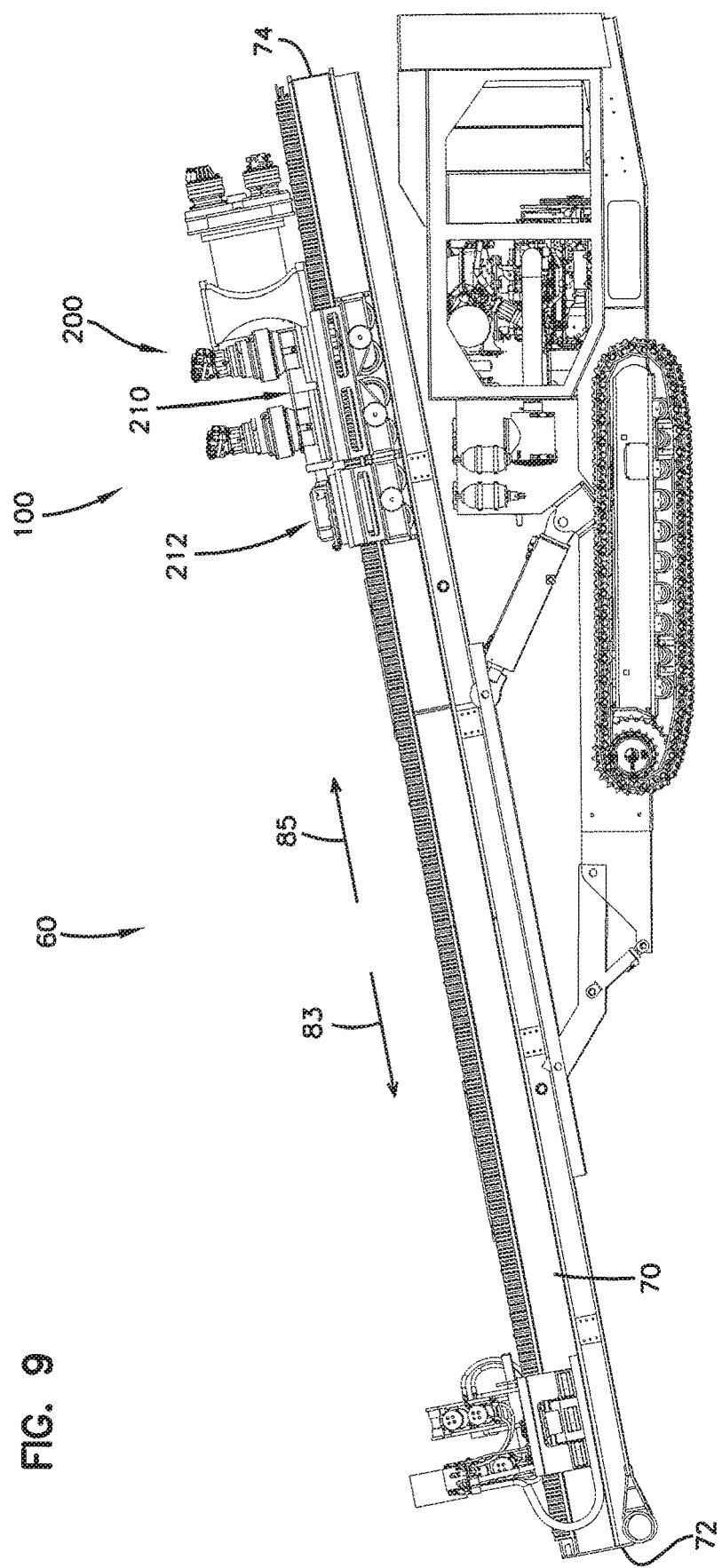
FIG. 9 is a side view of the drilling machine of FIG. 2 with a main carriage of the drilling machine moved one stroke length of the hydraulic cylinders from the position of FIGS. 7 and 8.
Figure 10:
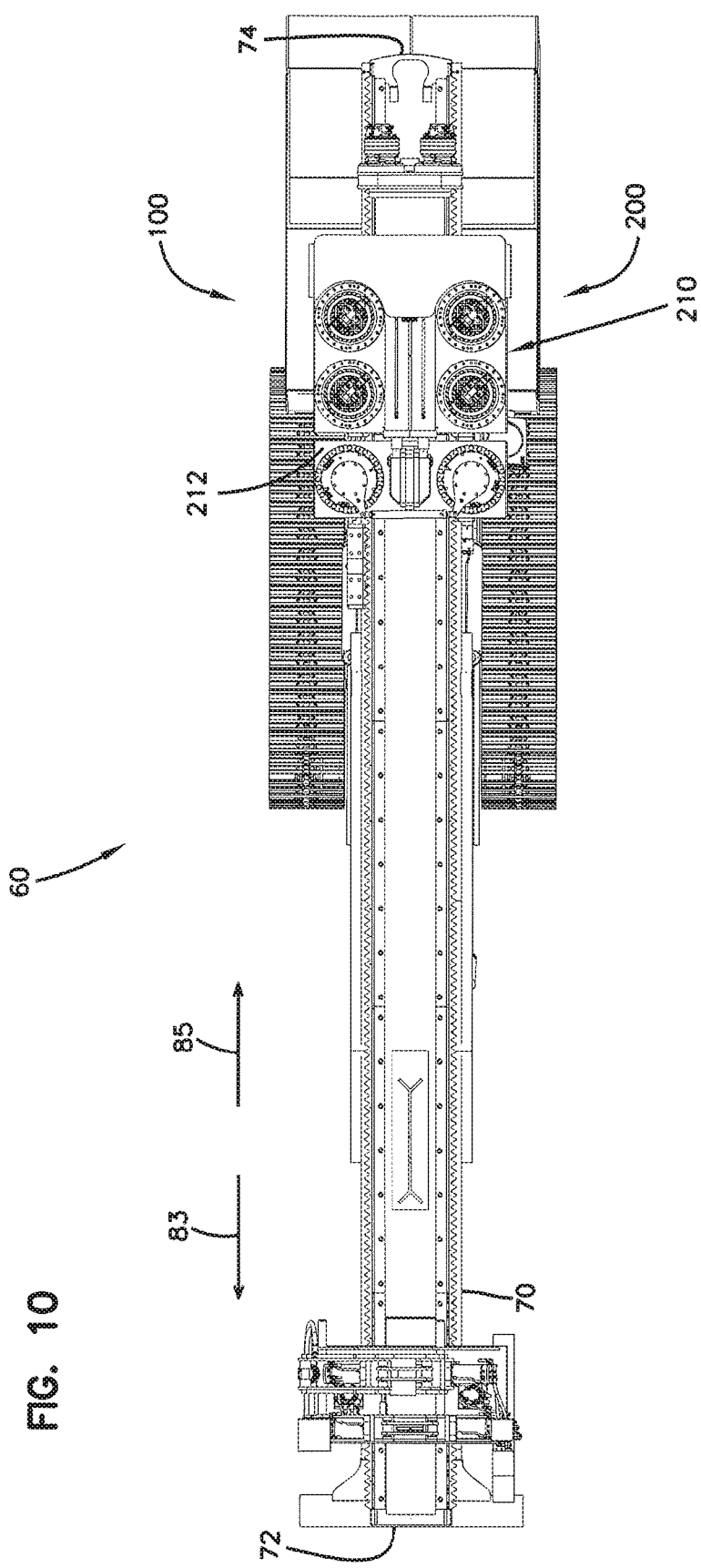
FIG. 10 is a top view of the drilling machine of FIG. 9.
Figure 11:
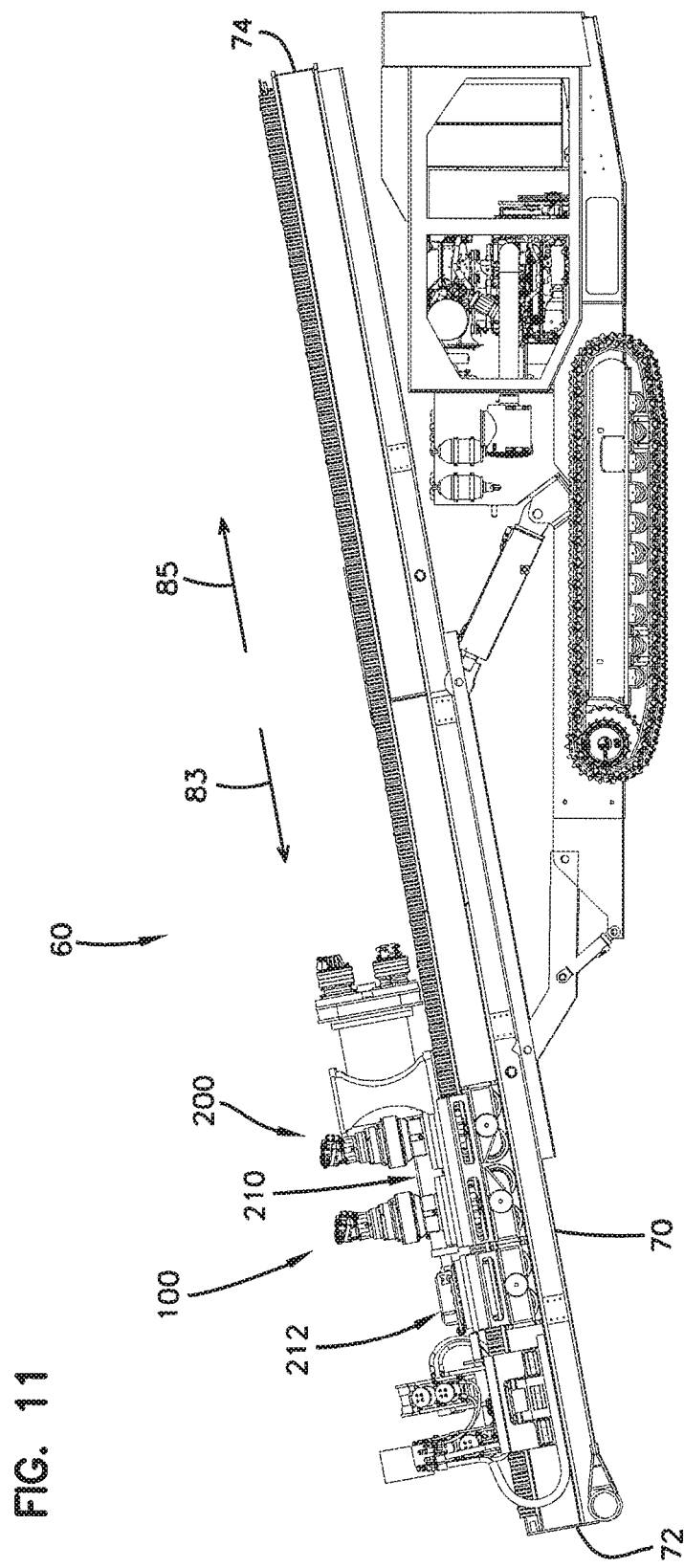
FIG. 11 is a side view showing the drilling machine of FIG. 2 with the carriage adjacent a lower end of the linear guide of the drilling machine and with hydraulic cylinders of the hybrid thrust/pull-back system retracted.
Figure 12:
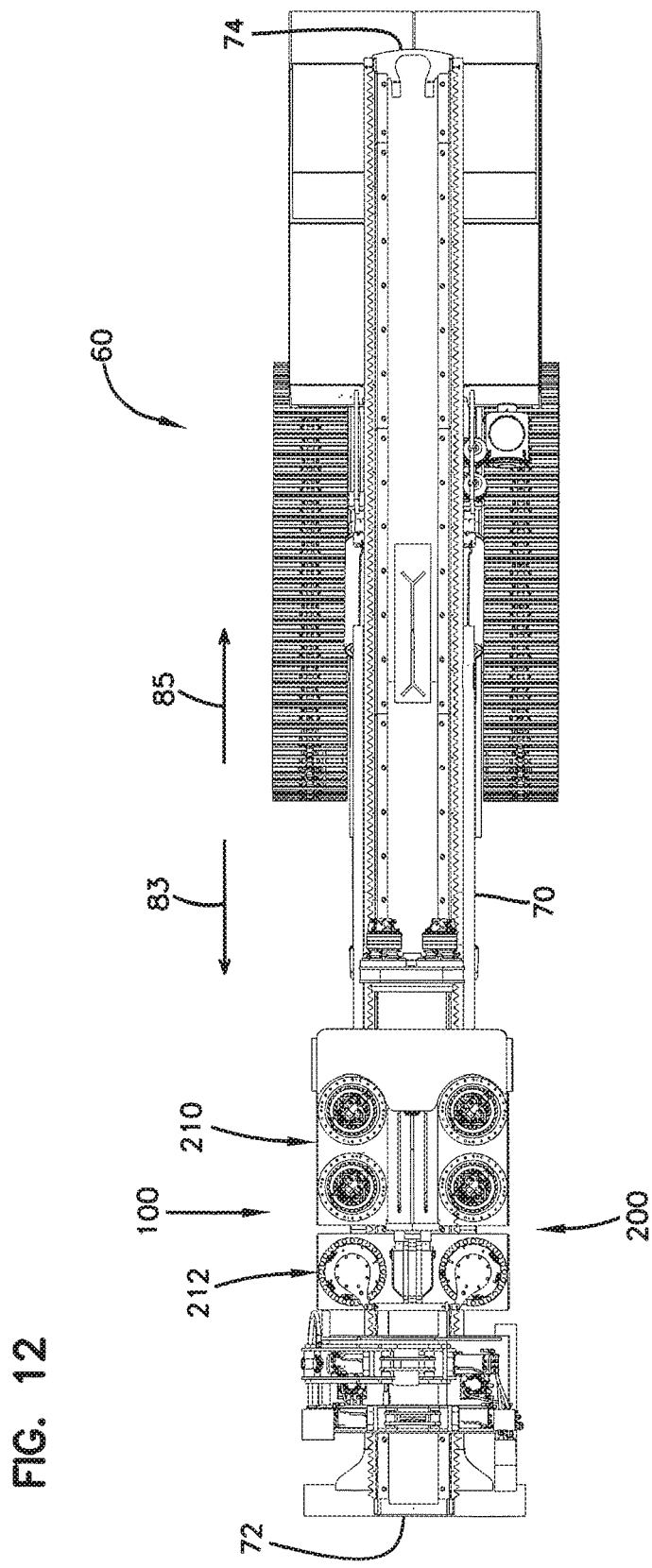
FIG. 12 is a top view of the drilling machine of FIG. 11.
Figure 13:
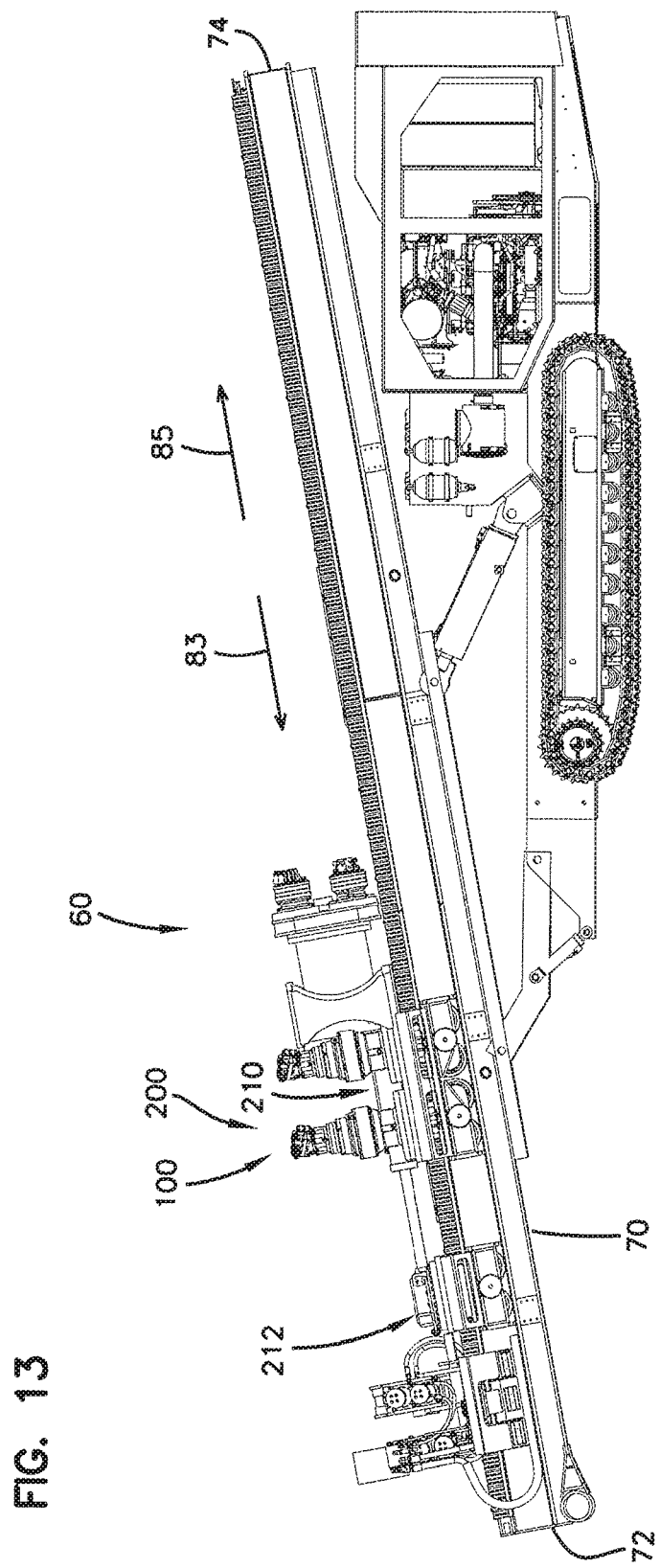
FIG. 13 is a side view of the drilling machine of FIG. 2 with a main carriage of the drilling machine moved one stroke length of the hydraulic cylinders from the position of FIGS. 11 and 12.
Figure 14:
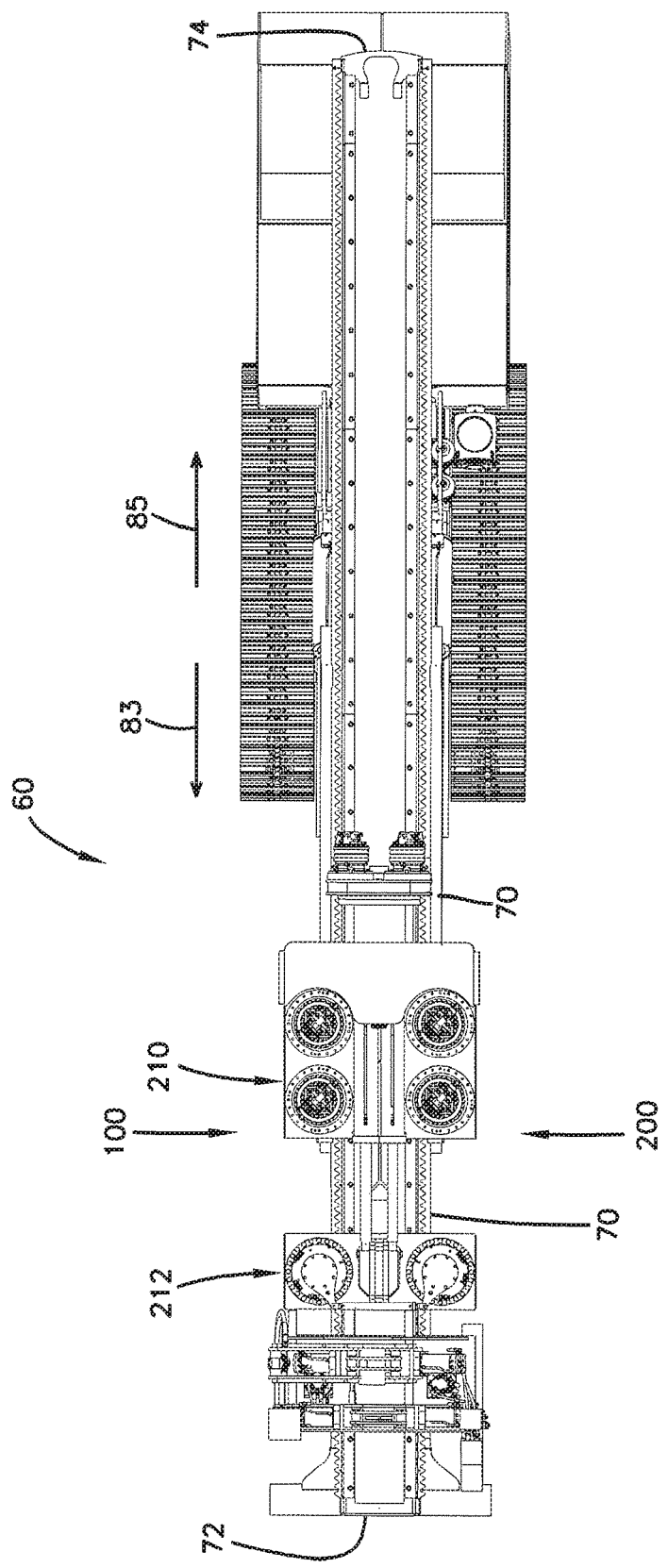
FIG. 14 is a top depiction of a control system of the drilling machine of FIG. 13.

The hydraulic cylinder devices 260 are movable along their stroke lengths between a drive-ready position and a driven position. The drive-ready position is a position in which the hydraulic cylinder devices 260 are ready to move the main carriage 210 along the track 102. The driven position corresponds to the position in which the hydraulic cylinder devices 260 have completed a stroke length in which the main carriage 210 has been moved along the track 102, and are required to be returned back to the drive-ready position before the hydraulic cylinder devices 260 can be used to again move the main carriage 210 along the track 102. It will be appreciated that which of the drive-ready position and the driven position corresponds to the extended position and the retracted position of the hydraulic cylinder devices 260 depends upon whether the drilling machine 60 is being operated in either the pull-back mode or the thrust mode. With the particular arrangement of the hydraulic cylinder devices 260 utilized by the drilling machine 60 of FIG. 2, when the drilling machine is being operated in the thrust mode, the drive-ready position corresponds to the extended position of the hydraulic cylinder devices 260 and the driven position corresponds to the retracted position of the hydraulic cylinder devices 260. In contrast, when the drilling machine is being operated in the pull-back mode, the drive-ready position corresponds to the retracted position of the hydraulic cylinder devices 260 and the driven position corresponds to the extended position of the hydraulic cylinder devices 260. Presuming the drilling machine 60 is being operated in the thrust mode, FIGS. 7 and 8 show the hydraulic cylinder devices 260 in the drive ready position, and FIGS. 9 and 10 show the hydraulic cylinder devices 260 in the driven position. Similarly, presuming the drilling machine 60 is being operated in the pull-back mode, FIGS. 11 and 12 show the hydraulic cylinder devices 260 in the drive-ready position, and FIGS. 13 and 14 show the hydraulic cylinder devices 260 in the driven position.

Figure 17:
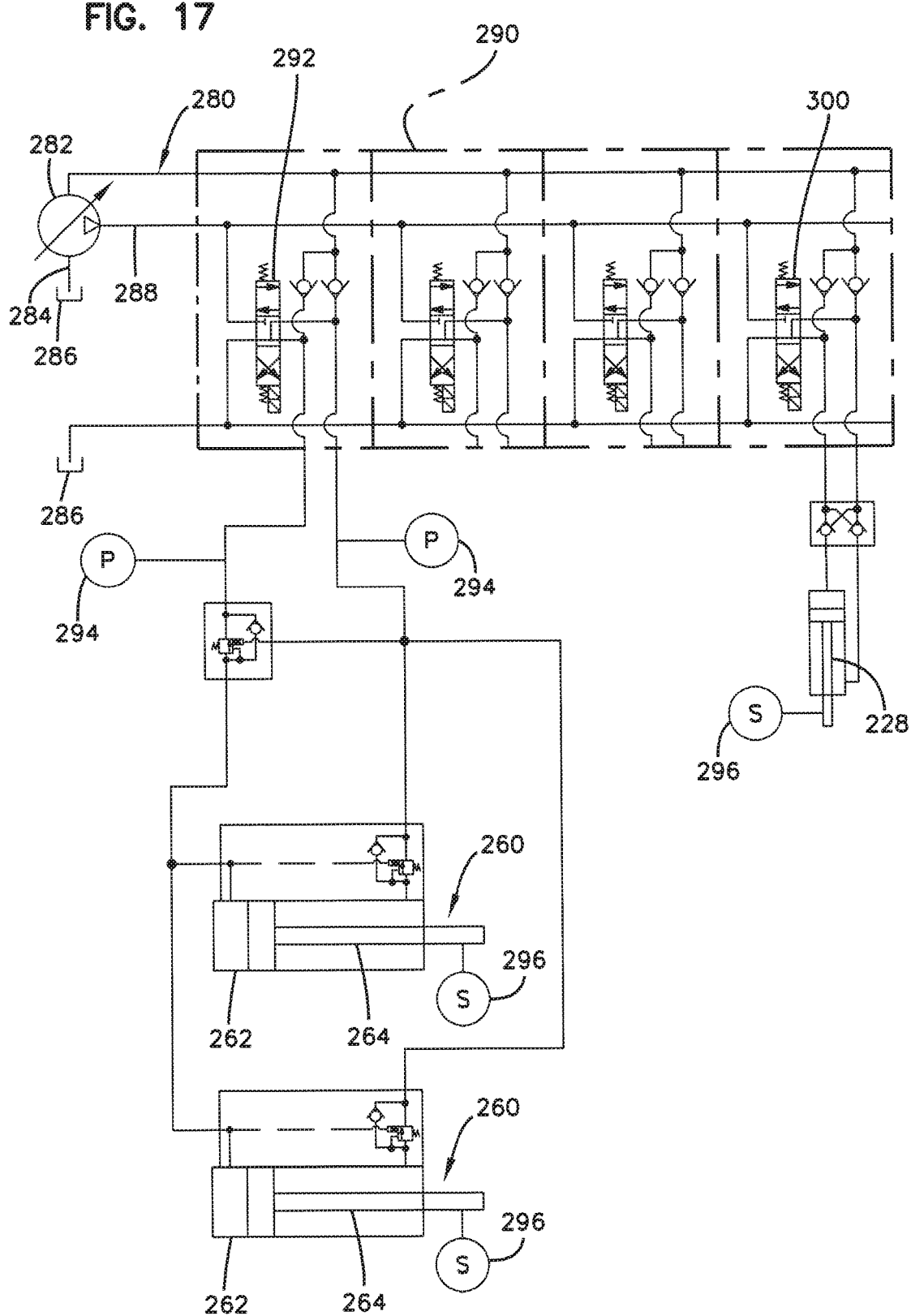
FIG. 17 schematically depicts a hydraulic circuit for powering hydraulic cylinder devices of the hybrid thrust/pull-back system of the drilling machine of FIG. 2.

FIGS. 15 and 17 show a hydraulic circuit arrangement 280 suitable for powering the second drive mechanism (e.g., the hydraulic cylinder devices 260) as well as the hydraulic cylinder device 228 configured to move the interlock 214 between the first locked position, the unlocked position, and the second locked position. The hydraulic circuit arrangement 280 includes a hydraulic pump 282. Hydraulic pump 282 can be a variable displacement pump. In the depicted example, hydraulic pump 282 is separate from the hydraulic pump 242 and is driven by the prime mover 320. As shown at FIG. 17, hydraulic pump 282 includes a low pressure side 284 in fluid communication with tank 286 (i.e., reservoir) and a high pressure side 288 selectively in fluid communication with the hydraulic cylinder device 228 and the hydraulic cylinder devices 260. A valve block 290 is positioned between the high pressure side 288 of the hydraulic pump 282 and the components powered by the hydraulic pump 282 (e.g., the hydraulic cylinder devices 260 and the hydraulic cylinder 228).

The valve block 290 includes a plurality of valves for controlling fluid communication between the hydraulic pump 282 and the components powered by the hydraulic pump 282. For example, the valve block 290 includes a three-position spool valve 292 for controlling fluid communication between the high pressure side 288 of the pump 282 and the hydraulic cylinder devices 260. The spool valve 292 can be controlled by an actuator such as a solenoid actuator or a voice coil actuator that moves the spool valve 292 between three different positions. The three positions can include: 1) a first position where fluid communication is blocked between the high pressure side 288 of the hydraulic pump 282 and the hydraulic cylinder devices 260; 2) a second position where the rod sides of the hydraulic cylinder devices 260 are placed in fluid communication with the high pressure side of the hydraulic pump 282 and the head sides of the hydraulic cylinder devices 260 are placed in fluid communication with tank; and 3) a third position in which the head sides of the hydraulic cylinder devices 260 are placed in fluid communication with the high pressure side of the hydraulic pump 282 and the rod sides of the hydraulic cylinder devices 260 are placed in fluid communication with tank.

Referring still to FIG. 17, pressure sensors 294 can be provided for monitoring the pressures at the head sides and the rod sides of the hydraulic cylinder devices 260. It will be appreciated that pressure data sensed by the sensors 294 can be representative of the axial loads on the hydraulic cylinder devices 260 and thus the axial loads on the second drive mechanism. Position sensors 296 can be used to monitor the degree of extension/retraction of each of the cylinder devices 260. The position sensors 296 can include proximity sensors, encoders (e.g., rotary encoders) or other sensors. It will be appreciated that data from the position sensors 296 can be used to determine the relative positions between the main carriage 210 and the sub-carriage 212. In certain examples, the hydraulic circuit arrangement 280 can include load sense technology by which the pressure setting at the high pressure side of the pump 282 raises and lowers to match the highest pressure requirement in the total system.

Still referring to FIG. 17, the hydraulic circuit arrangement 280 also includes a three position spool valve 300 for controlling fluid communication between the high pressure side 288 of the hydraulic pump 282 and the hydraulic cylinder device 228. Once again, the three-position spool valve 300 can be controlled by an actuator such as a solenoid or a voice coil actuator. In a neutral position, the spool valve 300 blocks fluid communication between the high pressure side 288 of the hydraulic pump 282 and the hydraulic cylinder device 228. In a first active position, the spool valve 300 places the rod side of the hydraulic cylinder device 228 in fluid communication with the high pressure side 288 of the hydraulic pump 282 and also places the head side of the hydraulic cylinder device 288 in fluid communication with tank. In a second active position, the spool valve 300 places the head side of the hydraulic cylinder 228 in fluid communication with the high pressure side 288 of the hydraulic pump 282 and also places the rod side of the hydraulic cylinder 228 in fluid communication with tank. Thus, when the spool valve 300 is in the first active position, the piston rod of the hydraulic cylinder 228 is retracted, and when the spool valve 300 is in the second active position, the piston rod of the hydraulic cylinder 228 is extended. A sensor 296 can sense the position of the hydraulic cylinder device 228 and provide data regarding whether the interlock 214 is locked or unlocked.

In certain examples, the valve block can be configured to place both the head sides and the rod sides of the hydraulic cylinder devices 260, 228 in fluid communication with tank when the spool valves are in the neutral positions. The valve block can also include additional valves for controlling the operation of additional actuators 283 (see FIG. 15) or equipment desired to be powered by the hydraulic pump 282.

The drilling machine 60 is operable in a first state where both the hydraulic cylinder devices 260 and the hydraulic motors 236 are simultaneously used to drive the main carriage 210 along the length of the track 102. When the drilling machine is operable in the first state, the interlock 214 is locked relative to the track 102. For example, if the drilling machine is operating in a pull-back mode and is concurrently operated in the first state, the interlock is preferably configured in the first locked position. In contrast, when the drilling machine 60 is in the thrust mode and is also operated in the first state, the interlock 214 is preferably positioned in the second locked position. When the drilling machine is operated in the first state, a controller 310 (see FIG. 15) is used to coordinate the simultaneous operation of the hydraulic cylinder devices 260 and the hydraulic motors 236 such that the hydraulic cylinder devices 260 and the hydraulic motors 236 drive the main carriage 210 along the track 102 at the same linear speed.

It will be appreciated that the controller 310 can be any type of known controller whether electronic or mechanical. Example electronic controllers may include computers, microprocessors, software driven controllers, firmware driven controllers, or other devices having processing capability for processing data, generating control signals and receiving sensed data. In certain examples the controller can include or interface with memory such as random access memory or read only memory.

The drilling machine 60 is also operable in second and third states. In the second state, only the hydraulic motors 236 and not the hydraulic cylinder devices 260 are used to drive the main carriage 210 along the length of the track 102.

In the second state, the interlock 214 is unlocked. In the third state, only the hydraulic cylinder devices 260 and not the hydraulic motors 236 are used to drive the main carriage 210 along the length of the track 102. In the third state, the interlock 214 is locked and the hydraulic motors 236 are not braked and are allowed to free-wheel as the main carriage 210 moves along the track 102. It will be appreciated that the main carriage 210 is capable of being driven in the thrust direction while the drilling machine 60 is operating in the first state, the second state, and the third state. Similarly, the main carriage 210 is capable of being driven in the pull-back direction while the drilling machine 60 is operating in the first state, the second state, and the third state.

It will be appreciated that the use of a hydraulic motor to drive the main carriage 210 has advantages over using hydraulic cylinders to drive the main carriage 210. For example, the hydraulic motors can be used to rapidly move the main carriage 210 over the full length of the track 102 without requiring pauses or stops for moving hydraulic cylinders back to drive-ready positions. Thus, the use of hydraulic motors to move the main carriage 210 is particularly advantageous for lower load drilling and pull-back conditions, for returning the main carriage 210 to the upper end of the drilling frame 70 during drilling operations, and for returning the main carriage 210 to the lower end of the frame 70 during pull-back operations. The use of hydraulic cylinders to drive the main carriage 210 also have advantages over using a hydraulic motor to drive the main carriage 210. For example, hydraulic cylinders are capable of providing precise slow speed operation and are capable of maintaining very controlled axial loads on the drill string. Thus, the use of hydraulic cylinders only, as in the third state, is advantageous for maintaining precise weight on bit values during drilling in harder conditions such as rocky conditions or using specialized drilling tools such as mud motors, for accurately measuring and recording pressure values during drilling, and for accurately and precisely positioning the main carriage 210 along the track 102 using automation technology.

Operation of the hydraulic motors 236 and the hydraulic cylinder devices 260 simultaneously, as in the first state, is advantageous for meeting higher load conditions during drilling or pull-back operations. For example, during the start of a drilling sequence or a pull-back sequence when the drill string is stationery, it is necessary to overcome initial static friction loads which are higher than subsequent dynamic friction loads. Therefore, control protocol can be used to automatically operate the drilling machine in the first state during the start of a drilling or pull-back sequence. Once the drill string has begun to move and the static friction has been overcome, the drilling machine can automatically switch from the first operating state to the second or third operating state. In the case where the drilling machine switches from the first state to the second state, the hydraulic cylinder devices 260 can automatically return to the drive-ready position so that the hydraulic cylinder devices will be ready in the event that higher load conditions are again encountered. In certain examples, the load on the drilling machine 60 can be monitored by the controller 310 through input provided by one or more sensors such as pressure sensors associated with the hydraulic cylinder devices 260 and/or the hydraulic motors 236. In the event the controller 310 determines that the load on the drilling machine 60 has reached a predetermined threshold, the controller 310 can automatically switch the drilling machine 60 from the second or third operating state to the first operating state to prevent the drilling machine from stalling.

In one example, the controller 310 can begin actuation of the hydraulic cylinder devices 260 before the interlock 214 is locked. For example, in preparation for switching from the second state to the first state by locking the interlock, the hydraulic cylinder devices 260 can be moved at the same linear speed that the main carriage 210 is being driven by the hydraulic motors 236 so that there is no relative movement between the sub-carriage 212 and the track 102. Once there is no relative movement between the sub-carriage 212 and the track 102, the interlock 214 can be locked.

When the drilling machine 60 is being operated in the thrust mode for pushing a drill rod into the ground, the carriage 100 is initially moved to the upper end 72 of the track 102. With the carriage 100 in the upper position, the sub-carriage 212 is moved to the drive-ready position (see FIGS. 7 and 8) in which the hydraulic cylinder devices 260 are extended and the interlock 214 is locked. The drill rod 34 is then attached to the rod coupler 82 at its upper end and is coupled to the existing drill string in the ground at its lower end. Thereafter, the controller 310 operates the drilling machine 60 in the first state in which the hydraulic motors 236 drive the main carriage 210 down the track 102 while the hydraulic cylinder devices 260 concurrently pull the main carriage 210 down the track 102 to drive the drill rod into the ground. Concurrently, the rotational driver 80 rotates the drill rod and the drill string attached thereto. Once static friction has been overcome and the axial load on the drill string is below a predetermined threshold, the controller 310 can switch the drilling machine 60 to the second state in which the interlock structure 214 unlocks from the track 102 while the hydraulic motors 236 continue to drive the main carriage 210 down the track 102. The interlock 214 preferably moves from the locked position to the unlocked position on the fly. Once the interlock 214 is unlocked, the controller 310 can automatically move the hydraulic cylinder devices 260 back to the drive-ready position (e.g., the fully extended position). In the event the axial load on the drill string does not decrease below the predetermined load threshold, the drilling machine will continue to operate in the first state where the interlock 214 is locked and the hydraulic motors 236 and the hydraulic cylinder devices 260 simultaneously drive the main carriage 210 in a down-hole direction until the hydraulic cylinder devices 260 have been fully retracted as shown at FIGS. 9 and 10. At this point, the hydraulic motors 236 are stopped, the hydraulic cylinder devices 260 are stopped, and the interlock device 214 is unlocked. Thereafter, the hydraulic cylinder devices 260 are extended to the drive-ready position, the interlock 214 is again locked, and then the process is repeated with the controller 310 operating the drilling machine in the first state to thrust the rod into the ground. This process can be repeated until the rod has been fully thrust into the ground and the system is ready for a new rod to be added to the drill string.

To implement a pull-back sequence, the drilling machine is operated in the pull-back mode and the carriage 100 is moved to the lower end 72 of the drilling frame as shown at FIGS. 11 and 12. In this position, the hydraulic cylinder devices 260 are preferably in the drive-ready positions (e.g., retracted) and the interlock 214 is locked. The upper end of the uppermost rod in the drill string is preferably connected to the rod coupler 82. Thereafter, the controller 310 preferably activates the rotational driver 80 which rotates the drill string. Concurrently, the controller 310 operates the drilling machine 60 in the first state in which both the first and second drive mechanisms are used to force the main carriage 210 in the pull-back direction 85 up the track 102. Specifically, both the hydraulic motors 236 and the hydraulic devices 260 are used to concurrently force the main carriage 210 in the pull-back direction 85. The hydraulic cylinder devices 260 are extended to push the main carriage 210 in the pull-back direction and the interlock 214 remains locked relative to the frame. As the main carriage 210 is moved in the pull-back direction, the controller 310 monitors axial load on the system. In the event the axial load decreases below a predetermined level, the controller 310 can switch the drilling machine 60 from the first state to the second state in which only the hydraulic motors 236 continue to propel the main carriage 210 in the pull-back direction. In the event the controller 310 switches the drilling machine 60 to the second state, the controller 310 unlocks the interlock 214 on the fly and the cylinder devices 260 are caused to move back toward the drive-ready position (e.g., a retracted position) by the controller 310. In the event the monitored axial load on the system does not decrease below the predetermined level, the controller 310 continues to operate the drilling machine in the first state until the hydraulic cylinder devices 260 reach the driven position (i.e., the fully extended position). Once the hydraulic cylinder devices 260 reach the driven position while the system load remains above the predetermined threshold, the controller 310 stops the hydraulic motors 236 and brakes the hydraulic motors. Additionally, the interlock 214 is unlocked and the hydraulic cylinder devices 260 are returned to the drive-ready position (e.g., fully retracted). Once the hydraulic cylinder devices 260 are in the drive-ready position, the above described process is repeated to continue to pull the drill string from the ground. It will be appreciated that this process is repeated until the carriage 100 reaches the upper end 74 of the frame 70 and the uppermost drill rod has been fully removed from the ground.

FIG. 15 is a schematic diagram showing how the controller 310 interfaces with various components of the drilling machine 60. Specifically, the controller 310 can interface with the prime mover 320, and each of the different hydraulic pumps 192, 242, and 282. Specifically, the controller 310 can actuate and de-actuate each of the hydraulic pumps 192, 242, 282 and can control the flow output of each of the hydraulic pumps 192, 242, 282. Additionally, controller 310 interfaces with the actuators of the valve block 290 to control the positions of the various valves within the valve block 290. In this way, the controller controls operation of the hydraulic cylinder devices 260 as well as the hydraulic cylinder device 228. The controller 310 also controls the flow direction of the bi-directional pumps of the hydraulic circuit 240 for the hydraulic motors 236 as well as the hydraulic circuit 190 for the hydraulic motors 81 of the rotational driver 80. The controller 310 also interfaces with pressure sensors 250 corresponding to the first drive mechanism and pressure sensors 294 corresponding to the second drive mechanism. The first pressure sensors 250 can sense pressure on the high and low pressure sides of the hydraulic motors 236 so as to sense a pressure reading representative of load on the hydraulic motors which is representative of axial load on the drill string. Similarly, the controller can interface with pressure sensors 294 that sense hydraulic pressure at the piston rod side and piston head sides of the hydraulic cylinder devices 260. Such readings are representative of load on the hydraulic cylinder devices 260 and axial load on the drill string. The controller 310 can save sensed pressure data in memory for later analysis and for development of improved drilling protocol. Additionally, the controller 310 can use the sensed pressure data to maintain a desired weight-on bit at the end of the drill string. The controller also interfaces with position sensors 296 that sense the relative positions of the main carriage 210 and the sub-carriage 212, and also can sense the actual positions of the main carriage 210 and the sub-carriage 212 along the length of the track 102. Data from the position sensors 296 can be used to determine whether the hydraulic cylinder devices 260 are in the drive-ready or driven positions, it can be used for precise positioning of the main carriage 210 in an automated system. Sensors 296 can also provide data regarding the position of the hydraulic cylinder device 228 and whether the interlock 214 is locked or unlocked.

Figure 18A:
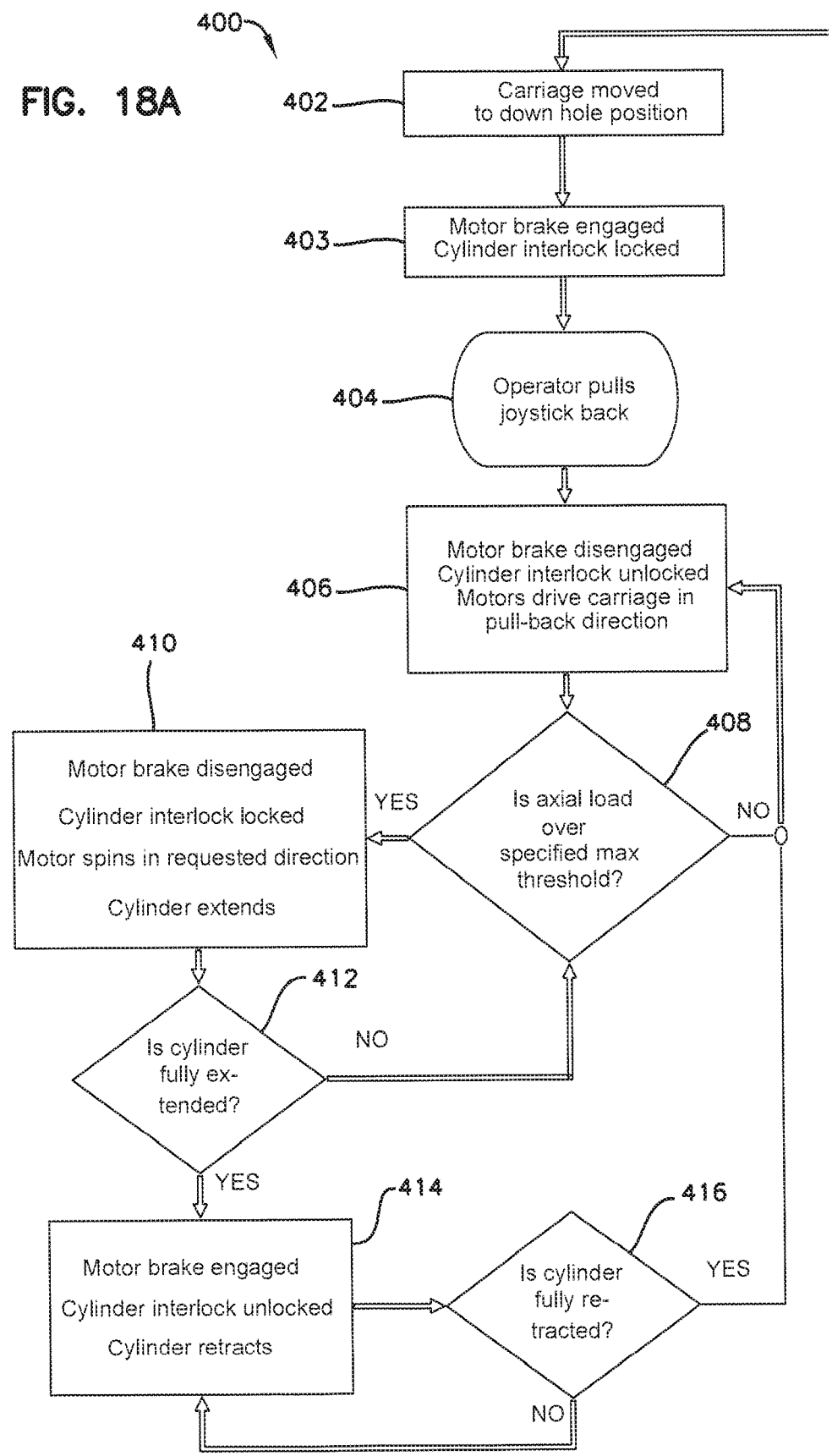
FIGS. 18a-18c are enlargements of portions of FIG. 18.
Figure 18B:
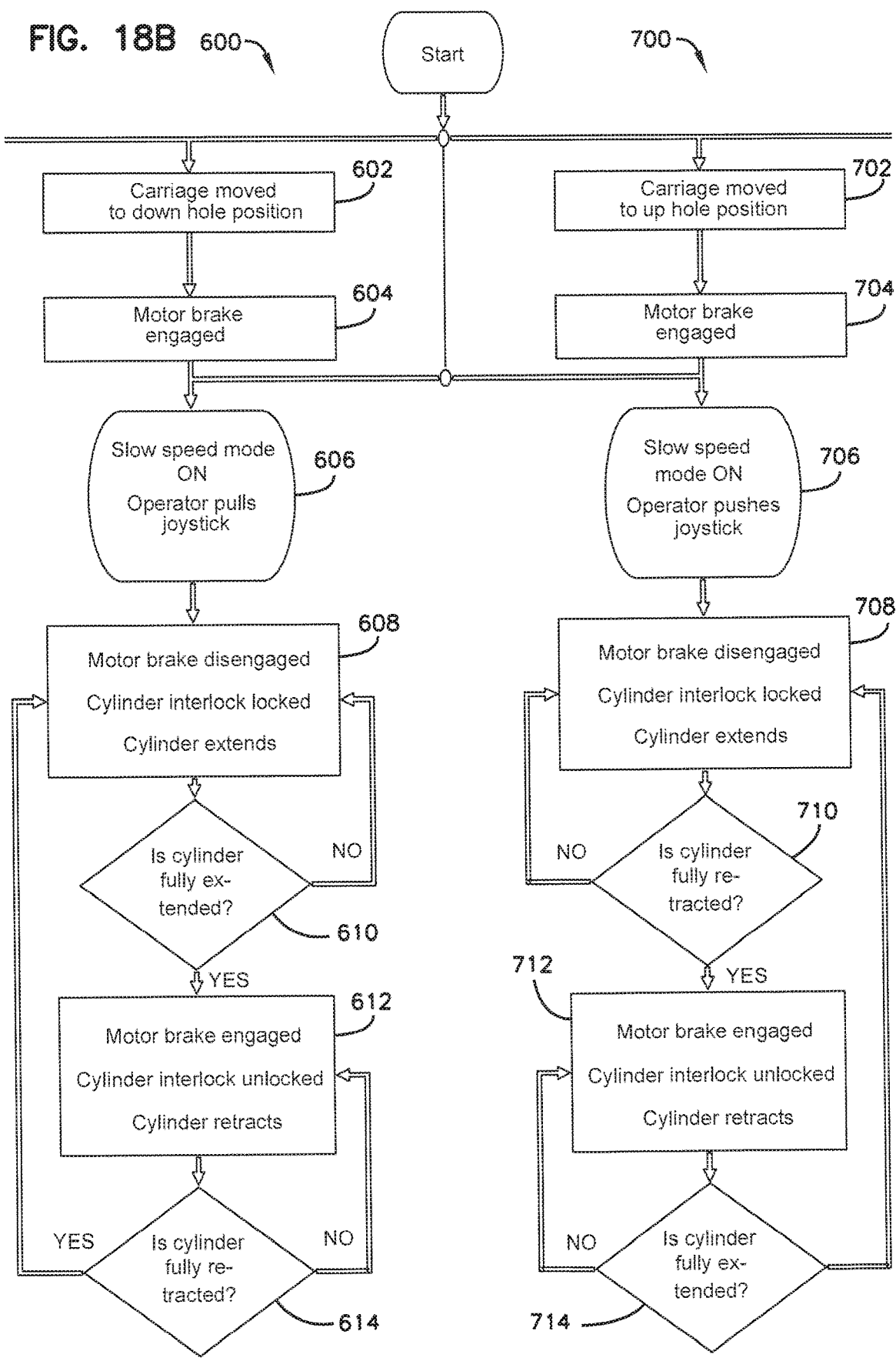
Figure 18C:
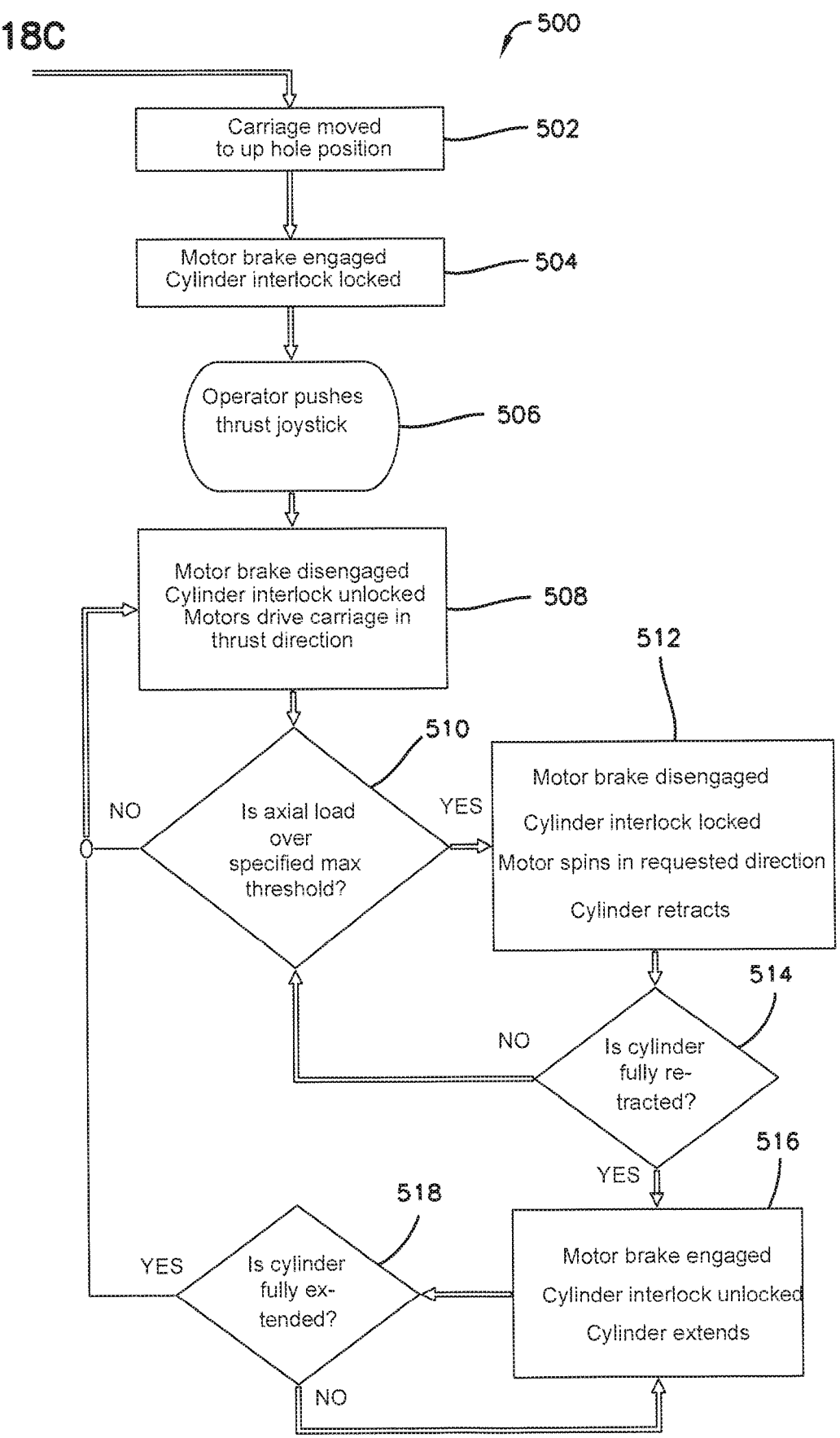

FIG. 18 and FIGS. 18A-18C show example control logic protocol for operating the drilling machine 60. Control logic sequence 400 shown at FIG. 18A represents a sequence for controlling pull-back of a drill rod from the ground where the controller 310 automatically switches the operation of the drilling machine 60 between the first operating state and the second operating state depending upon axial load on the system. Control logic sequence 500 shown at FIG. 18C represents a sequence for controlling thrusting of a drill rod into the ground where the controller 310 automatically switches the operation of the drilling machine 60 between the first operating state and the second operating state depending upon axial load on the system. Control logic sequences 600 and 700 (see FIG. 18B) show logic for operating the drilling machine in the third operating state to either pull-back a drill rod (see sequence 600) or push a drill rod into the ground (see sequence 700).

Referring to FIG. 18A, the control sequence 400 begins at step 402 where the carriage 100 is initially moved to the down-hole position of FIGS. 11 and 12 with the hydraulic cylinder devices 260 retracted. Once the carriage 100 is in the down-hole position, the drill string is coupled to the rod coupler 82 of the rotational driver 80. While in the down-hole position, the brakes 252 of the hydraulic motors 236 are engaged (see step 403) and the interlock 214 is locked relative to the frame as shown at block 402. The operator then actuates one or more control elements (e.g., pulls back on a joystick) as shown at step 404 to initiate pulling back of the drill string by the hybrid drive system and rotation of the drill string by the rotational driver 80. When the operator actuates the control element, the controller 310 operates the drilling machine 60 in the second state by disengaging the thrust motor brakes 252, unlocking the interlock 214, rotating the drill string with the rotational driver 80, and powering the hydraulic motors 236 to propel the drill string in the pull-back direction (see step 406). The controller 310 then, at step 408, monitors whether the axial load is over a predetermined threshold (e.g., by monitoring motor pressure). If the axial load is below the predetermined threshold, the protocol return to step 406. In contrast, if the pressure is over the maximum threshold pressure, the protocol proceeds to step 410 in which the controller 310 switches operation of the drilling machine 60 from the second state to the first state in which the hydraulic cylinder devices 260 and the hydraulic motors 236 work together to concurrently drive the main carriage 210 in the pull-back direction. In the first state, the thrust motor brakes are disengaged, the interlock 214 is locked, the hydraulic motors 236 propel the main carriage 210 in the pull-back direction, and the hydraulic cylinder devices 260 extend to push the main carriage 210 in the pull-back direction. As the system operates in the first state, the controller 310 monitors whether the hydraulic cylinder devices 260 have been fully extended (i.e., moved to the driven positions) at step 412. If the hydraulic cylinder devices 260 have not been moved fully to the driven positions, the control logic proceeds back to step 408 to determine whether the axial load is over the maximum threshold value. If the hydraulic cylinder devices 260 have reached the driven positions (i.e., the fully extended positions), control logic proceeds to step 414 where the hydraulic motors 236 are stopped, the brakes 252 for the hydraulic motors 236 are engaged, the interlock 214 is unlocked and the hydraulic cylinder devices 260 are returned to the drive-ready position (e.g., retracted). As shown at step 416, retraction of the hydraulic cylinder devices 260 continues until the hydraulic cylinder devices have been fully retracted. Thereafter, the control logic proceeds back to step 406 where the drilling unit where pulling back of the drill string is resumed by operating the drilling machine 60 in the second state.

Referring to FIG. 18C, the control sequence 500 begins at step 502 where the carriage 100 is moved to the up-hole position of FIGS. 7 and 8. In this position, the hydraulic cylinder devices 260 are extended to the drive-ready position for applying thrust to the main carriage 210. As shown at step 504, the brakes 252 of the hydraulic motors 236 are engaged and the interlock 214 engages the track 102. Additionally, with the carriage 100 at the up-hole position on the track 102, a drill rod desired to be pushed into the ground is attached at its upper end to the rod coupler 82 of the rotational driver 80 and is coupled to the existing drill string or a drill head at its lower end. At step 506, an operator actuates on or more control elements (e.g., pushes a joystick forward) to start the thrusting process and to initiate rotation of the drill rod by the rotational driver 80. Once the step 506 has been initiated, the brakes 252 of the hydraulic motors 236 are disengaged, the interlock 214 is unlocked and the drilling machine 60 is operated in the second state in which only the hydraulic motors 236 are used to drive the carriage in the thrust direction 83 (see step 508). At step 510, the controller 310 monitors axial load on the system. If the monitored load is less than a predetermined threshold value, control logic proceeds back to step 508. If the monitored axial load reaches or exceeds the predetermined threshold, control logic proceeds to step 512 where the controller 310 switches operation of the drilling machine 60 from the second state to the first state. In the first state, the brakes 252 of the hydraulic motors 236 remain disengaged, the interlock 214 is locked, the hydraulic motors 236 continue to drive the main carriage 210 in the thrust direction 83, and the hydraulic cylinder devices 260 are actuated to assist in driving the main carriage 210 in the thrust direction 83. As the hydraulic cylinder devices 260 retract (i.e., move toward the drive position), the controller 310 monitors the position of the hydraulic cylinder devices 260 (see step 514). If the hydraulic cylinder devices 260 have not reached the driven positions, control logic proceeds back to step 510. In contrast, when the hydraulic cylinder devices 260 have fully reached the retracted positions, control logic proceeds to step 516. At step 516, the brakes of the hydraulic motors 236 are actuated, the interlock 214 is unlocked, and the hydraulic cylinder devices 260 are extended toward the drive-ready position. As the hydraulic cylinders devices 260 move toward the drive-ready position, the controller 310 monitors the position of the hydraulic cylinders as shown at step 518. If the hydraulic cylinders 260 have not reached the drive-ready position, control logic proceeds back to step 516. If the hydraulic cylinder devices 260 have reached the drive-ready position, then control logic proceeds back to step 508.

As indicated above, control logic sequences 600 and 700 show logic for operating the drilling machine in the third operating state to either pull-back a drill rod (see sequence 600) or push a drill rod into the ground (see sequence 700). When the drilling machine 60 is operated in a third state, only the hydraulic cylinder devices 260 are used to move the main carriage 210 along the track 102, and the hydraulic motors 236 are not used (e.g., the hydraulic motors 236 can free-wheel with the brakes 252 disengaged as the main carriage 210 is moved by the hydraulic cylinder devices 260).

Sequence 600 is a control sequence for pulling back a drill rod from the ground while operating the drilling machine 60 in the third operating state (e.g., the operating state can also be referred to as a slow-speed mode). At step 602, the carriage 100 is moved to the down-hole position adjacent the lower end 72 of the frame 70 as shown at FIGS. 11 and 12. Preferably, in this position, the hydraulic cylinder devices 260 are retracted so as to be in the drive-ready position for pull-back purposes. At step 604, the brakes of the hydraulic motors 236 are engaged and the interlock 214 is locked. At this stage, the upper end of the uppermost drill rod of the drill string can be coupled to the rod coupler 82 of the rotational driver 80. At step 606, the operator can switch the drilling machine to the third operating state, and can actuate one or more control elements to initiate extension of the hydraulic cylinder devices 260 to apply pull-back load to the drill string, and to also initiate rotation of the drill string by the rotational driver 80 during back reaming. Once step 606 has been implemented, the brakes of the hydraulic motors 236 are disengaged, the interlock 214 is locked, and the hydraulic cylinder devices 260 are extended (see step 608). At step 610, the controller 310 monitors whether the hydraulic cylinder devices 260 have been fully extended. If the hydraulic cylinder devices have not been fully extended, control logic proceeds back to step 608. If the hydraulic cylinder devices 260 have been fully extended, logic proceeds to step 612. At step 612, the brakes of the hydraulic motors 236 are engaged, the interlock 214 is unlocked and the hydraulic cylinder devices 260 are retracted to return the hydraulic cylinder devices 260 to the drive ready positions. The controller monitors the position of the hydraulic cylinder devices 260 at step 614. If the hydraulic cylinder devices 260 have not been fully retracted, control logic proceeds back to step 612. Once the hydraulic cylinder devices 260 have been fully retracted, control logic proceeds back to step 608.

The control logic sequence 700 relates to a process for controlling propulsion of a drill rod into the ground while the device is operated in the third state in which only the hydraulic cylinder devices 260 are used to move the main carriage 210. At step 702, the carriage 100 is moved to the upper end of 74 of the frame 70 as shown at FIGS. 7 and 8. In this position, the hydraulic cylinder devices 260 are preferably in the extended orientation so as to be drive-ready for applying thrust to the main carriage 210. In this position, the brakes of the hydraulic motors 236 are engaged (see step 704) and the interlock 214 is locked. Additionally, an up-hole end of a drill rod desired to be driven in the ground is attached to the rod coupler 82 of the rotational driver and a down-hole end of the rod is coupled to an upper end of the up-hole most drill rod of the drill string already in the ground or to a drill head. At step 706, the operator actuates a control element to set the drilling machine to the third operational state. Additionally, the operator can actuate one or more control elements to initiate thrusting of the drill string by the hydraulic cylinder devices 260 as well as rotation of the drill string by the rotational driver 80. Once step 706 has been initiated, the brakes 252 of the hydraulic motors 236 are disengaged, the interlock 2014 is locked and the hydraulic cylinder devices 260 are retracted to move the main carriage 210 in the thrust direction 83 (see step 708). As the hydraulic cylinder devices 260 retract, the controller 310 monitors the position of the hydraulic cylinder devices 260 as shown at step 710. If the hydraulic cylinder devices 260 have not been fully retracted, control logic proceeds back to step 708. In contrast, once the hydraulic cylinder devices 260 have been fully retracted, control logic proceeds to step 712 where the brakes of the hydraulic motors 236 are engaged, the interlock 214 is disengaged, and extension of the hydraulic cylinder devices 260 is initiated to move the hydraulic cylinder devices 260 back to the drive-ready position for thrusting. As the hydraulic cylinder devices 260 are returned to the drive-ready position, the degree of extension is monitored by the controller as shown at step 714. If the hydraulic cylinder devices 260 are not fully extended, control logic proceeds back to step 712. In contrast, once the hydraulic cylinder devices 260 have been fully extended, control logic proceeds to back to step 708.

As used herein, actuators can include pneumatic and hydraulic cylinders, screw drives, electric, hydraulic and pneumatic motors and like devices. As used herein, terms such as upper, lower, up-hole and down-hole are relative terms that have been used to assist in describing the relative positioning of certain parts of components. For a component that is above ground, an upper portion of such component is positioned farther from the launch point 24 of the drilling machine as compared to a relative lower portion. Similarly, for a component that is positioned above ground, an up-hole portion of the component is positioned farther from the launch point of the drilling machine as compared to a down-hole portion of the component. Drilling machines herein can include an operator interface 321 (see FIG. 15) such as a control panel that interfaces with the controller 310. The operator interface can include control elements such as switches, buttons, joysticks, levers, dials, etc. for allowing the operator to direct/input control signals to the controller 310 for switching the drilling machine between the different modes and operational states, for initiating and terminating pull-back and thrust operations, for controlling the rotational speed and rotational direction of the rotational driver, and for adjusting pull-back and thrust loading on the drill string, among other things.

Figure 19:
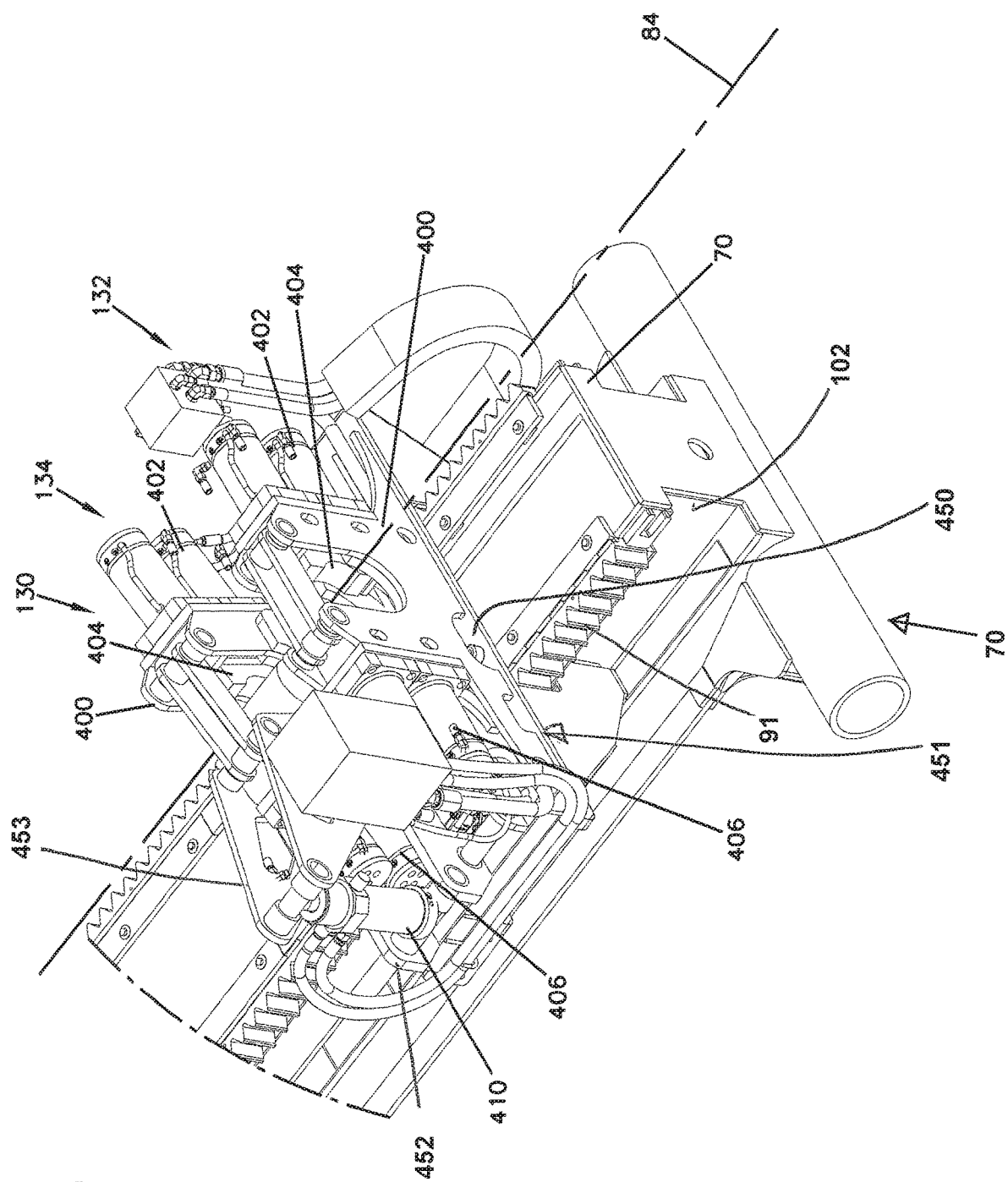
FIG. 19 is a front, right perspective view of the vise system used by the drilling machine of FIG. 2.
Figure 20:
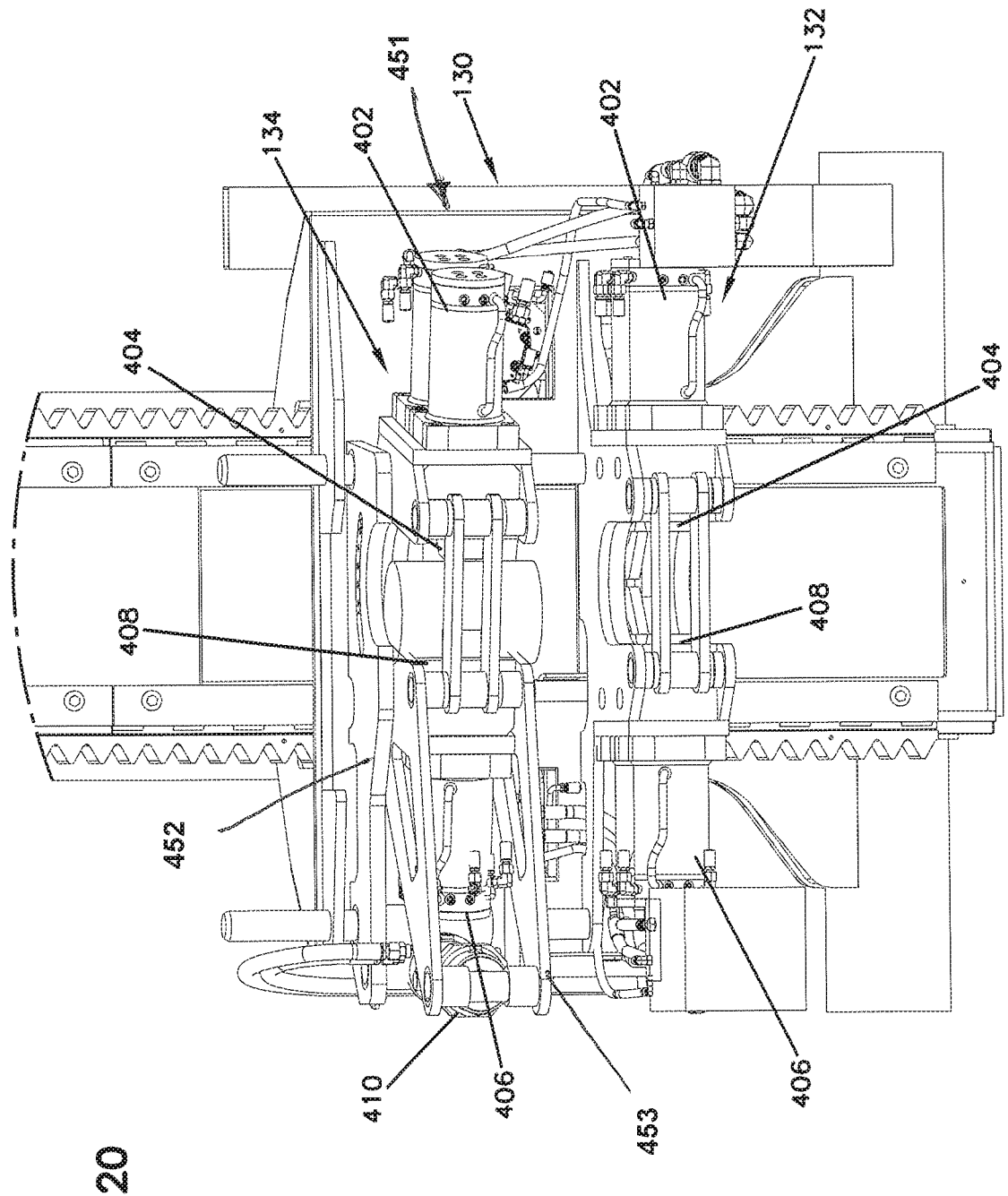
FIG. 20 is a top perspective view of the vise system of FIG. 19.
Figure 21:
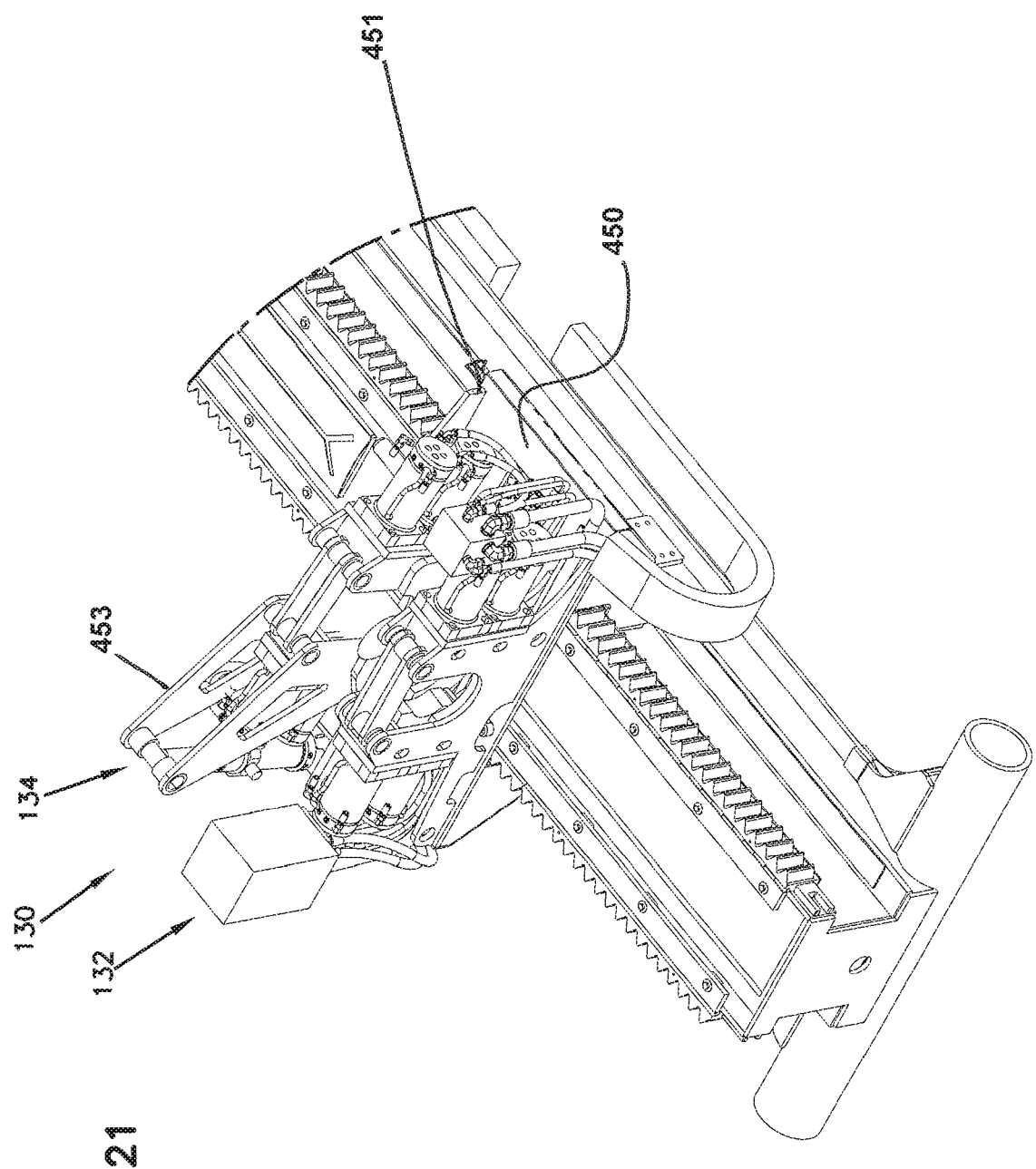
FIG. 21 is a front, left perspective view of the vise system of FIG. 19.

FIGS. 19-21 depict the vise arrangement 130. As previously indicated, the vise arrangement 130 includes a first rod vise 132 (e.g., a lower rod vise) and a second rod vise 134 (e.g., an upper rod vise). In certain examples, the first and second rod vises 132, 134 can be moveable up and down the track 102 of the drill frame 70 along the drive axis 84. For example, in the depicted example, the first and second rod vises 132, 134 are mounted on a support plate 450 of a vise carriage 451 mounted on the track 102. In certain examples, the carriage 451 can include rollers or other structures for facilitating moving the carriage 451 along the track 102. In certain examples, the carriage 451 can be manually moved along the track 102, or can have a drive mechanism for moving the carriage 451 along the track 102. In certain examples, the drive mechanism can include a hydraulic motor that drives a gear or gear arrangement (e.g., a pinion gear or pinion gear arrangement) which intermeshes with the rack structure 91. The carriage 451 can include a locking structure for locking the carriage 451 at a desired positioned along the track 102. It will be appreciated that the locking structure can include a latching arrangement adapted to engage the rack structure 91 or other part of the drill frame 70. In one example, the latching arrangement can include a rack interlock such as the interlock 214. In another example, where a hydraulic motor is provided for moving the carriage 451 along the track, the carriage 451 can be locked in place along the track 102 by locking the drive gear or gear arrangement intermeshing with the rack thereby preventing the drive gear or gear arrangement from rotating and concurrently preventing movement of the carriage 451 along the track 102. In one example, the drive gear or gear arrangement can be locked by hydraulically locking the hydraulic drive motor.

The first and second rod vises 132, 134 each include a vise frame 400 supporting at least one left vise cylinder 402 coupled to a left vise jaw 404 and at least one right vise cylinder 406 coupled to a right vise jaw 408. The left and right vise jaws 404, 408 oppose each other. By extending the left and right vise cylinders 402, 406, the left and right vise jaws 404, 408 are moved toward each to a closed position in which a drill rod is adapted to be gripped or clamped between the left and right vise jaws 404, 408. By retracting the left and right vise cylinders 402, 406, the left and right vise jaws 404, 408 are moved away from each toward an open position in which a drill rod is adapted to be received between the left and right vise jaws 404, 408. The vise frame 400 of the first rod vise 132 is mounted on the support plate 450 of the carriage 451. The vise frame 400 of the second rod vise 134 is pivotally mounted to a sub-frame 452 mounted on the support plate 450 of the carriage 451. The pivotal connection provided by the sub-frame 452 allows the vise frame 400 of the second rod vise 134 to pivot relative to the drill frame 70 about a drive axis 84 of the rotational driver 80. The vise frame 400 of the second rod vise 134 includes a pivot arm 453. A pivot hydraulic cylinder 410 is coupled between the pivot arm 453 of the second rod vise 134 and the support plate 450 of the carriage 451. By extending the pivot hydraulic cylinder 410, the vise frame 400 of the second rod vise 134 is pivoted in a first pivot direction relative to the carriage 451 and the drill frame 70 about the drive axis 84. By retracting the pivot hydraulic cylinder 410, the vise frame 400 of the second rod vise 134 is pivoted in a second pivot direction relative to the carriage 451 and the drill frame 70 about the drive axis 84.

It will be appreciated that the vise arrangement 130 can be used to make (i.e., tighten) threaded joints between drill rods and can also be used to break (e.g., loosen) threaded joints between drill rods. It will be appreciated that joints between drill rods are typically tightened during drilling operations as drill rods are added to a drill string, and are typically loosened during pull-back operations as drill rods are removed from the drill string. Threaded joints can normally or typically be tightened by using the rotational driver 80. For example, a down-hole rod can be clamped by the first vise 132, and the rod to be added can be rotated by the rotational drive to make a threaded connection between the lower end of the new rod and the upper end of the down-hole rod. It will be appreciated that the threaded joint between the rotational driver 80 and the upper end of the up-hole drill rod is concurrently tightened during the tightening process. Joint tightening by the rotational driver 80 can continue until the hydraulic pressure in the rotational driver reaches a predetermined value corresponding a suitably tight joint. Thereafter, the first vise 132 can release the down-hole rod and drilling can continue.

If desired, the vises 132, 134 can be used to further tighten a threaded joint between first and second drill rods (e.g., a down-hole rod and a newly added up-hole rod) which was initially threaded up by the rotational driver 80. To tighten a threaded joint between first and second drill rods, the first and second rod vises 132, 134 are opened and the drill rods are positioned within the vise arrangement 130 such that the up-hole drill rod is positioned between the vise jaws 404, 408 of the second rod vise 134 and the down-hole drill rod is positioned between the vise jaws 404, 408 of the first rod vise 132. The first and second vises 132, 134 are then closed such that the vise jaws 404, 408 of the second rod vise 134 clamp on the up-hole drill rod and the vise jaws 404, 408 of the first rod vise 132 clamp on the down-hole drill rod. Once the first and second rod vises 132, 134 are closed, the pivot hydraulic cylinder 410 rotates the second rod vise 134 in a first direction about the drive axis 84 while the first rod vise 132 does not rotate thereby causing the threaded joint between the up-hole and down-hole drill rods to tighten to a level where the joint will not uncouple during drilling.

To break a threaded joint between adjacent up-hole and down-hole drill rods during pull-back operations, the drill rods are oriented within the vise arrangement 130 with the up-hole drill rod between the left and right vise jaws 404, 408 of the second rod vise 134 and the down-hole drill rod positioned between the left and right vise jaws 404, 408 of the first rod vise 132. The rod vises 132, 134 are then closed to clamp the drill rods between the vise jaws 404, 408. Thereafter, the second rod vise 134 is pivoted by the pivot hydraulic cylinder 410 in a second rotational direction about the drive axis 84. The second rotational direction is opposite as compared to the first rotational direction. As the second rod vise 134 is rotated in the second rotational direction about the drive axis 84, the first rod vise 132 remains fixed. In this way, the threaded connection between the drill rods is loosened. The rotational driver 80 can then be used to fully unthread the joint.

The vise arrangement 130 can also be used to assist in breaking joints between drill rods and the rotational driver 80. For example, the upper rod vise 134 can clamp on the rod being removed and the rotational driver 80 can be used to break and unthread the joint. In certain examples, the upper rod vise 134 can be pivoted to break the joint while the rotational driver 80 is hydraulically locked or operated to rotate the rod coupler in an opposite direction from the upper rod vise 134.

Figure 22:
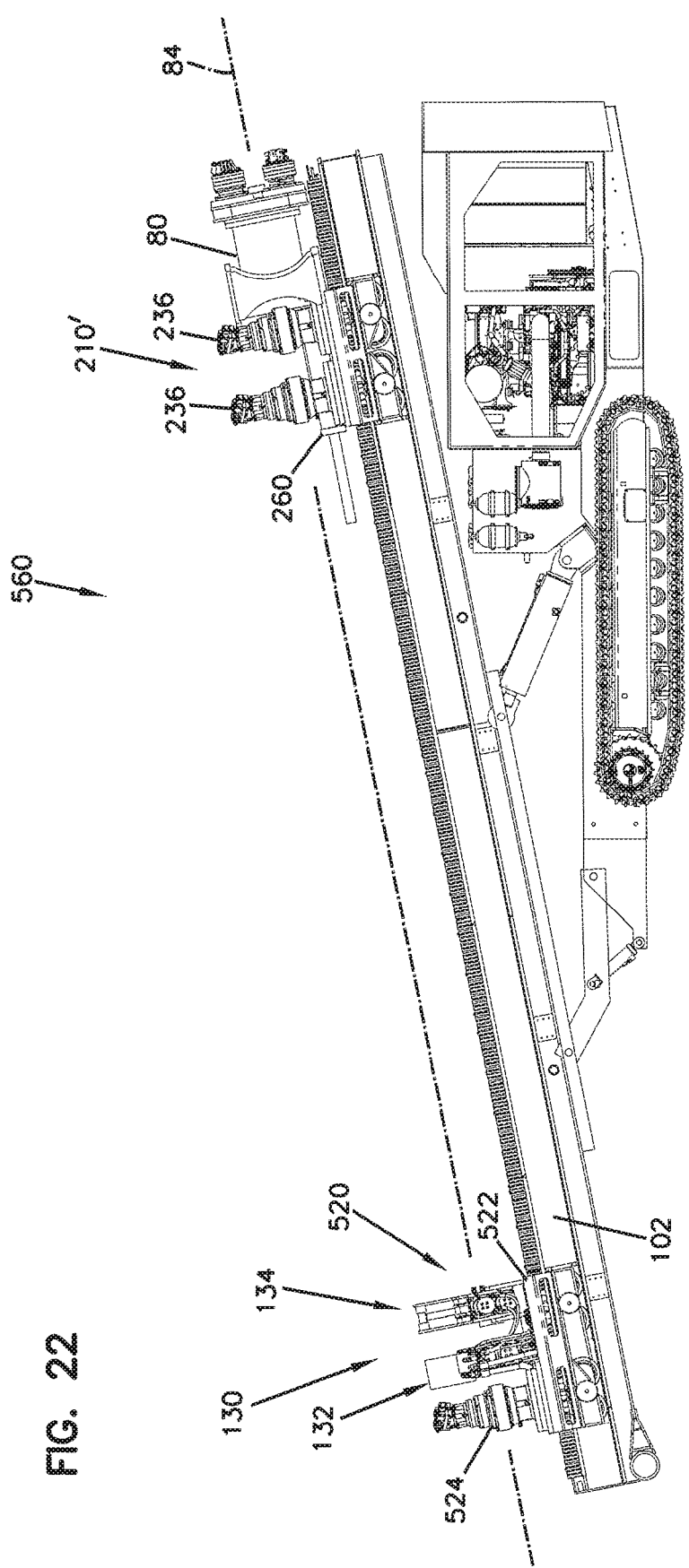
FIG. 22 is a left side view of another drilling machine in accordance with the principles of the present disclosure, the drilling machine includes a rotational drive carriage and a vise carriage that can be operated either independently or together.

FIG. 22 shows another drilling machine 560 having a thrust and pull-back drive arrangement in accordance with the principles of the present disclosure for thrusting a drill string into the ground and for pulling-back a drill string from the ground. The thrust and pull-back drive arrangement of the drilling machine 560 includes a rotational drive carriage 210' having the same basic configuration as the main carriage 210 previously described herein. For example, the rotational drive carriage 210' includes the rotational driver 80 for rotating the drill string during drilling and pull-back operations. The rotational drive carriage 210' also includes the hydraulic motors 236 for propelling the rotational drive carriage 210' along the track 102 of the drill frame 70 and further includes the hydraulic cylinder devices 260 for providing supplemental thrust and/or pull-back capacity during drilling and/or pull-back operations. In other examples, the rotational drive carriage 210' can have more or fewer than 2 of the hydraulic motors 236, and can include more or fewer than two of the hydraulic cylinder devices 260.

The thrust and pull-back drive arrangement of the drilling machine 560 also includes a vise carriage 520 mounted to move back and forth along the elongate track 102. At least one hydraulic motor 524 is mounted on a carriage body 522 of the vise carriage 520 for propelling the vise carriage 520 along the track 102. As depicted, two hydraulic motors 524 are provided for propelling the vise carriage 520 along the track 102. In certain examples, the hydraulic motors 524 can each drive a gear or gears that intermesh with the rack structure 91 of the track 102. The vise carriage 520 also includes the vise arrangement 130 which is mounted on the carrier body 522. For example, the vise frame 400 of the first rod vise 132 is mounted relative to the carrier body 522 so as to not be rotatable relative to the carrier body 522. In contrast, the vise frame 400 of the second rod vise 134 is mounted to pivot relative to the carrier body 522 about the drive axis 84. For example, the vise frame 400 of the second rod vise 134 is pivotally connected to the sub-frame 452 which is mounted on the carrier body 522. The pivot hydraulic cylinder 410 is coupled between the carrier body 522 and the pivot arm 453 of the vise frame 400 of the second rod vise 134 such that extension of pivot hydraulic cylinder 410 pivots the vise frame 400 of the second rod vise 134 in the first rotational direction about the drive axis 84 relative to the carrier body 522, and retraction of the pivot hydraulic cylinder 410 causes rotation of the vise frame 400 of the second rod vise 134 in the second rotational direction relative to the carriage body 522 about the drive axis 84. It will be appreciated that the vise carriage 520 can be positioned along the track 102 relative to the rotational drive carriage 210' to allow the first and second rod vises 132, 134 to be used to tighten threaded rod joints during drilling operations and to loosen threaded rod joints during pull-back operations.

It will be appreciated that in certain examples, space usage can be enhanced by mounting the vises 132, 134 on the carriage 520 so that thrust supplementation functionality and joint making and breaking functionality are incorporated into one structure/unit. In certain examples, enhanced space usage can allow for shortening of the overall length of the drill frame 70.

The vise carriage 522 can also include the interlock 214 or another interlock (e.g., an interlock that engages another portion of the frame other than the rack structure) for selectively locking and unlocking the carrier body 522 relative to the frame/rack. The interlock 214 can selectively engage or disengage the rack structure 91 as previously described to selectively lock and unlock the vise carriage 522 relative to the track 102. When the interlock 214 engages the rack structure 91 to lock the vise carriage 520 relative to the drill frame 70, the carrier body 522 of the vise carriage 520 is prevented from moving along the length of the track 102. In contrast, when the interlock 214 is disengaged from the rack structure 91 to unlock the vise carriage 520 relative to the drill frame 70, the carrier body 522 of the vise carriage 520 is permitted to move along the length of the track 102. In other examples, the hydraulic motor or motors 524 can function as an interlock. For example, since the gears of the hydraulic motor or motors 524 intermesh with the rack structure 91, the vise carriage 520 can be locked in position along the rack structure 91 (and thus locked in place at a position along the track 102) by hydraulically locking the hydraulic motors 524 to prevent rotation of the gears that intermesh with the rack structure 91 or by otherwise locking the gears to prevent rotation of the gears. It will be appreciated that the hydraulic cylinder devices 260 can work in combination with the vise carriage 522 to provide another source of thrust or pull-back to the rotational drive carriage 210'. For example, by anchoring the vise carriage 522 and coupling the hydraulic cylinder devices 260 to the vise carriage 522, the hydraulic cylinders 260 can be used independently of the hydraulic motors 336 of the rotational drive carriage 210' to independently apply thrust or pull-back load to the rotational drive carriage 210', and can be used concurrently with the hydraulic motors 336 of the rotational drive carriage 210' to apply supplemental thrust or pull-back load to the rotational drive carriage 210'. In another example, the hydraulic cylinder devices 260 can be mounted on the vise carriage 522, and can be detachable from the rotational drive carriage 210'.

It will be appreciated that the thrust and pull-back drive arrangement of the drilling machine 560 can be operated in different modes or states. The states can include: 1) a first state in which the hydraulic motor or motors 236 of the rotational drive carriage 210' alone are used to move the rotational drive carriage 210' in either a drilling or pull-back direction; 2) a second state in which the hydraulic cylinder device or devices 260 alone are used to move the rotational drive carriage 210' in either a drilling or pull-back direction; 3) a third state in which the hydraulic motor or motors 236 and the hydraulic cylinder device or devices 260 are used concurrently to move the rotational drive carriage 210' in either a drilling or pull-back direction; 4) a fourth state in which the hydraulic motor or motors 524 of the vise carriage 520 alone are used to move the rotational drive carriage 210' in either a drilling or pull-back direction; 5) a fifth state in which the hydraulic motor or motors 236 of the rotational drive carriage 210' and the hydraulic motor or motors 524 of the vise carriage 520 are used concurrently to move the rotational drive carriage 210' in either a drilling or pull-back direction; and 6) a sixth state in which the hydraulic motor or motors 236 are used to move the rotational drive carriage 210' along the track 102 independent of the vise carriage 520, and the hydraulic motor or motors 524 of the vise carriage 520 are used to move the vise carriage 520 along the track 102 independent of the rotational drive carriage 210'.

In certain examples and operational states, the rotational drive carriage 210' and the vise carriage 520 can work together as one unit. For example, it is desirable to operate the rotational drive carriage 210' and the vise carriage 520 as one unit during pull-back and/or drilling operations to provide a wider range of thrust and/or pull-back load capacities. For example, during pull-back and/or drilling operations, the hydraulic motors 236 of the rotational drive carriage 210' can be used alone to provide a normal level of driving force. Additionally, to provide an enhanced or boosted level of drive force during drilling and/or pull-back operations, the hydraulic motors 236 of the rotational drive carriage 210' and the hydraulic motors 524 of the vise carriage 520 can be operated together. In certain examples, the rotational drive carriage 210' and the vise carriage 520 are configured to be selectively mechanically coupled together (e.g., when rotational drive carriage 210' and the vise carriage 520 are desired to be operated as a unit) and selectively decoupled from each other (e.g., when independent movement of the carriages 210', 520 is desired). When the carriages 210', 520 are coupled together, the thrust and pull-back arrangement can be operated in any one of states 1-5 for both pull-back and drilling operations. When the carriages 210', 520 are de-coupled, the thrust and pull-back arrangement can be operated in states 1 and 6, and can also be operated in states 4 and 5 for pull-back operations by abutting the vise carriage 520 against the rotational drive carriage 210' without mechanically coupling the carriages 210', 520 together.

As indicated above, the thrust and pull-back arrangement of the drilling machine 560 can also be operated in a decoupled state in which the rotational drive carriage 210' and the vise carriage 520 are decoupled from each other. In this decoupled state, the vise carriage 520 can be moved along the track 102 independent of the rotational drive carriage 210' by virtue of its hydraulic motors 524, and the rotational drive carriage 210' can be moved along the track 102 independent of the vise carriage 520 by virtue of its hydraulic motors 236. The ability to independently move the rotational drive carriage 210' and the vise carriage 520 allows the vise arrangement 130 of the vise carriage 520 to be used to perform its drill rod joint tightening and loosening functionality. Preferably, during joint tightening and loosening, the rotational drive carriage 210' is positioned adjacent an upper end of the track 102 and the vise carriage 520 is positioned adjacent a lower end of the track 102 (see FIG. 22).

Figure 23:
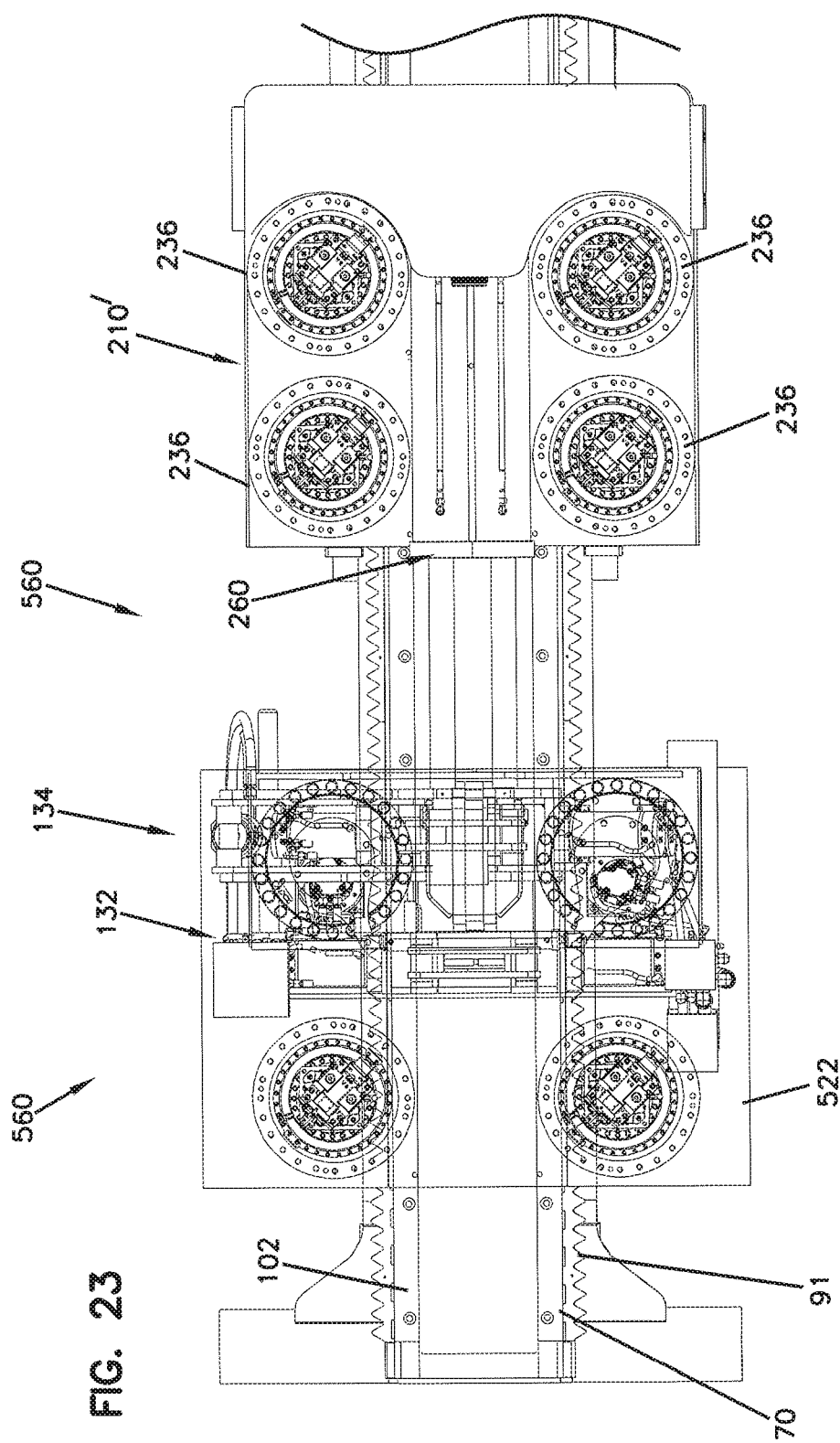
FIG. 23 is a top view showing the rotational drive carriage and the vise carriage of the drilling machine of FIG. 22 coupled together by a hydraulic cylinder device.
Figure 24:
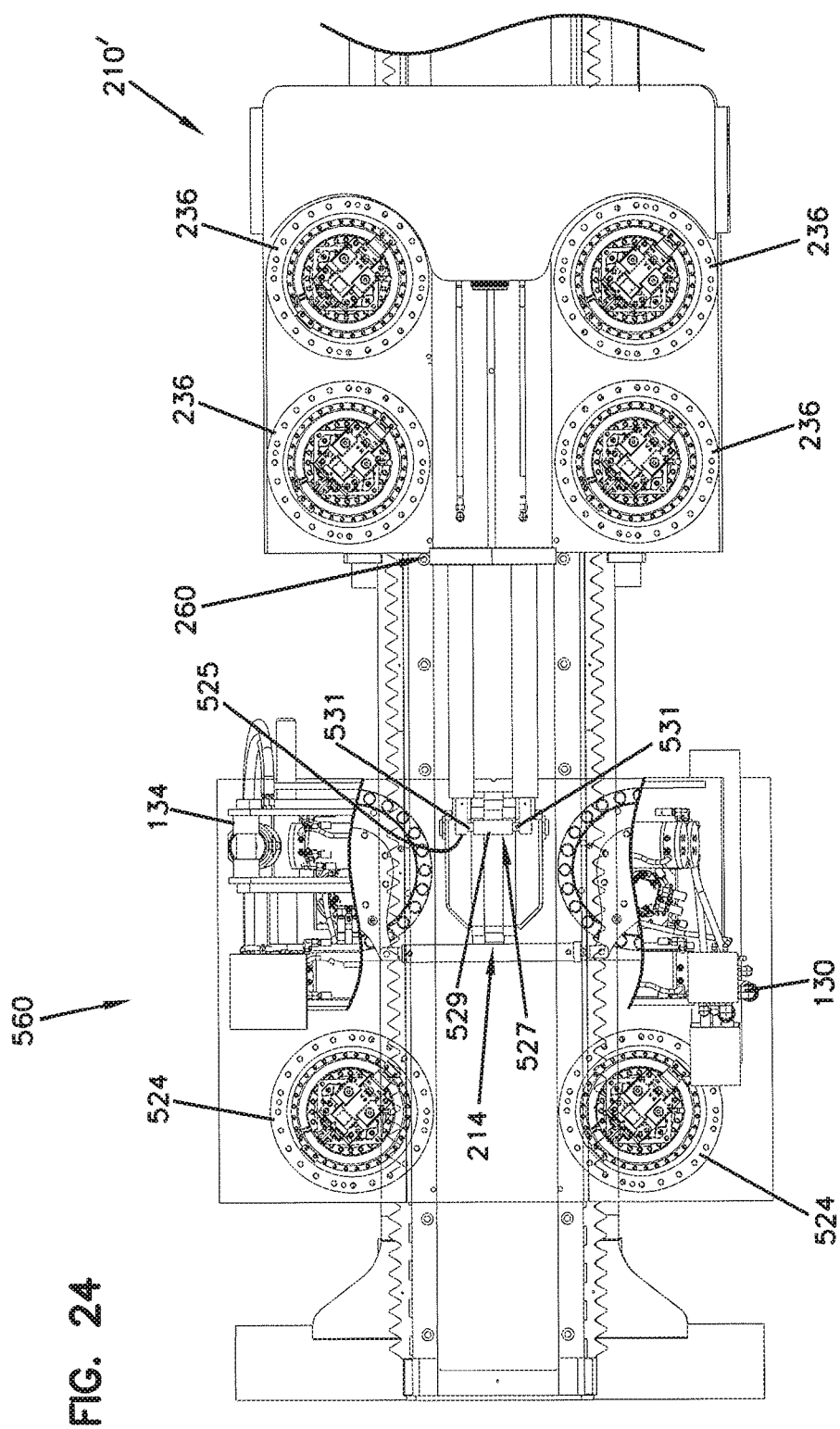
FIG. 24 shows the main drive carriage and the vise carriage of FIG. 23 with a portion of the vise carriage broken away and the hydraulic cylinder coupled to the vise carriage.
Figure 25:
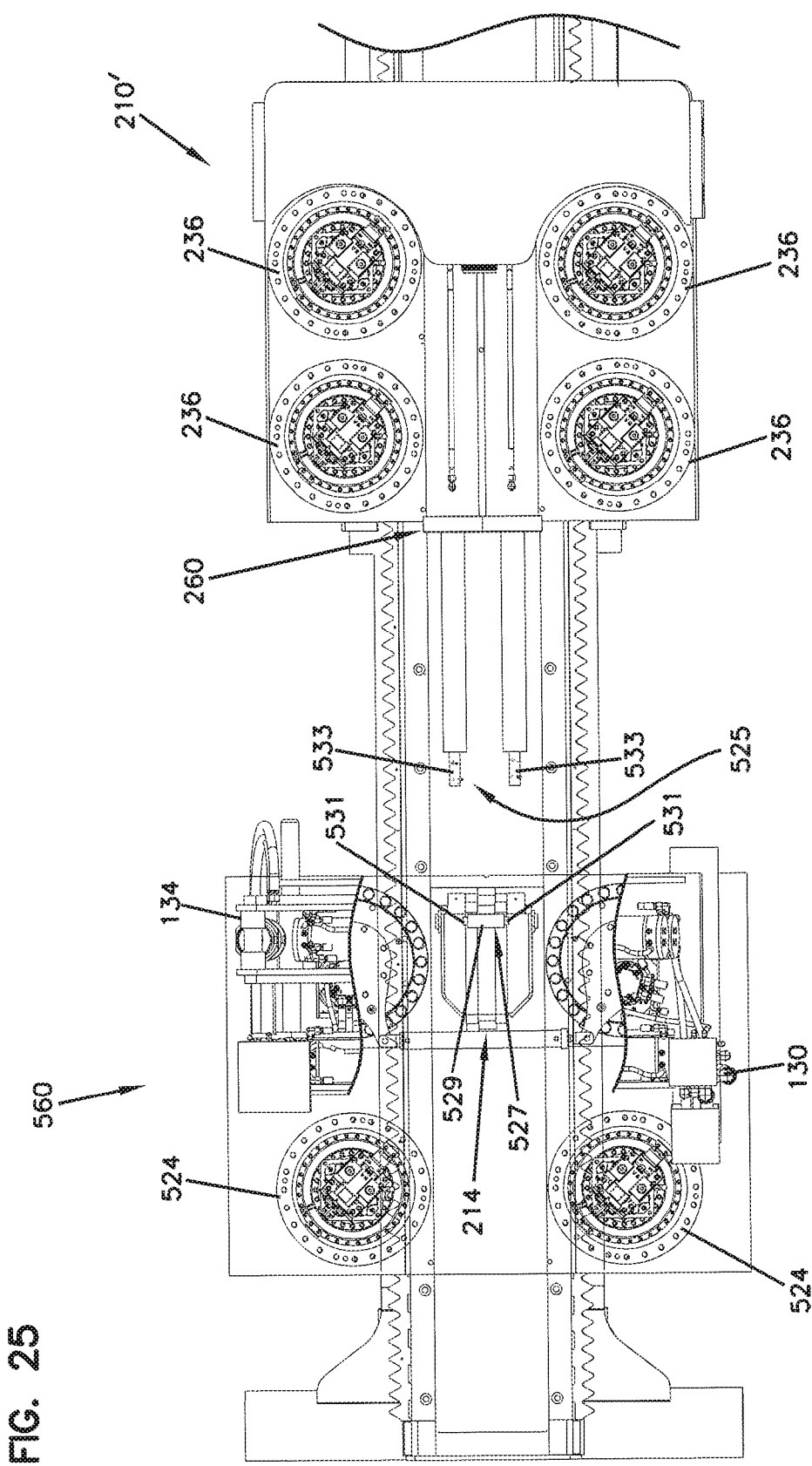
FIG. 25 shows the main drive carriage and the vise carriage of FIG. 23 with a portion of the vise carriage broken away and the hydraulic cylinder uncoupled from the vise carriage.

As indicated above, in certain examples the vise carriage 520 and the rotational drive carriage 210' have a construction that allows the two carriages 520, 210' to be mechanically coupled together to allow the carriages 210', 520 to be operated as one unit for both drilling and pull-back operations. Example structures for mechanically coupling the vise carriage 520 and the rotational drive carriage 210' together include latches, pins, couplers, fasteners, threaded interfaces, hooks or like structures. In a preferred example, the hydraulic cylinder device 260 is used to selectively couple the rotational drive carriage 210' and the vise carriage 520 together. In certain examples, an end 525 of the hydraulic cylinder device 260 can be configured to be selectively coupled to and uncoupled from a connection interface 527 of the vise carriage 520. FIGS. 23 and 24 show the end 525 of the hydraulic cylinder device 260 coupled to the connection interface 527, and FIG. 25 shows the end 525 uncoupled from the connection interface 527. In certain examples, the connection interface 527 can include an actuator 529 such as a double-ended hydraulic cylinder that can move piston rods 531 (i.e., locking pins) between latching and unlatching positions. The end 525 of the hydraulic cylinder device 260 can include latching openings 533 (see FIG. 25) for receiving the piston rods/pins 531. To couple the rotational drive carriage 210' and the vise carriage 520 together, the two carriages 210', 520, are moved adjacent to one another such that the latching end 525 of the hydraulic cylinder device 260 is received within the connection interface 527 on the vise carriage 520. The actuator 529 is then extended to latch the end 525 of the hydraulic cylinder device 260 to the vise carriage 520. When the actuator 529 is extended, the piston rods 531 extend through the latching openings 533 at the latching end 525 of the hydraulic cylinder devices 260 to couple the latching end 525 to the connection interface 527. Once latched, the carriages 210', 520 are coupled together by the hydraulic cylinder device 260, and the hydraulic cylinder device 260 can be used to assist in providing thrust and/or pull-back force in the same manner previously described with respect to the earlier embodiment. Specifically, hydraulic cylinder assistance can be provided by locking the vise carriage 520 relative to the track 102 and then actuating the hydraulic cylinder device 260 as needed. Thus, when the carriages 210', 520 are coupled together and operated as one unit, three separate sources of driving force are available which include: a) the hydraulic motors 236 of the rotational drive carriage 210'; b) the hydraulic motors 524 of the vise carriage 520; and c) the hydraulic cylinder device 260.

It will be appreciated that the size of the hydraulic motor or motors 524 of the vise carriage 520 will vary depending on intended use. If it is intended for the hydraulic motor or motors 524 to be only used to move the vise carriage 520 independently of the rotational drive carriage 210', a relatively small motor can be used. In contrast, if it is intended for the hydraulic motor or motors 524 to be relied upon to provide thrust or pull-back boost, the hydraulic motors 524 can be relatively large and in certain examples can have the same torque capacity as the hydraulic motors 236 of the rotational drive carriage 210'.

In one example, the vise carriage 520 can have a configuration including: a) a relatively small hydraulic motor sized with a drive capacity designed to allow for movement of the carriage 520 along the track 102 but without substantial excess capacity for assisting in pull-back and/or drilling operations; b) a coupling or latching arrangement for coupling and de-coupling the vise carriage 520 to and from the hydraulic cylinder device or devices 260; and c) the gear or gears of the hydraulic motor being sized to withstand drilling and pull-back loading/forces such that the gear or gears can function to anchor the vise carriage 520 relative to the rack structure 91 and track 102. Anchoring by the gear or gears allows the hydraulic cylinder device or devices 260 to be used independently to move the rotational drive carriage 210' during drilling and pull-back operations, and also allows the hydraulic cylinder device or devices 260 to be used in combination with the hydraulic motor or motors 236 during drilling and pull-back operations. Thus, the hydraulic cylinder device or devices 260 can be used to supplement the hydraulic motor or motors 236 (e.g., during start-up of a pull-back sequence) and can be used to provide precise positional control of the drill string (e.g., during drilling a pilot bore when accurate control of movement of the drill head is required). As compared to the drilling machine 60, the modified drilling machine described in this paragraph combines the sub-carriage 212 and the vise carriage 451 into one carriage thereby reducing the number of separate components and enhancing space utilization. The modified drilling machine of this paragraph can utilize a relatively inexpensive drive mechanism for independently moving the vise carriage relative to the track and the rotational drive carriage when the vise carriage is de-coupled from the rotational drive carriage.

When a drill rod is to be added to a drill string during a drilling sequence, the vise carriage 520 can be moved to a lower position on the track 102 as shown at FIG. 22, and the rotational drive carriage 210' can be moved to an upper position on the track 102 as shown at FIG. 22. With the carriages 210', 520 positioned as shown at FIG. 22, a drill rod can be delivered from a magazine to the drill string. The vise arrangement 130 can then be used to tighten or make a joint between the newly added drill rod and a down-hole rod. Thereafter, the vise carriage 520 is moved by its hydraulic motor 524 up the track 102 to a position adjacent to the rotational drive carriage 210'. The hydraulic cylinder device 260 is then coupled to the vise carriage 520 (for embodiments where coupling is an available option, and for conditions where coupling is desired), and the rotational drive carriage 210' and the vise carriage 520 are used together to thrust the drill string into the ground. During thrusting, the hydraulic cylinder device 260, the hydraulic motors 236 of the rotational drive carriage 210' and the hydraulic motors 524 of the vise carriage 520 are all available, as needed, to provide thrust force. Selected ones of the hydraulic cylinder device 260, the hydraulic motors 236 of the rotational drive carriage 210' and the hydraulic motors 524 of the vise carriage 520 can be used independently or together (any one or more of operating states 1-5, described above, can be utilized) depending upon the drilling conditions encountered. Once the vise carriage 520 and the rotational drive carriage 210' reach the lower position on the track 102, the rotational driver 80 is disconnected from the drill string and the hydraulic cylinder device 260 is de-coupled from the vise carriage 520. Thereafter, the rotational drive carriage 210' is moved back up the track 102 to the upper position while the vise carriage 520 remains in the lower position. The process can then be repeated to add another drill rod to the drill string.

To withdraw the drill string from the ground, the rotational drive carriage 210' and the vise carriage 520 are both positioned at the lower position along the track 102 and are optionally coupled together via the hydraulic cylinder device 260. The rotational driver 80 is coupled to the upper end of the drill string. Next, the rotational drive carriage 210' and the vise carriage 520 can be operated as a unit as the drill string is pulled from the ground. During the pull-back operation, the hydraulic motors 236 of the rotational drive carriage 210' can be used alone to provide pull-back force to the drill string. Additionally, in the event of increased loading, supplemental pull-back force can be provided by the hydraulic cylinder device 260 (e.g., by anchoring or locking the vise carriage 520 in place relative to the track 102 and then actuating the hydraulic cylinder device 260) or by the one more hydraulic motors 524 of the vise carriage 520. Thus, during pull-back operations, the hydraulic cylinder device 260, the hydraulic motors 236 of the rotational drive carriage 210' and the hydraulic motors 524 of the vise carriage 520 are all available either alone or in combination, as needed, to provide pull-back force. When the carriages 210', 520 reach the upper end of the track 102, a full drill rod length has been pulled from the ground. With the drill rod fully removed from the ground, the vise carriage 520 is disconnected from the rotational drive carriage 210' and is moved to the lower position (FIG. 22) where the vise arrangement 130 is used to break the joint between the removed drill rod and the subsequent drill rod. Thereafter, the removed drill rod is completely unthreaded from the drill string and delivered to a storage location such as a magazine. Once the drill rod has been moved from the drive axis 84, the rotational drive carriage 210' can be moved back to the lower position and coupled to the vise carriage 520. Thereafter, the process can be repeated to remove the next drill rod from the ground.

Figure 26:
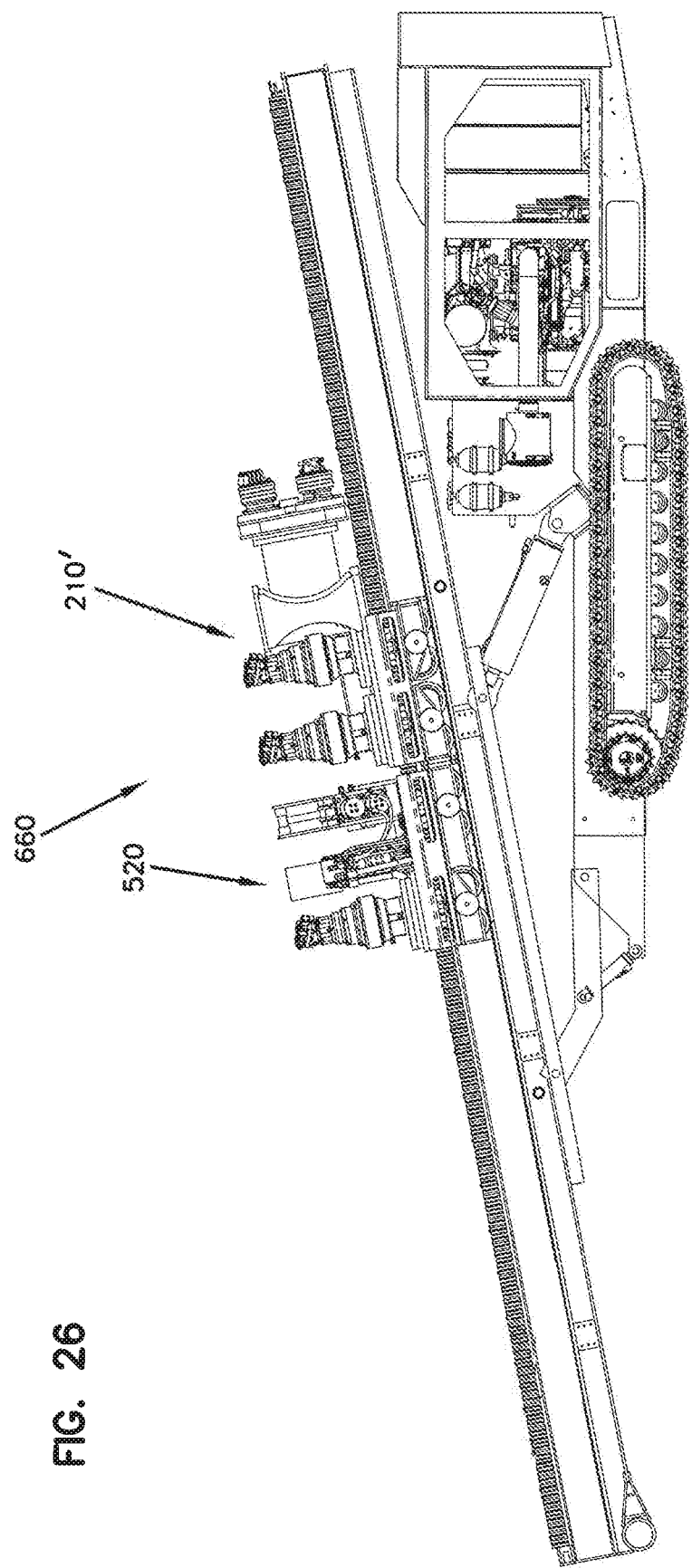
FIG. 26 shows another drilling machine in accordance with the principles of the present disclosure.

FIG. 26 shows another drilling machine 660 in accordance with the principles of the present disclosure. The drilling machine 660 has the same basic configuration as the drilling machine 560 except that a hydraulic cylinder device 260 is not provided on the rotational drive carriage 210'. Instead, if it is desired to use the vise carriage 520 for both pull-back assistance and thrust assistance, a mechanical coupling other than the hydraulic cylinder device can be used to selectively couple the carriages together. Example couplings can include pins, latches, hooks, fasteners, threaded couplings or other structures. Preferably, the coupling allows both compressive load and tensile loads to be transferred between the carriages 210', 520. When the carriages 210', 520 are coupled together, the hydraulic motors 236 of the rotational drive carriage 210' and the motors 524 of the vise carriage 520 can be used independently or together to apply thrust and/or pull-back force to a drill string. If it is only desired to provide pull-back assistance with the vise carriage 520, it will be appreciated that the mechanical coupling can be eliminated. In such an example, the vise carriage 520 can abut against the rotational drive carriage 210 to provide pull-back assistance.

Figure 27:
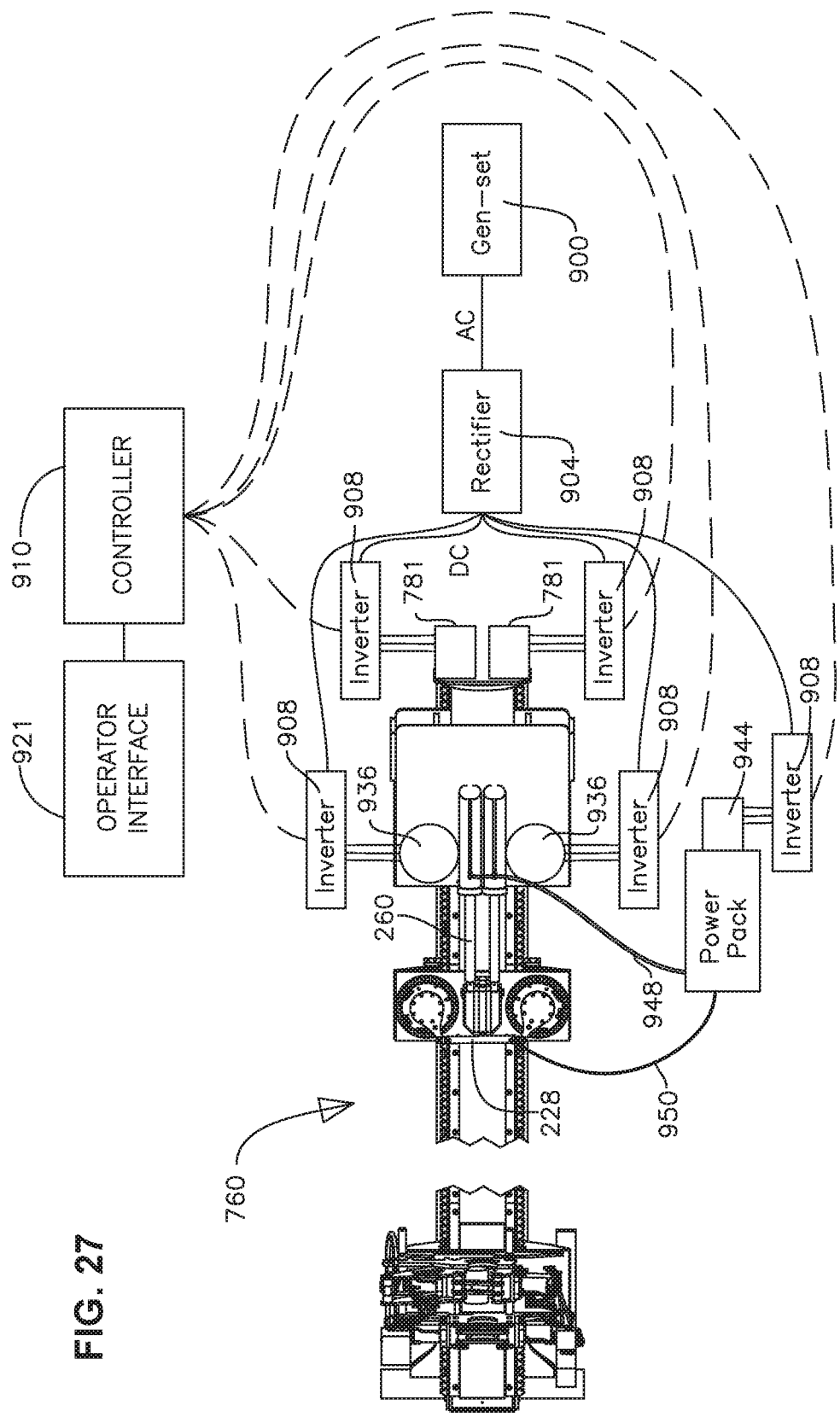
FIG. 27 schematically depicts an example control system for a drilling machine in which the primary thrust system utilizes electric motors instead of hydraulic motors in accordance with the principles of the present disclosure.

FIG. 27 schematically illustrates another drilling machine 760 in accordance with the principles of the present disclosure. The drilling machine 760 has the same basic configuration as the drilling machine 60 except that the four hydraulic motors 81 of the rotational driver 80 are replaced with two electric motors 781, and the four hydraulic motors 236 for propelling the main carriage 210 are replaced with two electric motors 936. In this regard, it should be noted that where hydraulic motors have been previously described, those of ordinary skill in the art will understand that with appropriate modifications to the system, electric motors can be substituted for hydraulic motors. FIG. 27 illustrates one exemplary system in which the electric motors 781, 936 are powered by a generator set 900. An associated rectifier 904 and individual inverters 908 convert/condition the electric signal for the electric motors 781, 936. A hydraulic power pack is also provided and is powered via another electric motor 944. Hydraulic lines 948, 950 fluidly communicate the power pack with the hydraulic cylinders 260 and 228, respectively. Operator interface 921 is illustrated as operatively connected to controller 910, which is operatively connected to the various inverters. It is understood that this illustration of the control architecture does not show all the input transducers or control outputs. Several of the inputs/outputs illustrated in FIG. 15 would be utilized in this electric drive arrangement, but they are not shown in FIG. 27 in order to reduce the complexity of this Figure. It is to be understood that FIG. 27 illustrates just one exemplary architecture for using electric motors, and other configurations are also contemplated.

What is claimed is:

1. A drilling machine comprising:
   an elongate track that extends between a first end and an opposite second end with a drive axis extending parallel to a length of the track, wherein in use of the drilling machine the first end is located adjacent to an entry point into the ground and the second end is positioned away from the entry point;
   a main carriage coupled to and moveable along the track in a thrust direction that extends from the second end toward the first end of the track, and in a pull-back direction that extends from the first end toward the second end of the track;
   a rotational driver coupled to the main carriage, the rotational driver including a rod coupler having a coupler axis and a coupler end adapted for connection to an end of a drill rod, wherein the drive axis is coaxial with the coupler axis;
   a first drive mechanism coupled to the main carriage and the track;
   a sub-carriage coupled to and moveable along the track;
   an interlock coupled to the sub-carriage and the track, the interlock having a locked position and an unlocked position; and
   a second drive mechanism coupled to the main carriage and the sub-carriage;
   the drilling machine being operable in a first state wherein the first drive mechanism drives the main carriage along the track and the second drive mechanism simultaneously drives the main carriage relative to the sub-carriage;
   wherein the track includes a rack gear, wherein the first drive mechanism comprises a motor and a pinion gear engaged with the rack gear, and wherein the interlock includes at least one locking tooth that engages the rack gear when the interlock is in the locked position to secure the sub-carriage relative to the track.

2. The drilling machine of claim 1, wherein the motor of the first drive mechanism comprises a hydraulic motor and the second drive mechanism comprises a hydraulic cylinder.

3. The drilling machine of claim 1, wherein the motor of the first drive mechanism comprises an electric motor and the second drive mechanism comprises a hydraulic cylinder.

4. The drilling machine of claim 1, wherein the sub-carriage is a vise carriage having a vise assembly mounted thereon.

5. The drilling machine of claim 1, wherein the drilling machine is operable in second and third states, wherein in the second state only the first drive mechanism and not the second drive mechanism drives the main carriage along the length of the track, and wherein in the third state only the second drive mechanism and not the first drive mechanism drives the carriage along the length of the track.

6. The drilling machine of claim 5, wherein the second drive mechanism includes a hydraulic cylinder device moveable along a stroke length between a drive-ready position and a driven position, wherein the drilling machine includes a controller that monitors load on the first drive mechanism when the drilling machine is operating in the second state, and wherein if the load on the first drive mechanism exceeds a predetermined load level the controller changes the operating state of the drilling machine to the first state, the interlock is moved to the locked position, and the hydraulic cylinder device is driven from the drive-ready position toward the driven position to assist the first drive mechanism in moving the main carriage along the track.

7. The drilling machine of claim 1, wherein the interlock includes at least one locking tooth that engages a rack gear on the track when the interlock is in the locked position to secure the sub-carriage relative to the track, and that disengages from the rack gear when the interlock is in the unlocked position.

8. The drilling machine of claim 1, wherein the drilling machine is operable in a thrust mode where the drill rod is moved by the drilling machine in the thrust direction, wherein the drilling machine is operable in a pull-back mode where the drill rod is moved by the drilling machine in the pull-back direction, wherein the drilling machine includes a controller, wherein the controller controls a pull-back sequence when the drilling machine is in the pull-back mode, and wherein the pull-back sequence includes a start-up pull-back step where the second drive mechanism and the first drive mechanism concurrently drive the main carriage in the pull-back direction to initiate movement of the drill rod in the pull-back direction, and a subsequent pull-back step where the interlock is moved to the unlocked position while the first drive mechanism alone continues to drive the main carriage in the pull-back direction.

9. The drilling machine of claim 8, wherein the main carriage does not stop as the drilling machine transitions from the start-up pull-back step to the subsequent pull-back step.

10. A drilling machine comprising:
    an elongate track that extends between a first end and an opposite second end with a drive axis extending parallel to a length of the track, wherein in use of the drilling machine the first end is located adjacent to an entry point into the ground and the second end is positioned away from the entry point;
    a main carriage coupled to and moveable along the track in a thrust direction that extends from the second end toward the first end of the track, and in a pull-back direction that extends from the first end toward the second end of the track;
    a rotational driver coupled to the main carriage, the rotational driver including a rod coupler having a coupler axis and a coupler end adapted for connection to an end of a drill rod, wherein the drive axis is coaxial with the coupler axis;

a first drive mechanism coupled to the main carriage and the track;

a sub-carriage coupled to and moveable along the track;

an interlock coupled to the sub-carriage and the track, the interlock having a locked position and an unlocked position; and a second drive mechanism coupled to the main carriage and the sub-carriage;

the drilling machine being operable in a first state wherein the first drive mechanism drives the main carriage along the track and the second drive mechanism simultaneously drives the main carriage relative to the sub-carriage;

further comprising a controller that coordinates the simultaneous operation of the first drive mechanism and the second drive mechanism when the drilling machine is operated in the first state such that the first drive mechanism and the second drive mechanism both drive the main carriage at a same linear speed.

11. The drilling machine of claim 10, wherein the track includes a rack gear, wherein the first drive mechanism comprises a motor and a pinion gear engaged with the rack gear, and wherein the interlock includes at least one locking tooth that engages the rack gear when the interlock is in the locked position to secure the sub-carriage relative to the track.

12. The drilling machine of claim 10, wherein the second drive mechanism has a maximum force capacity in the range of 0.25 to 4 times a maximum force capacity of the first drive mechanism.

13. The drilling machine of claim 10, wherein the second drive mechanism includes a hydraulic cylinder device moveable along a stroke length between a fully extended position and a fully retracted position, and wherein the stroke length is less than 20 percent of the length of the track.

14. The drilling machine of claim 10, wherein the second drive mechanism includes a hydraulic cylinder device moveable along a stroke length between a fully extended position and a fully retracted position, and wherein the stroke length is less than 20 percent of a total distance of movement of the main carriage along the track between the first and second ends of the track.

15. The drilling machine of claim 10, wherein the second drive mechanism includes a hydraulic cylinder device having a stroke axis that is parallel to the length of the track.

16. A drilling machine for drilling a drill string into the ground, the drilling machine comprising:

a track having a length that extends between a first end and an opposite second end, wherein in use of the drilling machine the first end is located adjacent to an entry point into the ground and the second end is positioned away from the entry point;

a carriage that moves back and forth along the track between the first end and the second end, the carriage being movable along the track in a thrust direction that extends from the second end toward the first end of the track, the carriage also being moveable along the track in a pull-back direction that extends from the first end toward the second end of the track, the carriage including a main carriage and a sub-carriage that are moveable relative to one another along the length of the track;

a rotational driver mounted to the main carriage, the rotational driver including a rod coupler having a coupler axis and a coupler end adapted for connection to an end of a drill rod, the rotational driver including a rotational drive motor for rotating the rod coupler about a drive axis that is coaxial with the coupler axis and that extends along the length of the track;

a carriage drive motor mounted to the main carriage for propelling the main carriage along the track, the carriage drive motor being coupled to a pinion gear that engages a rack gear on the track;

the sub-carriage including an interlock configurable in a locked position and an unlocked position, wherein when the interlock is in the locked position the sub-carriage is locked relative to the track such that the sub-carriage is inhibited from moving relative to the track along the length of the track, and wherein when the interlock is in the unlocked position the sub-carriage is free to move relative to the track along the length of the track; and a hydraulic cylinder device including a cylinder and a rod that axially reciprocates within the cylinder, one of the cylinder and the rod being coupled to the main carriage and the other of the cylinder and the rod being coupled to the sub-carriage;

the drilling machine being operable in a first state where both the hydraulic cylinder device and the carriage drive motor are simultaneously used to drive the main carriage along the length of the track, the interlock being configured in the locked position when the drilling machine is operated in the first state;

further comprising a controller that coordinates the simultaneous operation of the hydraulic cylinder device and the carriage drive motor when the drilling machine is operated in the first state such that the carriage drive motor and the hydraulic cylinder device drive the main carriage at a same linear speed.

17. The drilling machine of claim 16, wherein the drilling machine is operable in second and third states, wherein in the second state only the carriage drive motor and not the hydraulic cylinder device is used to drive the main carriage along the length of the track, and wherein in the third state only the hydraulic cylinder device and not the carriage drive motor is used to drive the carriage along the length of the track.

18. The drilling machine of claim 16, wherein the drilling machine is operable in a thrust mode where the drill rod is moved by the drilling machine in the thrust direction, wherein the drilling machine is operable in a pull-back mode where the drill rod is moved by the drilling machine in the pull-back direction, wherein the drilling machine includes a controller, wherein the controller controls a pull-back sequence when the drilling machine is in the pull-back mode, and wherein the pull-back sequence includes a start-up pull-back step where the hydraulic cylinder device and the carriage drive motor simultaneously drive the main carriage in the pull-back direction to initiate movement of the drill rod in the pull-back direction, and a subsequent pull-back step where the interlock is moved to the unlocked position while the carriage drive motor alone continues to drive the main carriage in the pull-back direction.

19. The drilling machine of claim 16, wherein the sub-carriage is a vise carriage having a vise assembly mounted thereon.

\* \* \* \* \*